(12) United States Patent
Yednock et al.

(10) Patent No.: US 12,486,322 B2
(45) Date of Patent: Dec. 2, 2025

(54) ANTI-COMPLEMENT FACTOR C1q ANTIBODIES WITH SINGLE BINDING ARMS AND USES THEREOF

(71) Applicant: Annexon, Inc., Brisbane, CA (US)

(72) Inventors: Ted Yednock, Forest Knolls, CA (US); Sethu Sankaranarayanan, Fremont, CA (US)

(73) Assignee: Annexon, Inc., Brisbane, CA (US)

( * ) Notice: Subject to any disclaimer, the term of this patent is extended or adjusted under 35 U.S.C. 154(b) by 151 days.

(21) Appl. No.: 18/080,442

(22) Filed: Dec. 13, 2022

(65) Prior Publication Data

US 2023/0279103 A1 Sep. 7, 2023

Related U.S. Application Data

(60) Provisional application No. 63/288,885, filed on Dec. 13, 2021, provisional application No. 63/288,883, filed on Dec. 13, 2021.

(51) Int. Cl.
| | |
|---|---|
| *C07K 16/28* | (2006.01) |
| *A61K 39/00* | (2006.01) |
| *A61P 25/28* | (2006.01) |

(52) U.S. Cl.
CPC ............. *C07K 16/28* (2013.01); *A61P 25/28* (2018.01); *A61K 2039/505* (2013.01); *C07K 2317/52* (2013.01); *C07K 2317/71* (2013.01)

(58) Field of Classification Search
CPC ............. C07K 16/28; C07K 2317/52; C07K 2317/24; C07K 2317/33; C07K 2317/35; C07K 2317/524; C07K 2317/55; C07K 2317/71; C07K 2317/734; C07K 2317/76; C07K 2317/92; C07K 16/18; A61P 25/28; A61P 25/00; G01N 33/564; G01N 2333/4716; G01N 2800/50; A61K 2039/505
See application file for complete search history.

(56) References Cited

U.S. PATENT DOCUMENTS

| | | | |
|---|---|---|---|
| 6,197,930 B1 | 3/2001 | Sheppard et al. | |
| 7,183,076 B2 | 2/2007 | Arathoon et al. | |
| 8,025,878 B2 | 9/2011 | Gellerfors et al. | |
| 8,148,330 B2 | 4/2012 | Barres et al. | |
| 9,149,444 B2 | 10/2015 | Barres et al. | |
| 9,382,313 B2 | 7/2016 | Barres et al. | |
| 9,480,658 B2 | 11/2016 | Barres et al. | |
| 9,493,555 B2 | 11/2016 | Barres et al. | |
| 9,708,394 B2 * | 7/2017 | Rosenthal | A61P 21/00 |
| 10,227,398 B2 * | 3/2019 | Rosenthal | A61P 3/10 |
| 10,240,156 B2 | 3/2019 | Barres et al. | |
| 10,316,081 B2 * | 6/2019 | Rosenthal | G01N 33/6896 |
| 10,330,671 B2 | 6/2019 | Barres et al. | |
| 10,590,190 B2 * | 3/2020 | Rosenthal | A61P 17/00 |
| 10,723,788 B2 * | 7/2020 | Yednock | A61P 7/06 |
| 10,927,167 B2 * | 2/2021 | Rosenthal | A61P 17/00 |
| 11,649,279 B2 * | 5/2023 | Rosenthal | A61P 7/06 |
| | | | 424/9.1 |
| 11,999,779 B2 * | 6/2024 | Yednock | A61P 3/04 |
| 2002/0058311 A1 | 5/2002 | Browne et al. | |
| 2002/0066117 A1 | 5/2002 | Nilsson et al. | |
| 2002/0104104 A1 | 8/2002 | Games et al. | |
| 2002/0160433 A1 | 10/2002 | Welch et al. | |
| 2003/0170781 A1 | 9/2003 | Holloway et al. | |
| 2003/0207336 A1 | 11/2003 | Jardieu et al. | |
| 2004/0248156 A1 | 12/2004 | Hu et al. | |
| 2005/0197285 A1 | 9/2005 | Rosen et al. | |
| 2005/0214786 A1 | 9/2005 | Birse et al. | |
| 2005/0241008 A1 | 10/2005 | Bredesen et al. | |
| 2007/0135753 A1 | 6/2007 | Barres et al. | |
| 2007/0269435 A1 | 11/2007 | Gillies et al. | |
| 2008/0008719 A1 | 1/2008 | Bowdish et al. | |
| 2008/0241145 A1 | 10/2008 | Goldenberg et al. | |
| 2009/0269338 A1 | 10/2009 | Huang et al. | |
| 2010/0143343 A1 | 6/2010 | Halstead et al. | |
| 2011/0104156 A1 | 5/2011 | Christadoss et al. | |
| 2012/0032860 A1 | 2/2012 | Suzuki et al. | |
| 2012/0195880 A1 | 8/2012 | Barres et al. | |
| 2012/0328601 A1 | 12/2012 | Barres et al. | |
| 2013/0344073 A1 | 12/2013 | Schwaeble et al. | |

(Continued)

FOREIGN PATENT DOCUMENTS

| | | |
|---|---|---|
| CN | 101001872 A | 7/2007 |
| CN | 101657097 A | 2/2010 |

(Continued)

OTHER PUBLICATIONS

Merchant M, et al. Monovalent antibody design and mechanism of action of onartuzumab, a MET antagonist with anti-tumor activity as a therapeutic agent. Proc Natl Acad Sci U S A. Aug. 6, 2013;110(32):E2987-96. doi: 10.1073/pnas.1302725110. Epub Jul. 23, 2013. PMID: 23882082; PMCID: PMC3740879. (Year: 2013).*
Reddy MP, et al. Elimination of Fc receptor-dependent effector functions of a modified IgG4 monoclonal antibody to human CD4. J Immunol. Feb. 15, 2000;164(4):1925-33. doi: 10.4049/jimmunol. 164.4.1925. PMID: 10657642. (Year: 2000).*
"Complement C1s antibody (49)," Product Data Sheet. ThermScientific. Pierce Antibody Products. 1995. pp. 1-2. Retrieved from the Internet: <http://www.pierce-antibodies.com/ <http://www.pierce-antibodies.com/> Complement-C1s-antibody-clone-49-monoclonal-ABS0024902. html#> on Sep. 23, 2014 (Sep. 23, 2014).

(Continued)

*Primary Examiner* — Misook Yu
*Assistant Examiner* — Alec Jon Peters
(74) *Attorney, Agent, or Firm* — Foley Hoag LLP; David P. Halstead; Erin M. Foley

(57) ABSTRACT

The present disclosure relates generally to antibodies with a single antigen-binding arm comprising a single antigen-binding arm and an Fc region such as a single-arm antibodies. The present disclosure also relates generally to the use of such antibodies such as treating a disease associated with complement activation.

12 Claims, 9 Drawing Sheets
Specification includes a Sequence Listing.

(56) References Cited

U.S. PATENT DOCUMENTS

| | | | |
|---|---|---|---|
| 2014/0140933 | A1 | 5/2014 | Van Vlasselaer et al. |
| 2015/0259437 | A1 | 9/2015 | Van Vlasselaer et al. |
| 2015/0368324 | A1 | 12/2015 | Barres et al. |
| 2015/0368325 | A1 | 12/2015 | Barres et al. |
| 2015/0368326 | A1 | 12/2015 | Barres et al. |
| 2016/0159890 | A1 | 6/2016 | Rosenthal et al. |
| 2016/0326237 | A1 | 11/2016 | Rosenthal et al. |
| 2016/0355574 | A1 | 12/2016 | Rosenthal et al. |
| 2016/0368973 | A1 | 12/2016 | Rosenthal et al. |
| 2017/0152309 | A1 | 6/2017 | Yednock et al. |
| 2017/0334976 | A1 | 11/2017 | Rosenthal et al. |
| 2020/0239557 | A1 | 7/2020 | Rosenthal et al. |
| 2020/0317765 | A1 | 10/2020 | Yednock et al. |
| 2021/0115119 | A1 | 4/2021 | Rosenthal et al. |
| 2021/0277096 | A1 | 9/2021 | Rosenthal et al. |
| 2023/0391858 | A1* | 12/2023 | Yednock ............... A61P 7/06 |
| 2024/0025974 | A1* | 1/2024 | Rosenthal ............ A61P 11/00 |
| 2024/0034775 | A1* | 2/2024 | Paz ................ G01N 33/6896 |
| 2024/0059765 | A1* | 2/2024 | Yednock .............. C07K 16/18 |
| 2024/0083987 | A1 | 3/2024 | Rosenthal et al. |
| 2024/0083989 | A1* | 3/2024 | Rosi ................ G01N 33/6893 |
| 2024/0109957 | A1* | 4/2024 | Yednock ............... A61P 7/06 |
| 2025/0002567 | A1 | 1/2025 | Yednock et al. |

FOREIGN PATENT DOCUMENTS

| | | | | |
|---|---|---|---|---|
| CN | 101970484 | A | 2/2011 | |
| CN | 102203610 | A | 9/2011 | |
| CN | 104011221 | A | 8/2014 | |
| CN | 113185611 | A * | 7/2021 | ............. A61P 35/00 |
| EP | 1774972 | A1 | 4/2007 | |
| EP | 2266606 | A1 | 12/2010 | |
| EP | 3019240 | A1 | 5/2016 | |
| WO | WO-1985/02261 | A1 | 5/1985 | |
| WO | WO-1998/23761 | A1 | 6/1998 | |
| WO | WO-2003/052377 | A2 | 6/2003 | |
| WO | WO-2005/002512 | A2 | 1/2005 | |
| WO | WO-2005/002513 | A2 | 1/2005 | |
| WO | WO-2005/063816 | A2 | 7/2005 | |
| WO | WO-2007/070375 | A2 | 6/2007 | |
| WO | WO-2007/126805 | A2 | 11/2007 | |
| WO | WO-2012/067267 | A1 | 5/2012 | |
| WO | WO-2012/163805 | A1 | 12/2012 | |
| WO | WO-2012/176765 | A1 | 12/2012 | |
| WO | WO-2013/166604 | A1 | 11/2013 | |
| WO | WO-2014/066744 | A2 | 5/2014 | |
| WO | WO-2014/161570 | A1 | 10/2014 | |
| WO | WO-2014/169076 | A1 | 10/2014 | |
| WO | WO-2014/186599 | A2 | 11/2014 | |
| WO | WO-2014/186622 | A2 | 11/2014 | |
| WO | WO-2015/006507 | A1 | 1/2015 | |
| WO | WO-2015006504 | A1 * | 1/2015 | ......... A61K 49/0004 |
| WO | WO-2016073685 | A1 * | 5/2016 | ......... A61K 49/0002 |
| WO | WO-2017091719 | A1 * | 6/2017 | ................ A61P 1/04 |
| WO | WO-2017/196874 | A1 | 11/2017 | |
| WO | WO-2018/017711 | A1 | 1/2018 | |
| WO | WO-2022/034920 | A1 | 2/2022 | |
| WO | WO-2022/120137 | A1 | 6/2022 | |
| WO | WO-2023/114763 | A1 | 6/2023 | |

OTHER PUBLICATIONS

Angal et al., "A Single Amino Acid Substitution Abolishes the Heterogeneity of Chimeric Mouse/Human (IgG4) Antibody," Molecular Immunol, 30(1): 105-108 (1993).

Bigler et al., "Autoantibodies against complement C1q specifically target C1q bound on early apoptotic cells," Journal of Immunology, 183:3512-3521 (2009).

Biomarkers Definitions Working Group; "Biomarkers and surrogate endpoints: Preferred definitions and conceptual framework," Clinical Pharmacology & Therapeutics, 69(3): 89-95 (2001).

Brown et al., "Tolerance of single, but not multiple, amino acid replacements in antibody VH CDR 2: a means of minimizing B cell wastage from somatic hypermutation?" J Immunol, 156(9):3285-3291 (1996).

Carroll et al., "Antibody-mediates inhibition of human C1s and the classical complement pathway," Immunobiology, 218:1041-8 (2013).

CAS Registry No. 2065212-40-8; CA Index Name: Immunoglobulin G4, anti-(human complement C1q) (humanized monoclonal ANX005 ?4-chain), disulfide with humanized monoclonal ANX005 kappa-chain, dimer; Source of Registration: CAS Client Services; Entered STN: Feb. 3, 2017.

Casset et al., "A peptide mimetic of an anti-CD4 monoclonal antibody by rational design," Biochemical and biophysical research communications, 307:198-205 (2003).

Chen et al., "Enhancement and Destruction of Antibody Function by Somatic Mutation: Unequal Occurrence is Controlled by V Gene Combinatorial Associations," EMBO J, 14: 2784-2794 (1995).

Chen et al., "Selection and analysis of an optimized anti-VEGF antibody: crystal structure of an affinity-matured Fab in complex with antigen," Journal of Molecular Biology, 293:865-881 (1999).

Colman, "Effects of Amino Acid Sequence Changes on Antibody-Antigen Interactions," Research in Immunology, 145: 33-36 (1994).

D'Angelo et al., "Many Routes to an Antibody Heavy-Chain CDR3: Necessary, Yet Insufficient, for Specific Binding," Frontiers in Immunology, 9: Article 395 (2018).

Extended European Search Report for EP Application No. 16869264.8 dated Jun. 27, 2019.

Extended European Search Report issued by the European Patent Office in corresponding Application No. EP 15857258.6, dated Mar. 20, 2018.

Gershoni et al., "Epitope mapping: the first step in developing epitope-based vaccines," BioDrugs, 21(3):145-156 (2007).

Grover et al., "Pharmacokinetics and target engagement of intravitreal administration of ANX007, an anti-C1q antibody fragment, in nonhuman primates," Investigative Ophthalmology & Visual Science, 62: 219 (2021).

Hampel et al., "The future of Alzheimer's disease: the next 10 years," Prog Neurobiol, 95(4):718-28 (Dec. 2011).

Hoekzema et al., "the Distortive Mechanism for the Activation of Complement Component C1 Supported by Studies with a Monoclonal Antibody against the "arms" of C1q," Mol Immunol, 25(5):485-494 (1988).

Hsiung et al., "A Monoclonal Antibody to C1q which Appears to Interact with C1r2C1s2-binding site," FEBS Letters, 229(1):21-24 (1988).

Hu et al., "Characterization of C1q in teleosts: insight into the molecular and functional evolution of C1q family and classical pathway," J Biol Chem, 285:28777-28786 (2010).

International Search Report and Written Opinion dated Apr. 2, 2015 from related PCT Application PCT/US14/038239.

International Search Report and Written Opinion dated Mar. 18, 2008 from related PCT Application PCT/US06/046857.

International Search Report and Written Opinion dated Nov. 7, 2014 from related PCT Application PCT/US14/038267.

International Search Report and Written Opinion dated Sep. 3, 2014 from related PCT Application PCT/US14/33560.

International Search Report and Written Opinion for Application No. PCT/US2022/081441 dated May 10, 2023.

International Search Report and Written Opinion for International Application No. PCT/US2016/063587 mailed Mar. 9, 2017.

International Search Report and Written Opinion for International Application No. PCT/US2021/061755 dated Feb. 16, 2022.

International Search Report and Written Opinion for related PCT Application PCT/US2015/059185, mailed Jan. 27, 2016.

International Search Report and Written Opinion from corresponding PCT Application PCT/US14/046042, mailed Dec. 5, 2014.

International Search Report and Written Opinion from related PCT Application PCT/US14/046045, mailed Nov. 4, 2014.

Jiao et al., "Subretinal macrophages produce classical complement activator C1q leading to the progression of focal retinal degeneration," Molecular Neurodegeneration, 13(45): 1-18 (2018).

Kilchherr et al., "Activation of the First Component of Human Complement, C1, by Monoclonal Antibodies Directed Against Different Domains of Subcomponent C1q," J Immunol, 137(1):255-262 (1986).

(56) References Cited

OTHER PUBLICATIONS

Kussie et al., "A Single Engineered Amino Acid Substitution Changes Antibody Fine Specificity," J Immunol, 152: 146-152 (1994).
Lamminmaki et al., "Crystal structure of a recombinant anti-estradiol Fab fragment in complex with 17ß-estradiol," Journal of Biological Chemistry, 276:36687-36694 (2001).
Liang et al., "Antinuclear Autoantibodies From B6. Sle1 Mice," p. 1, (2003).
Lopez-Requena et al., "Immunogenicity of autologous immunoglobulins: Principles and practices," Molecular Immunol, 44:3076-82 (2007).
Lund, John, et al. "Human Fc gamma RI and Fc gamma RII interact with distinct but overlapping sites on human IgG." Journal of immunology (Baltimore, Md.: 1950) 147.8 (1991):2657-2662.
MacCallum et al., "Antibody-antigen interactions: contact analysis and binding site topography," Journal of Molecular Biology, 262:732-745 (1996).
McGonigal, et al., "C1q-targeted inhibition of the classical complement pathway prevents injury in a novel mouse model of acute motor axonal neuropathy," Acta Neuropathologica Comm, 9(3): 729 (2016).
McGreer et al., "The future use of complement inhibitors for the treatment of neurological diseases," Drugs, 55(6):739-46 (1998).
Morgan et al., "The role of complement disorders of the nervous system," Immunopharmacology, 38:43-50 (1997).
Padlan et al., "Structure of an antibody-antigen complex: crystal structure of the HyHEL-10 Fab-lysozyme complex," PNAS, 86:5938-5942 (1989).
Pardridge et al., "Reengineering Biopharmaceuticals for Targeted Delivery Across the Blood-Brain Barrier," Methods in Enzymology, Academic Press, US, 503: 269-292 (Jan. 1, 2012).
Pascalis et al., "Grafting of "Abbreviated" Complementarity-Determining Regions Containing Specificity-Determining Residues Essential for Ligand Contact to Engineer a Less Immunogenic Humanized Monoclonal Antibody," Journal of Immunology, 169: 3076-3084 (2002).
Pearson, "An Introduction to Sequence Similarity ("Homology") Searching," Current Protocols in Bioinformatics, 42(1):1-9 (2013).
Perrin et al., "Multimodal Techniques for Diagnosis and Prognosis of Alzheimer's disease," Nature, 461(7266): 916-922 (Oct. 15, 2009).
Phieler et al., "The role of the complement system in metabolic organs and metabilic diseases," Seminars in Immunology, 25(1):47-53 (2013).
Phuan et al., "C1q-targeted monoclonal antibody prevents complement dependent cytotoxicity and neuropathology in in vitro and mouse models of neuromyelitis optica," Acta Neuropathol, 125(6):829-40 (2013).
Potlukova et al., "Complement component c1q and anti☐c1q antibodies in theory and in clinical practice," Scandinavian Journal of Immunology, 67:423-430 (2008).
Prince; "Biomarkers for diagnosing and monitoring autoimmune diseases," Biomarkers, 10(Supplement 1): S44-S49 (2005).
Rader, "Overview on Concepts and Applications of Fab Antibody Fragments," Current Protocols in Protein Science, 6.9. 1-6.9. 14 (2009).
Reddy et al., "Elimination of Fc Receptor-Dependent Effector Functions of a Modified IgG4 Monoclonal Antibody to Human CD4," J Immunol, 164(4): 1925-1933 (2000).
Reeck et al., "'Homology' in Proteins and Nucleic Acids: A Terminology Muddle and a Way out of it," Cell, 50: 667 (1987).
Rodrigo et al., "Antibody Fragments and Their Purification by Protein L Affinity Chromatography," Antibodies, 4:259-277 (2015).
Roos et al., "Specific inhibition of the classical complement pathway by C1q-binding peptides," J Immunol, 167(12):7052-9 (2001).
Rudikoff et al., "Single amino acid substitution altering antigen-binding specificity," Proc. Natl. Acad. Sci. USA, 79: 1979-1983 (1982).
Sahu et al., "Complement inhibitors: a resurgent concept in anti-inflammatory therapeutics," Immunopharmacology, 49(1-2):133-48 (2000).
Stephan et al., "A dramatic increase of C1q protein in the CNS during normal aging," J Neurosci, 33(33):13460-13474 (2013).
Supplementary European Search Report for European Application No. EP 14 82 2330 mailed Nov. 15, 2016.
Tradtrantip et al., "Enzymatic deglycosylation converts pathogenic neuromyelitis optica anti-aquaporin-4 IgG into therapeutic antibody," Ann Neurol, 73(1):77-85 (2013).
Tsumura et al., "Feasibility Study of the Fab Fragment of a Monoclonal Antibody Against Tissue Factor as a Diagnostic Tool," Int J Oncol, 47(6): 2107-2114 (2015).
Tuzun et al., "Targeting Classical Complement Pathway to Treat Complement Mediated Autoimmune Diseases," Current Topics in Complement II, Springer US, Jul. 2, 20086. p. 254-261 [online].
Vajdos et al., "Comprehensive functional maps of the antigen-binding site of an anti-ErbB2 antibody obtained with shotgun scanning mutagenesis," Journal of molecular biology, 320:415-428 (2002).
Veerhuis et al., "Complement in the brain," Molecular Immunology, 48:1592-1603 (2011).
Vickers, "A vaccine against Alzheimer's disease: developments to date," Drugs Aging, 19(7):487-494 (2002).
Wu et al., "Humanization of a murine monoclonal antibody by simultaneous optimization of framework and CDR residues1," Journal of Molecular Biology, 294:151-162 (1999).
Cho et al., "Emerging Roles of Complement Protein C1q in Neurogeneration" Aging and Disease, vol. 10, No. 3, p. 652-663 (2019).
Dejanovic et al., "Compliment C1q-dependent excitatory and inhibitory synapse elimination by astrocytes and microglia in Alzheimer's disease mouse models" Nature Aging, vol. 2, p. 837-850 (2022).
Extended European Search Report for EP Application No. 23174927.6 dated Oct. 31, 2023.
Extended European Search Report for EP Application No. 23197405.6 dated Feb. 28, 2024.
Shang et al., "The Effect of Natural Autoantibodies on the Elimination of Apoptotic Cells", Medical Recapitulate, (2007) 13(17): 1283-1285.
Tuzun et al., "Pros and cons of treating murine myasthenia gravis with anti-C1q antibody." Journal of Neuroimmunology 182 (1-2) (2007): 167-176.
Yednock et al., "C1q and the classical complement cascade in geographic atrophy secondary to age-related macular degeneration" International Journal of Retina and Vitreous, vol. 8, No. 79 (2022).
Extended European Search Report for EP Application No. 21901508.8 dated Apr. 11, 2025.

* cited by examiner

SEQUENCE LISTING

```
Sequence total quantity: 33
SEQ ID NO: 1               moltype = AA  length = 214
FEATURE                    Location/Qualifiers
source                     1..214
                           mol_type = protein
                           organism = synthetic construct
SEQUENCE: 1
DVQITQSPSS LSASLGERAT INCRASKSIN KYLAWYQQKP GKAPKLLIYS GSTLQSGIPA    60
RFSGSGSGTD FTLTISSLEP EDFAMYYCQQ HNEYPLTFGQ GTKLEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                                214

SEQ ID NO: 2               moltype = AA  length = 448
FEATURE                    Location/Qualifiers
source                     1..448
                           mol_type = protein
                           organism = synthetic construct
SEQUENCE: 2
QVQLVQSGAE LKKPGASVKV SCKSSGYHFT SYWMHWVKQA PGQGLEWIGV IHPNSGSINY    60
NEKFESRVTI TVDKSTSTAY MELSSLRSED TAVYYCAGER DSTEVLPMDY WGQGTTVTVS   120
SASTKGPSVF PLAPCSRSTS ESTAALGCLV KDYFPEPVTV SWNSGALTSG VHTFPAVLQS   180
SGLYSLSSVV TVPSSSLGTK TYTCNVDHKP SNTKVDKRVE SKYGPPCPPC PAPEFEGGPS   240
VFLFPPKPKD TLMISRTPEV TCVVVDVSQE DPEVQFNWYV DGVEVHNAKT KPREEQFNST   300
YRVVSVLTVL HQDWLNGKEY KCKVSNKGLP SSIEKTISKA KGQPREPQVY TLPPSQEEMT   360
KNQVSLWCLV KGFYPSDIAV EWESNGQPEN NYKTTPPVLD SDGSFFLYSR LTVDKSRWQE   420
GNVFSCSVMH EALHNHYTQK SLSLSLGK                                       448

SEQ ID NO: 3               moltype = AA  length = 229
FEATURE                    Location/Qualifiers
source                     1..229
                           mol_type = protein
                           organism = synthetic construct
SEQUENCE: 3
ESKYGPPCPP CPAPEFEGGP SVFLFPPKPK DTLMISRTPE VTCVVVDVSQ EDPEVQFNWY    60
VDGVEVHNAK TKPREEQFNS TYRVVSVLTV LHQDWLNGKE YKCKVSNKGL PSSIEKTISK   120
AKGQPREPQV YTLPPSQEEM TKNQVSLSCA VKGFYPSDIA VEWESNGQPE NNYKTTPPVL   180
DSDGSFFLVS RLTVDKSRWQ EGNVFSCSVM HEALHNHYTQ KSLSLSLGK                229

SEQ ID NO: 4               moltype = AA  length = 11
FEATURE                    Location/Qualifiers
source                     1..11
                           mol_type = protein
                           organism = synthetic construct
SEQUENCE: 4
RASKSINKYL A                                                          11

SEQ ID NO: 5               moltype = AA  length = 7
FEATURE                    Location/Qualifiers
source                     1..7
                           mol_type = protein
```

```
                                organism = synthetic construct
SEQUENCE: 5
SGSTLQS                                                                          7

SEQ ID NO: 6            moltype = AA  length = 9
FEATURE                 Location/Qualifiers
source                  1..9
                        mol_type = protein
                        organism = synthetic construct
SEQUENCE: 6
QQHNEYPLT                                                                        9

SEQ ID NO: 7            moltype = AA  length = 10
FEATURE                 Location/Qualifiers
source                  1..10
                        mol_type = protein
                        organism = synthetic construct
SEQUENCE: 7
GYHFTSYWMH                                                                      10

SEQ ID NO: 8            moltype = AA  length = 17
FEATURE                 Location/Qualifiers
source                  1..17
                        mol_type = protein
                        organism = synthetic construct
SEQUENCE: 8
VIHPNSGSIN YNEKFES                                                              17

SEQ ID NO: 9            moltype = AA  length = 12
FEATURE                 Location/Qualifiers
source                  1..12
                        mol_type = protein
                        organism = synthetic construct
SEQUENCE: 9
ERDSTEVLPM DY                                                                   12

SEQ ID NO: 10           moltype = AA  length = 107
FEATURE                 Location/Qualifiers
source                  1..107
                        mol_type = protein
                        organism = synthetic construct
SEQUENCE: 10
DVQITQSPSY LAASPGETIT INCRASKSIN KYLAWYQEKP GKTNKLLIYS GSTLQSGIPS                60
RFSGSGSGTD FTLTISSLEP EDFAMYYCQQ HNEYPLTFGA GTKLELK                            107

SEQ ID NO: 11           moltype = AA  length = 107
FEATURE                 Location/Qualifiers
source                  1..107
                        mol_type = protein
                        organism = synthetic construct
SEQUENCE: 11
DVQITQSPSY LAASLGERAT INCRASKSIN KYLAWYQQKP GKTNKLLIYS GSTLQSGIPA                60
RFSGSGSGTD FTLTISSLEP EDFAMYYCQQ HNEYPLTFGQ GTKLEIK                            107

SEQ ID NO: 12           moltype = AA  length = 107
FEATURE                 Location/Qualifiers
source                  1..107
                        mol_type = protein
                        organism = synthetic construct
SEQUENCE: 12
DVQITQSPSS LSASLGERAT INCRASKSIN KYLAWYQQKP GKANKLLIYS GSTLQSGIPA                60
RFSGSGSGTD FTLTISSLEP EDFAMYYCQQ HNEYPLTFGQ GTKLEIK                            107

SEQ ID NO: 13           moltype = AA  length = 107
FEATURE                 Location/Qualifiers
source                  1..107
                        mol_type = protein
                        organism = synthetic construct
SEQUENCE: 13
DVQITQSPSS LSASLGERAT INCRASKSIN KYLAWYQQKP GKAPKLLIYS GSTLQSGIPA                60
RFSGSGSGTD FTLTISSLEP EDFAMYYCQQ HNEYPLTFGQ GTKLEIK                            107

SEQ ID NO: 14           moltype = AA  length = 107
FEATURE                 Location/Qualifiers
source                  1..107
                        mol_type = protein
                        organism = synthetic construct
SEQUENCE: 14
DIQLTQSPSS LSASLGERAT INCRASKSIN KYLAWYQQKP GKAPKLLIYS GSTLQSGIPA                60
```

```
RFSGSGSGTD FTLTISSLEP EDFAMYYCQQ HNEYPLTFGQ GTKLEIK              107

SEQ ID NO: 15           moltype = AA   length = 121
FEATURE                 Location/Qualifiers
source                  1..121
                        mol_type = protein
                        organism = synthetic construct
SEQUENCE: 15
QVQLQQPGAE LVKPGASVKL SCKSSGYHFT SYWMHWVKQR PGQGLEWIGV IHPNSGSINY  60
NEKFESKATL TVDKSSSTAY MQLSSLTSED SAVYYCAGER DSTEVLPMDY WGQGTSVTVS 120
S                                                                121

SEQ ID NO: 16           moltype = AA   length = 121
FEATURE                 Location/Qualifiers
source                  1..121
                        mol_type = protein
                        organism = synthetic construct
SEQUENCE: 16
QVQLVQSGAE LKKPGASVKV SCKSSGYHFT SYWMHWVKQA PGQGLEWIGV IHPNSGSINY  60
NEKFESKATI TVDKSTSTAY MQLSSLTSED SAVYYCAGER DSTEVLPMDY WGQGTSVTVS 120
S                                                                121

SEQ ID NO: 17           moltype = AA   length = 121
FEATURE                 Location/Qualifiers
source                  1..121
                        mol_type = protein
                        organism = synthetic construct
SEQUENCE: 17
QVQLVQSGAE LKKPGASVKV SCKSSGYHFT SYWMHWVKQA PGQGLEWIGV IHPNSGSINY  60
NEKFESRATI TVDKSTSTAY MELSSLRSED TAVYYCAGER DSTEVLPMDY WGQGTTVTVS 120
S                                                                121

SEQ ID NO: 18           moltype = AA   length = 121
FEATURE                 Location/Qualifiers
source                  1..121
                        mol_type = protein
                        organism = synthetic construct
SEQUENCE: 18
QVQLVQSGAE LKKPGASVKV SCKSSGYHFT SYWMHWVKQA PGQGLEWIGV IHPNSGSINY  60
NEKFESRVTI TVDKSTSTAY MELSSLRSED TAVYYCAGER DSTEVLPMDY WGQGTTVTVS 120
S                                                                121

SEQ ID NO: 19           moltype = AA   length = 121
FEATURE                 Location/Qualifiers
source                  1..121
                        mol_type = protein
                        organism = synthetic construct
SEQUENCE: 19
QVQLVQSGAE LKKPGASVKV SCKSSGYHFT SYWMHWVRQA PGQGLEWIGV IHPNSGSINY  60
NEKFESRVTI TVDKSTSTAY MELSSLRSED TAVYYCAGER DSTEVLPMDY WGQGTTVTVS 120
S                                                                121

SEQ ID NO: 20           moltype = AA   length = 448
FEATURE                 Location/Qualifiers
source                  1..448
                        mol_type = protein
                        organism = synthetic construct
SEQUENCE: 20
QVQLVQSGAE LKKPGASVKV SCKSSGYHFT SYWMHWVKQA PGQGLEWIGV IHPNSGSINY  60
NEKFESRVTI TVDKSTSTAY MELSSLRSED TAVYYCAGER DSTEVLPMDY WGQGTTVTVS 120
SASTKGPSVF PLAPCSRSTS ESTAALGCLV KDYFPEPVTV SWNSGALTSG VHTFPAVLQS 180
SGLYSLSSVV TVPSSSLGTK TYTCNVDHKP SNTKVDKRVE SKYGPPCPPC PAPEFLGGPS 240
VFLFPPKPKD TLMISRTPEV TCVVVDVSQE DPEVQFNWYV DGVEVHNAKT KPREEQFNST 300
YRVVSVLTVL HQDWLNGKEY KCKVSNKGLP SSIEKTISKA KGQPREPQVY TLPPSQEEMT 360
KNQVSLWCLV KGFYPSDIAV EWESNGQPEN NYKTTPPVLD SDGSFFLYSR LTVDKSRWQE 420
GNVFSCSVMH EALHNHYTQK SLSLSLGK                                   448

SEQ ID NO: 21           moltype = AA   length = 451
FEATURE                 Location/Qualifiers
source                  1..451
                        mol_type = protein
                        organism = synthetic construct
SEQUENCE: 21
QVQLVQSGAE LKKPGASVKV SCKSSGYHFT SYWMHWVKQA PGQGLEWIGV IHPNSGSINY  60
NEKFESRVTI TVDKSTSTAY MELSSLRSED TAVYYCAGER DSTEVLPMDY WGQGTTVTVS 120
SASTKGPSVF PLAPSSKSTS GGTAALGCLV KDYFPEPVTV SWNSGALTSG VHTFPAVLQS 180
SGLYSLSSVV TVPSSSLGTQ TYICNVNHKP SNTKVDKKVE PKSCDKTHTC PPCPAPEAAG 240
GPSVFLFPPK PKDTLMISRT PEVTCVVVDV SHEDPEVKFN WYVDGVEVHN AKTKPREEQY 300
NSTYRVVSVL TVLHQDWLNG KEYKCKVSNK ALPAPIEKTI SKAKGQPREP QVYTLPPSRD 360
```

```
ELTKNQVSLW CLVKGFYPSD IAVEWESNGQ PENNYKTTPP VLDSDGSFFL YSKLTVDKSR    420
WQQGNVFSCS VMHEALHNHY TQKSLSLSPG K                                  451

SEQ ID NO: 22           moltype = AA  length = 227
FEATURE                 Location/Qualifiers
source                  1..227
                        mol_type = protein
                        organism = synthetic construct
SEQUENCE: 22
DKTHTCPPCP APEAAGGPSV FLFPPKPKDT LMISRTPEVT CVVVDVSHED PEVKFNWYVD     60
GVEVHNAKTK PREEQYNSTY RVVSVLTVLH QDWLNGKEYK CKVSNKALPA PIEKTISKAK    120
GQPREPQVYT LPPSRDELTK NQVSLSCAVK GFYPSDIAVE WESNGQPENN YKTTPPVLDS    180
DGSFFLVSKL TVDKSRWQQG NVFSCSVMHE ALHNHYTQKS LSLSPGK                  227

SEQ ID NO: 23           moltype = AA  length = 448
FEATURE                 Location/Qualifiers
source                  1..448
                        mol_type = protein
                        organism = synthetic construct
SEQUENCE: 23
QVQLVQSGAE LKKPGASVKV SCKSSGYHFT SYWMHWVKQA PGQGLEWIGV IHPNSGSINY     60
NEKFESRVTI TVDKSTSTAY MELSSLRSED TAVYYCAGKR KSTKVLPMDY WGQGTTVTVS    120
SASTKGPSVF PLAPCSRSTS ESTAALGCLV KDYFPEPVTV SWNSGALTSG VHTFPAVLQS    180
SGLYSLSSVV TVPSSSLGTK TYTCNVDHKP SNTKVDKRVE SKYGPPCPPC PAPEFEGGPS    240
VFLFPPKPKD TLMISRTPEV TCVVVDVSQE DPEVQFNWYV DGVEVHNAKT KPREEQFNST    300
YRVVSVLTVL HQDWLNGKEY KCKVSNKGLP SSIEKTISKA KGQPREPQVY TLPPSQEEMT    360
KNQVSLSCAV KGFYPSDIAV EWESNGQPEN NYKTTPPVLD SDGSFFLVSR LTVDKSRWQE    420
GNVFSCSVMH EALHNHYTQK SLSLSLGK                                      448

SEQ ID NO: 24           moltype = AA  length = 448
FEATURE                 Location/Qualifiers
source                  1..448
                        mol_type = protein
                        organism = synthetic construct
SEQUENCE: 24
QVQLVQSGAE LKKPGASVKV SCKSSGYHFT SYWMKWVKQA PGQGLEWIGV IHPNSGSINY     60
NKKFESRVTI TVDKSTSTAY MELSSLRSED TAVYYCAGAR KSTEVLPMDY WGQGTTVTVS    120
SASTKGPSVF PLAPCSRSTS ESTAALGCLV KDYFPEPVTV SWNSGALTSG VHTFPAVLQS    180
SGLYSLSSVV TVPSSSLGTK TYTCNVDHKP SNTKVDKRVE SKYGPPCPPC PAPEFEGGPS    240
VFLFPPKPKD TLMISRTPEV TCVVVDVSQE DPEVQFNWYV DGVEVHNAKT KPREEQFNST    300
YRVVSVLTVL HQDWLNGKEY KCKVSNKGLP SSIEKTISKA KGQPREPQVY TLPPSQEEMT    360
KNQVSLSCAV KGFYPSDIAV EWESNGQPEN NYKTTPPVLD SDGSFFLVSR LTVDKSRWQE    420
GNVFSCSVMH EALHNHYTQK SLSLSLGK                                      448

SEQ ID NO: 25           moltype = AA  length = 448
FEATURE                 Location/Qualifiers
source                  1..448
                        mol_type = protein
                        organism = synthetic construct
SEQUENCE: 25
QVQLVQSGAE LKKPGASVKV SCKSSGYHFT SYWMHWVKQA PGQGLEWIGV IHPNSGSINY     60
NKKFKSRVTI TVDKSTSTAY MELSSLRSED TAVYYCAGKR KSTKVLPMDY WGQGTTVTVS    120
SASTKGPSVF PLAPCSRSTS ESTAALGCLV KDYFPEPVTV SWNSGALTSG VHTFPAVLQS    180
SGLYSLSSVV TVPSSSLGTK TYTCNVDHKP SNTKVDKRVE SKYGPPCPPC PAPEFEGGPS    240
VFLFPPKPKD TLMISRTPEV TCVVVDVSQE DPEVQFNWYV DGVEVHNAKT KPREEQFNST    300
YRVVSVLTVL HQDWLNGKEY KCKVSNKGLP SSIEKTISKA KGQPREPQVY TLPPSQEEMT    360
KNQVSLSCAV KGFYPSDIAV EWESNGQPEN NYKTTPPVLD SDGSFFLVSR LTVDKSRWQE    420
GNVFSCSVMH EALHNHYTQK SLSLSLGK                                      448

SEQ ID NO: 26           moltype = AA  length = 448
FEATURE                 Location/Qualifiers
source                  1..448
                        mol_type = protein
                        organism = synthetic construct
SEQUENCE: 26
QVQLVQSGAE LKKPGASVKV SCKSSGYHFT SYWMHWVKQA PGQGLEWIGV IHPNSGSINY     60
NEKFESRVTI TVDKSTSTAY MELSSLRSED TAVYYCAGAR ASTAVLPMDY WGQGTTVTVS    120
SASTKGPSVF PLAPCSRSTS ESTAALGCLV KDYFPEPVTV SWNSGALTSG VHTFPAVLQS    180
SGLYSLSSVV TVPSSSLGTK TYTCNVDHKP SNTKVDKRVE SKYGPPCPPC PAPEFEGGPS    240
VFLFPPKPKD TLMISRTPEV TCVVVDVSQE DPEVQFNWYV DGVEVHNAKT KPREEQFNST    300
YRVVSVLTVL HQDWLNGKEY KCKVSNKGLP SSIEKTISKA KGQPREPQVY TLPPSQEEMT    360
KNQVSLSCAV KGFYPSDIAV EWESNGQPEN NYKTTPPVLD SDGSFFLVSR LTVDKSRWQE    420
GNVFSCSVMH EALHNHYTQK SLSLSLGK                                      448

SEQ ID NO: 27           moltype = AA  length = 229
FEATURE                 Location/Qualifiers
source                  1..229
                        mol_type = protein
                        organism = synthetic construct
```

```
SEQUENCE: 27
ESKYGPPCPP CPAPEFLGGP SVFLFPPKPK DTLMISRTPE VTCVVVDVSQ EDPEVQFNWY    60
VDGVEVHNAK TKPREEQFNS TYRVVSVLTV LHQDWLNGKE YKCKVSNKGL PSSIEKTISK   120
AKGQPREPQV YTLPPSQEEM TKNQVSLSCA VKGFYPSDIA VEWESNGQPE NNYKTTPPVL   180
DSDGSFFLVS RLTVDKSRWQ EGNVFSCSVM HEALHNHYTQ KSLSLSLGK              229

SEQ ID NO: 28           moltype = AA  length = 448
FEATURE                 Location/Qualifiers
source                  1..448
                        mol_type = protein
                        organism = synthetic construct
SEQUENCE: 28
QVQLVQSGAE LKKPGASVKV SCKSSGYHFT SYWMHWVKQA PGQGLEWIGV IHPNSGSINY    60
NEKFESRVTI TVDKSTSTAY MELSSLRSED TAVYYCAGKR KSTKVLPMDY WGQGTTVTVS   120
SASTKGPSVF PLAPCSRSTS ESTAALGCLV KDYFPEPVTV SWNSGALTSG VHTFPAVLQS   180
SGLYSLSSVV TVPSSSLGTK TYTCNVDHKP SNTKVDKRVE SKYGPPCPPC PAPEFLGGPS   240
VFLFPPKPKD TLMISRTPEV TCVVVDVSQE DPEVQFNWYV DGVEVHNAKT KPREEQFNST   300
YRVVSVLTVL HQDWLNGKEY KCKVSNKGLP SSIEKTISKA KGQPREPQVY TLPPSQEEMT   360
KNQVSLSCAV KGFYPSDIAV EWESNGQPEN NYKTTPPVLD SDGSFFLVSR LTVDKSRWQE   420
GNVFSCSVMH EALHNHYTQK SLSLSLGK                                     448

SEQ ID NO: 29           moltype = AA  length = 448
FEATURE                 Location/Qualifiers
source                  1..448
                        mol_type = protein
                        organism = synthetic construct
SEQUENCE: 29
QVQLVQSGAE LKKPGASVKV SCKSSGYHFT SYWMKWVKQA PGQGLEWIGV IHPNSGSINY    60
NKKFESRVTI TVDKSTSTAY MELSSLRSED TAVYYCAGAR KSTEVLPMDY WGQGTTVTVS   120
SASTKGPSVF PLAPCSRSTS ESTAALGCLV KDYFPEPVTV SWNSGALTSG VHTFPAVLQS   180
SGLYSLSSVV TVPSSSLGTK TYTCNVDHKP SNTKVDKRVE SKYGPPCPPC PAPEFLGGPS   240
VFLFPPKPKD TLMISRTPEV TCVVVDVSQE DPEVQFNWYV DGVEVHNAKT KPREEQFNST   300
YRVVSVLTVL HQDWLNGKEY KCKVSNKGLP SSIEKTISKA KGQPREPQVY TLPPSQEEMT   360
KNQVSLSCAV KGFYPSDIAV EWESNGQPEN NYKTTPPVLD SDGSFFLVSR LTVDKSRWQE   420
GNVFSCSVMH EALHNHYTQK SLSLSLGK                                     448

SEQ ID NO: 30           moltype = AA  length = 448
FEATURE                 Location/Qualifiers
source                  1..448
                        mol_type = protein
                        organism = synthetic construct
SEQUENCE: 30
QVQLVQSGAE LKKPGASVKV SCKSSGYHFT SYWMHWVKQA PGQGLEWIGV IHPNSGSINY    60
NKKFKSRVTI TVDKSTSTAY MELSSLRSED TAVYYCAGKR KSTKVLPMDY WGQGTTVTVS   120
SASTKGPSVF PLAPCSRSTS ESTAALGCLV KDYFPEPVTV SWNSGALTSG VHTFPAVLQS   180
SGLYSLSSVV TVPSSSLGTK TYTCNVDHKP SNTKVDKRVE SKYGPPCPPC PAPEFLGGPS   240
VFLFPPKPKD TLMISRTPEV TCVVVDVSQE DPEVQFNWYV DGVEVHNAKT KPREEQFNST   300
YRVVSVLTVL HQDWLNGKEY KCKVSNKGLP SSIEKTISKA KGQPREPQVY TLPPSQEEMT   360
KNQVSLSCAV KGFYPSDIAV EWESNGQPEN NYKTTPPVLD SDGSFFLVSR LTVDKSRWQE   420
GNVFSCSVMH EALHNHYTQK SLSLSLGK                                     448

SEQ ID NO: 31           moltype = AA  length = 448
FEATURE                 Location/Qualifiers
source                  1..448
                        mol_type = protein
                        organism = synthetic construct
SEQUENCE: 31
QVQLVQSGAE LKKPGASVKV SCKSSGYHFT SYWMHWVKQA PGQGLEWIGV IHPNSGSINY    60
NEKFESRVTI TVDKSTSTAY MELSSLRSED TAVYYCAGAR ASTAVLPMDY WGQGTTVTVS   120
SASTKGPSVF PLAPCSRSTS ESTAALGCLV KDYFPEPVTV SWNSGALTSG VHTFPAVLQS   180
SGLYSLSSVV TVPSSSLGTK TYTCNVDHKP SNTKVDKRVE SKYGPPCPPC PAPEFLGGPS   240
VFLFPPKPKD TLMISRTPEV TCVVVDVSQE DPEVQFNWYV DGVEVHNAKT KPREEQFNST   300
YRVVSVLTVL HQDWLNGKEY KCKVSNKGLP SSIEKTISKA KGQPREPQVY TLPPSQEEMT   360
KNQVSLSCAV KGFYPSDIAV EWESNGQPEN NYKTTPPVLD SDGSFFLVSR LTVDKSRWQE   420
GNVFSCSVMH EALHNHYTQK SLSLSLGK                                     448

SEQ ID NO: 32           moltype = AA  length = 327
FEATURE                 Location/Qualifiers
source                  1..327
                        mol_type = protein
                        organism = synthetic construct
SEQUENCE: 32
ASTKGPSVFP LAPCSRSTSE STAALGCLVK DYFPEPVTVS WNSGALTSGV HTFPAVLQSS    60
GLYSLSSVVT VPSSSLGTKT YTCNVDHKPS NTKVDKRVES KYGPPCPSCP APEFLGGPSV   120
FLFPPKPKDT LMISRTPEVT CVVVDVSQED PEVQFNWYVD GVEVHNAKTK PREEQFNSTY   180
RVVSVLTVLH QDWLNGKEYK CKVSNKGLPS SIEKTISKAK GQPREPQVYT LPPSQEEMTK   240
NQVSLTCLVK GFYPSDIAVE WESNGQPENN YKTTPPVLDS DGSFFLYSRL TVDKSRWQEG   300
NVFSCSVMHE ALHNHYTQKS LSLSLGK                                      327
```

```
SEQ ID NO: 33          moltype = AA  length = 330
FEATURE                Location/Qualifiers
source                 1..330
                       mol_type = protein
                       organism = synthetic construct
SEQUENCE: 33
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPELLGG  120
PSVFLFPPKP KDTLMISRTP EVTCVVVDVS HEDPEVKFNW YVDGVEVHNA KTKPREEQYN  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHNHYT QKSLSLSPGK                                  330
```

ANTI-COMPLEMENT FACTOR C1q ANTIBODIES WITH SINGLE BINDING ARMS AND USES THEREOF

RELATED APPLICATIONS

This patent application claims priority to U.S. Provisional Patent Application No. 63/288,883, filed Dec. 13, 2021, and U.S. Provisional Patent Application No. 63/288,885, filed Dec. 13, 2021, each of which is hereby incorporated by reference in its entirety.

REFERENCE TO A SEQUENCE LISTING XML

This application contains a Sequence Listing which has been submitted electronically in XML format. The Sequence Listing XML is incorporated herein by reference. Said XML file, created on Jan. 25, 2023, is named ANH-02225_SL.xml and is 37,052 bytes in size.

BACKGROUND

Acute or chronic inflammation is a common component of many clinical disorders and the complement system has been associated with a growing number of inflammatory conditions that include degenerative diseases, cancer and transplant rejection. The complement system acts as a sensor of pathogens, recognizes diseased and damaged host cells, and closely collaborates with other immune and defense systems to eliminate potential danger. However, insufficient, excessive, or poorly controlled complement activation can tip the balance between health and disease and lead to self-attack on host cells. Such an immune imbalance may fuel a cycle between complement, inflammatory cells, and tissue damage that recreates inflammatory stimulators rather than resolving them and exacerbates clinical complications. Inappropriate activation of complement has been linked to many autoimmune, inflammatory, and neurodegenerative diseases, as well as ischemia-reperfusion injury and cancer. Therefore, therapeutic modulation of complement activity emerges as an attractive target for upstream inhibition of inflammatory processes.

SUMMARY

The present disclosure is generally directed to anti-C1q single-arm antibodies and uses thereof.

Antibodies that inhibit the complement pathway can be used for treating and/or preventing a disease associated with complement activation. The present invention is based, at least in part, on the discovery that full-length anti-C1q antibodies can induce cross-linking of C1q by bridging separate C1q molecules, bringing them together and triggering solution phase C1q activation. Due to C1q crosslinking, intravenous dosing with full-length anti-C1q antibodies can cause infusion related reactions (IRR) known as complement activation-related pseudoallergy (CARPA). The present invention is based, at least in part, on the discovery that, in contrast with full length anti-C1q antibodies, anti-C1q antibodies with a single antigen binding arm (e.g., single-arm antibodies) do not cross-link C1q and do not induce solution phase complement activation in vitro and/or in vivo, and reduce the likelihood of causing infusion-related reactions. Single-arm antibodies have the same or greater pharmacokinetic activity as full-length antibodies but without crosslinking C1q. The single-arm antibodies also have the same or greater half-life as compared to their corresponding full-length antibody. Anti-C1q Fab fragments also do not cross-link C1q and do not induce solution phase complement activation in vitro and/or in vivo, and do not cause infusion-related reactions. However, these anti-C1q Fab fragments have lower pharmacokinetic activity and shorter half-lives as compared to the anti-C1q single-arm antibodies disclosed herein. Antibodies with a single antigen binding arm (e.g., single-arm antibodies) directed towards the inhibition of different components of the complement cascade may be advantageous for preventative, diagnostic, and therapeutic clinical applications.

In certain aspects, the present disclosure provides an antibody that binds to a protein in the complement cascade, such as a C1q protein. The antibody that binds to C1q comprises a single C1q antigen-binding arm and an Fc region. The single C1q antigen-binding arm may comprise a light chain variable domain and a heavy chain variable domain. The Fc region may comprise a complex of a first and a second Fc polypeptide. The Fc region may comprise a Fcγ receptor binding site mutation. The antibody may be of the IgG4 class. In some embodiments, one but not both of the Fc polypeptide is an N-terminally truncated heavy chain. In some embodiments, the Fcγ receptor is FcγRI, FcγRII, or FcγRIII, preferably FcγRI. The Fcγ receptor binding site mutation may comprise a IgG4 L115E mutation.

In some embodiments, the antibody comprises only a single binding site for C1q; and/or the antibody does not crosslink C1q to form multi-C1q complexes. The formation of immune complexes and crosslinking C1q may be measured by any suitable method known in the art, e.g., an ELISA assay as described in Example 3. In some embodiments, the antibody does not induce solution phase activation of C1q. The solution phase activation of C1q may be measured by immune complex formation (e.g., C1q-C3 or C1q-C4 conjugates) or release of complement activation products (e.g., but not limited to, C1s-C1 inh, C1r-C1inh, C2a, C2b, C4a, C4b, C3a, C3b, C5a or C5b). In some embodiments, the antibody does not induce cell surface activation of C1q. The cell surface activation of C1q may be measured by immune complex formation (e.g., but not limited to, C1q-C3 or C1q-C4 conjugates) or release of complement activation products (e.g., C1s-C1 inh, C1r-C1inh, C2a, C2b, C4a, C4b, C3a, C3b, C5a or C5b). In some embodiments, the antibody induces fewer infusion-related reactions (IRRs) in subject as compared to its corresponding full-length antibody; the antibody induces fewer CTCAE Grade 5 IRRs in a subject as compared to its corresponding full-length antibody; the antibody induces fewer CTCAE Grade 4 IRRs in a subject as compared to its corresponding full-length antibody; the antibody induces fewer CTCAE Grade 3 IRRs in a subject as compared to its corresponding full-length antibody; the antibody induces fewer CTCAE Grade 2 IRRs in a subject as compared to its corresponding full-length antibody; the antibody induces fewer CTCAE Grade 1 IRRs in a subject as compared to its corresponding full-length antibody; the antibody does not cause infusion-related reactions (IRRs) in subject; the antibody has minimal impact on the heart rate of a subject; the antibody has minimal impact on the mean arterial pressure (MAP) of a subject; the antibody has minimal impact on C3a levels; the antibody does not cause rise in C3a levels; the antibody cannot bridge two C1q molecules; the antibody has the same or greater pharmacokinetic activity as compared to its corresponding full-length antibody; and/or the antibody has the same or greater half-life as compared to its corresponding full-length antibody. In some embodiments, the N-terminally truncated heavy chain lacks a heavy chain variable domain, preferably the N-terminally truncated heavy chain lacks a heavy chain constant domain 1.

In some embodiments, the single antigen-binding arm comprises a light chain variable domain comprising an HVR-L1 having the amino acid sequence of SEQ ID NO: 4, an HVR-L2 having the amino acid of SEQ ID NO: 5, and an HVR-L3 having the amino acid of SEQ ID NO: 6. The single antigen-binding arm may comprise a heavy chain variable domain comprising an HVR-H1 having the amino acid sequence of SEQ ID NO: 7, an HVR-H2 having the amino acid of SEQ ID NO: 8, and an HVR-H3 having the amino acid of SEQ ID NO: 9. In some embodiments, the antibody comprises a light chain comprising an amino acid sequence with at least about 85% homology to the amino acid sequence of SEQ ID NO: 1 and wherein the light chain comprises an HVR-L1 having the amino acid sequence of SEQ ID NO: 4, an HVR-L2 having the amino acid of SEQ ID NO: 5, and an HVR-L3 having the amino acid of SEQ ID NO: 6; preferably the light chain comprises an amino acid sequence of SEQ ID NO: 1. In some embodiments, the single-arm antibody comprises a light chain variable domain comprising an amino acid sequence with at least about 85% homology to the amino acid sequence of any one of SEQ ID NOs: 10-14 and wherein the light chain variable domain comprises an HVR-L1 having the amino acid sequence of SEQ ID NO: 4, an HVR-L2 having the amino acid of SEQ ID NO: 5, and an HVR-L3 having the amino acid of SEQ ID NO: 6; preferably the light chain variable domain comprises an amino acid sequence of any one of SEQ ID NOs: 10-14.

In some embodiments, the antibody comprises a first and a second heavy chain, wherein the first heavy chain comprises the heavy chain variable domain comprising an amino acid sequence with at least about 85% homology to the amino acid sequence of any one of SEQ ID NOs: 15-19 and wherein the heavy chain variable domain comprises an HVR-H1 having the amino acid sequence of SEQ ID NO: 7, an HVR-H2 having the amino acid of SEQ ID NO: 8, and an HVR-H3 having the amino acid of SEQ ID NO: 9; preferably the heavy chain variable domain comprises an amino acid sequence of any one of SEQ ID NOs: 15-19. In some embodiments, the antibody comprises a first and a second heavy chain, wherein the first heavy chain comprises the amino acid sequence of SEQ ID NO: 2. In some embodiments, the second heavy chain comprises the amino acid sequence of SEQ ID NO: 3.

In some embodiments, the antibody further comprises an inactive antigen-binding arm, wherein the inactive antigen-binding arm is incapable of binding to C1q. The Fcγ receptor may be FcγRI, FcγRII, or FcγRIII; preferably FcγRI. The Fcγ receptor binding site mutation may comprises a IgG4 L115E mutation. In some embodiments, the antibody comprises only a single binding site for C1q; the antibody does not crosslink C1q to form multi-C1q complexes; the antibody does not induce solution phase activation of C1q; the antibody does not induce cell surface activation of C1q as compared to its corresponding full-length antibody; the antibody induces fewer infusion-related reactions (IRRs) in subject as compared to its corresponding full-length antibody; the antibody induces fewer CTCAE Grade 5 IRRs in a subject as compared to its corresponding full-length antibody; the antibody induces fewer CTCAE Grade 4 IRRs in a subject as compared to its corresponding full-length antibody; the antibody induces fewer CTCAE Grade 3 IRRs in a subject as compared to its corresponding full-length antibody; the antibody induces fewer CTCAE Grade 2 IRRs in a subject as compared to its corresponding full-length antibody; the antibody induces fewer CTCAE Grade 1 IRRs in a subject as compared to its corresponding full-length antibody; the antibody does not cause infusion-related reactions (IRRs) in subject; the antibody has minimal impact on the heart rate of a subject; the antibody has minimal impact on the mean arterial pressure (MAP) of a subject; the antibody has minimal impact on C3a levels; the antibody does not cause rise in C3a levels; the antibody cannot bridge two C1q molecules; the antibody has the same or greater pharmacokinetic activity as compared to its corresponding full-length antibody; and/or the antibody has the same or greater half-life as compared to its corresponding full-length antibody.

In some embodiments, the antigen-binding arm comprises a light chain variable domain comprising an HVR-L1 having the amino acid sequence of SEQ ID NO: 4, an HVR-L2 having the amino acid of SEQ ID NO: 5, and an HVR-L3 having the amino acid of SEQ ID NO: 6. In some embodiments, the antigen-binding arm comprises a heavy chain variable domain comprising an HVR-H1 having the amino acid sequence of SEQ ID NO: 7, an HVR-H2 having the amino acid of SEQ ID NO: 8, and an HVR-H3 having the amino acid of SEQ ID NO: 9. In some embodiments, the antibody comprises a light chain comprising an amino acid sequence with at least about 85% homology to the amino acid sequence of any one of SEQ ID NOs: 1 and wherein the light chain comprises an HVR-L1 having the amino acid sequence of SEQ ID NO: 4, an HVR-L2 having the amino acid of SEQ ID NO: 5, and an HVR-L3 having the amino acid of SEQ ID NO: 6; preferably the light chain comprises an amino acid sequence of SEQ ID NO: 1. In some embodiments, the light chain variable domain comprises an amino acid sequence with at least about 85% homology to the amino acid sequence of any one of SEQ ID NOs: 10-14 and wherein the light chain variable domain comprises an HVR-L1 having the amino acid sequence of SEQ ID NO: 4, an HVR-L2 having the amino acid of SEQ ID NO: 5, and an HVR-L3 having the amino acid of SEQ ID NO: 6; preferably the light chain variable domain comprises an amino acid sequence of any one of SEQ ID NOs: 10-14.

In some embodiments, the heavy chain variable domain comprises an amino acid sequence with at least about 85% homology to the amino acid sequence of any one of SEQ ID NOs: 15-19 and wherein the heavy chain variable domain comprises an HVR-H1 having the amino acid sequence of SEQ ID NO: 7, an HVR-H2 having the amino acid of SEQ ID NO: 8, and an HVR-H3 having the amino acid of SEQ ID NO: 9; preferably the heavy chain variable domain comprises an amino acid sequence of any one of SEQ ID NOs: 15-19. In some embodiments, the antibody comprises a first and a second heavy chain, wherein the first heavy chain comprises the amino acid sequence of SEQ ID NO: 2. In some embodiments, the second heavy chain comprises the amino acid sequence of any one of SEQ ID NOs: 23-26.

In some embodiments, the antibody competitively inhibits the binding of the monoclonal antibody M1 produced by the hybridoma cell line with ATCC Accession Number PTA-120399 to human C1q or to mouse C1q. The antibody may bind to rat C1q, mouse C1q, dog C1q, rhesus C1q, cynomolgus monkey C1q, or human C1q, or combinations thereof. In some embodiments, the antibody has a dissociation constant (KD) for human C1q that ranges from 10 pM to 20 pM, or 1 pM to less than 10 pM or the antibody has a dissociation constant (KD) for mouse C1q that ranges from 1 pM to 200 pM. In some embodiments, the antibody specifically binds to and neutralizes a biological activity of C1q.

In some embodiments, the biological activity is (1) C1q binding to an autoantibody, (2) C1q binding to C1r, (3) C1q binding to C1s, (4) C1q binding to IgM, (5) C1q binding to phosphatidylserine, (6) C1q binding to pentraxin-3, (7) C1q binding to C-reactive protein (CRP), (8) C1q binding to globular C1q receptor (gC1qR), (9) C1q binding to complement receptor 1 (CR1), (10) C1q binding to beta-amyloid, (11) C1q binding to calreticulin, (12) C1q binding to apoptotic cells, or (13) C1q binding to B cells and/or the biological activity is (1) activation of the classical complement activation pathway, (2) activation of antibody and complement dependent cytotoxicity, (3) CH50 hemolysis, (4) synapse loss, (5) B-cell antibody production, (6) dendritic cell maturation, (7) T-cell proliferation, (8) cytokine production (9) microglia or macrophage activation, (10) immune complex formation, (11) phagocytosis of synapses or nerve endings, (12) activation of complement receptor 3 (CR3/C3) expressing cells or (13) neuroinflammation. CH50 hemolysis may comprise human, mouse, rat, dog, rhesus, and/or cynomolgus monkey CH50 hemolysis. The antibody may be capable of neutralizing from at least about 50%, to at least about 100% of human CH50 hemolysis; and/or may be capable of neutralizing at least 50% of human CH50 hemolysis at a dose of less than 150 ng, less than 100 ng, less than 50 ng, or less than 20 ng. In some embodiments, the antibody binds C1q and inhibits biological function with a binding stoichiometry that ranges from less than 6:1 to 1:1, or less than 2:1 to 1:1. The antibody may be humanized.

In one aspect, the present disclosure provides an antibody that binds to C1q. The antibody comprises a single C1q antigen-binding arm and an Fc region. The antigen-binding arm comprises a light chain variable domain and a heavy chain variable domain. The Fc region comprises a complex of a first and a second Fc polypeptide. In some embodiments, one but not both of the Fc polypeptide is an N-terminally truncated heavy chain.

In some embodiments, the antibody comprises only a single binding site for C1q; and/or the antibody does not crosslink C1q to form multi-C1q complexes. The formation of immune complexes and crosslinking C1q may be measured by any suitable method known in the art, e.g., an ELISA assay as described in Example 3. In some embodiments, the antibody does not induce solution phase activation of C1q. The solution phase activation of C1q may be measured by immune complex formation (e.g., C1q-C3 or C1q-C4 conjugates) or release of complement activation products (e.g., but not limited to, C1s-C1 inh, C1r-C1inh, C2a, C2b, C4a, C4b, C3a, C3b, C5a or C5b). In some embodiments, the antibody does not induce cell surface activation of C1q. The cell surface activation of C1q may be measured by immune complex formation (e.g., but not limited to, C1q-C3 or C1q-C4 conjugates) or release of complement activation products (e.g., C1s-C1 inh, C1r-C1inh, C2a, C2b, C4a, C4b, C3a, C3b, C5a or C5b). In some embodiments, the antibody induces fewer infusion-related reactions (IRRs) in subject as compared to its corresponding full-length antibody; the antibody induces fewer CTCAE Grade 5 IRRs in a subject as compared to its corresponding full-length antibody; the antibody induces fewer CTCAE Grade 4 IRRs in a subject as compared to its corresponding full-length antibody; the antibody induces fewer CTCAE Grade 3 IRRs in a subject as compared to its corresponding full-length antibody; the antibody induces fewer CTCAE Grade 2 IRRs in a subject as compared to its corresponding full-length antibody; the antibody induces fewer CTCAE Grade 1 IRRs in a subject as compared to its corresponding full-length antibody; the antibody does not cause infusion-related reactions (IRRs) in subject; the antibody has minimal impact on the heart rate of a subject; the antibody has minimal impact on the mean arterial pressure (MAP) of a subject; the antibody has minimal impact on C3a levels; the antibody does not cause rise in C3a levels; the antibody cannot bridge two C1q molecules; the antibody has the same or greater pharmacokinetic activity as compared to its corresponding full-length antibody; and/or the antibody has the same or greater half-life as compared to its corresponding full-length antibody. In some embodiments, the N-terminally truncated heavy chain lacks a heavy chain variable domain, preferably the N-terminally truncated heavy chain lacks a heavy chain constant domain 1.

In some embodiments, the single antigen-binding arm comprises a light chain variable domain comprising an HVR-L1 having the amino acid sequence of SEQ ID NO: 4, an HVR-L2 having the amino acid of SEQ ID NO: 5, and an HVR-L3 having the amino acid of SEQ ID NO: 6. The single antigen-binding arm may comprise a heavy chain variable domain comprising an HVR-H1 having the amino acid sequence of SEQ ID NO: 7, an HVR-H2 having the amino acid of SEQ ID NO: 8, and an HVR-H3 having the amino acid of SEQ ID NO: 9. In some embodiments, the antibody comprises a light chain comprising an amino acid sequence with at least about 85% homology to the amino acid sequence of SEQ ID NO: 1 and wherein the light chain comprises an HVR-L1 having the amino acid sequence of SEQ ID NO: 4, an HVR-L2 having the amino acid of SEQ ID NO: 5, and an HVR-L3 having the amino acid of SEQ ID NO: 6; preferably the light chain comprises an amino acid sequence of SEQ ID NO: 1. In some embodiments, the single-arm antibody comprises a light chain variable domain comprising an amino acid sequence with at least about 85% homology to the amino acid sequence of any one of SEQ ID NOs: 10-14 and wherein the light chain variable domain comprises an HVR-L1 having the amino acid sequence of SEQ ID NO: 4, an HVR-L2 having the amino acid of SEQ ID NO: 5, and an HVR-L3 having the amino acid of SEQ ID NO: 6; preferably the light chain variable domain comprises an amino acid sequence of any one of SEQ ID NOs: 10-14.

In some embodiments, the antibody comprises a first and a second heavy chain, wherein the first heavy chain comprises the heavy chain variable domain comprising an amino acid sequence with at least about 85% homology to the amino acid sequence of any one of SEQ ID NOs: 15-19 and wherein the heavy chain variable domain comprises an HVR-H1 having the amino acid sequence of SEQ ID NO: 7, an HVR-H2 having the amino acid of SEQ ID NO: 8, and an HVR-H3 having the amino acid of SEQ ID NO: 9; preferably the heavy chain variable domain comprises an amino acid sequence of any one of SEQ ID NOs: 15-19.

In some embodiments, the antibody is of an IgG class, such as IgG1, IgG2, IgG3, or IgG4, preferably IgG4. In some embodiments, the antibody comprises a first and a second heavy chain, wherein the first heavy chain comprises the amino acid sequence of SEQ ID NOs: 20. In some embodiments, the second heavy chain domain comprises the amino acid sequence of SEQ ID NO: 27. In some embodiments, the IgG class is IgG1. The Fc region may comprise a Fcγ receptor binding site and complement binding site mutation. The Fcγ receptor may be FcγRI, FcγRII, or FcγRIII, preferably FcγRI. In some embodiments, the Fcγ receptor binding site and complement binding site mutation comprises IgG1 L117 and L118 mutations. In some embodiments, the antibody comprises a first and a second heavy chain, wherein the first heavy chain comprises the amino acid sequence of SEQ ID NO: 21. In some embodiments, the second heavy chain domain comprises the amino acid sequence of SEQ ID NO: 22.

In some embodiments, the antibody further comprises an inactive antigen-binding arm, wherein the inactive antigen-binding arm is incapable of binding to C1q. In some embodiments, the antibody comprises only a single binding site for C1q; the antibody does not crosslink C1q to form multi-C1q complexes; the antibody does not induce solution phase activation of C1q; the antibody does not induce cell surface activation of C1q as compared to its corresponding full-length antibody; the antibody induces fewer infusion-related reactions (IRRs) in subject as compared to its corresponding full-length antibody; the antibody induces fewer CTCAE Grade 5 IRRs in a subject as compared to its corresponding full-length antibody; the antibody induces fewer CTCAE Grade 4 IRRs in a subject as compared to its corresponding full-length antibody; the antibody induces fewer CTCAE Grade 3 IRRs in a subject as compared to its corresponding full-length antibody; the antibody induces fewer CTCAE Grade 2 IRRs in a subject as compared to its corresponding full-length antibody; the antibody induces fewer CTCAE Grade 1 IRRs in a subject as compared to its corresponding full-length antibody; the antibody does not cause infusion-related reactions (IRRs) in subject; the antibody has minimal impact on the heart rate of a subject; the antibody has minimal impact on the mean arterial pressure (MAP) of a subject; the antibody has minimal impact on C3a levels; the antibody does not cause rise in C3a levels; the antibody cannot bridge two C1q molecules; the antibody has the same or greater pharmacokinetic activity as compared to its corresponding full-length antibody; and/or the antibody has the same or greater half-life as compared to its corresponding full-length antibody.

In some embodiments, the antigen-binding arm comprises a light chain variable domain comprising an HVR-L1 having the amino acid sequence of SEQ ID NO: 4, an HVR-L2 having the amino acid of SEQ ID NO: 5, and an HVR-L3 having the amino acid of SEQ ID NO: 6. In some embodiments, the antigen-binding arm comprises a heavy chain variable domain comprising an HVR-H1 having the amino acid sequence of SEQ ID NO: 7, an HVR-H2 having the amino acid of SEQ ID NO: 8, and an HVR-H3 having the amino acid of SEQ ID NO: 9. In some embodiments, the antibody comprises a light chain comprising an amino acid sequence with at least about 85% homology to the amino acid sequence of any one of SEQ ID NOs: 1 and wherein the light chain comprises an HVR-L1 having the amino acid sequence of SEQ ID NO: 4, an HVR-L2 having the amino acid of SEQ ID NO: 5, and an HVR-L3 having the amino acid of SEQ ID NO: 6; preferably the light chain comprises an amino acid sequence of SEQ ID NO: 1. In some embodiments, the light chain variable domain comprises an amino acid sequence with at least about 85% homology to the amino acid sequence of any one of SEQ ID NOs: 10-14 and wherein the light chain variable domain comprises an HVR-L1 having the amino acid sequence of SEQ ID NO: 4, an HVR-L2 having the amino acid of SEQ ID NO: 5, and an HVR-L3 having the amino acid of SEQ ID NO: 6; preferably the light chain variable domain comprises an amino acid sequence of any one of SEQ ID NOs: 10-14.

In some embodiments, the heavy chain variable domain comprises an amino acid sequence with at least about 85% homology to the amino acid sequence of any one of SEQ ID NOs: 15-19 and wherein the heavy chain variable domain comprises an HVR-H1 having the amino acid sequence of SEQ ID NO: 7, an HVR-H2 having the amino acid of SEQ ID NO: 8, and an HVR-H3 having the amino acid of SEQ ID NO: 9; preferably the heavy chain variable domain comprises an amino acid sequence of any one of SEQ ID NOs: 15-19. In some embodiments, the antibody is of an IgG class, such as IgG1, IgG2, IgG3, or IgG4, preferably IgG4. In some embodiments, the antibody comprises a first and a heavy chain, wherein the first heavy chain comprises the amino acid sequence of SEQ ID NO: 20. In some embodiments, the second heavy chain comprises the amino acid sequence of any one of SEQ ID NOs: 28-31. In some embodiments, the IgG class is IgG1. The Fc region may comprise a Fcγ receptor binding site and complement binding site mutation. In some embodiments, the Fcγ receptor is FcγRI, FcγRII, or FcγRIII, preferably FcγRI. The Fcγ receptor binding site and complement binding site mutation may comprise IgG1 L117 and L118 mutations.

In some embodiments, the antibody competitively inhibits the binding of the monoclonal antibody M1 produced by the hybridoma cell line with ATCC Accession Number PTA-120399 to human C1q or to mouse C1q. The antibody may bind to rat C1q, mouse C1q, dog C1q, rhesus C1q, cynomolgus monkey C1q, or human C1q, or combinations thereof. In some embodiments, the antibody has a dissociation constant (KD) for human C1q that ranges from 10 pM to 20 pM, or 1 pM to less than 10 pM or the antibody has a dissociation constant (KD) for mouse C1q that ranges from 1 pM to 200 pM. In some embodiments, the antibody specifically binds to and neutralizes a biological activity of C1q.

In some embodiments, the biological activity is (1) C1q binding to an autoantibody, (2) C1q binding to C1r, (3) C1q binding to C1s, (4) C1q binding to IgM, (5) C1q binding to phosphatidylserine, (6) C1q binding to pentraxin-3, (7) C1q binding to C-reactive protein (CRP), (8) C1q binding to globular C1q receptor (gC1qR), (9) C1q binding to complement receptor 1 (CR1), (10) C1q binding to beta-amyloid, (11) C1q binding to calreticulin, (12) C1q binding to apoptotic cells, or (13) C1q binding to B cells and/or the biological activity is (1) activation of the classical complement activation pathway, (2) activation of antibody and complement dependent cytotoxicity, (3) CH50 hemolysis, (4) synapse loss, (5) B-cell antibody production, (6) dendritic cell maturation, (7) T-cell proliferation, (8) cytokine production (9) microglia or macrophage activation, (10) immune complex formation, (11) phagocytosis of synapses or nerve endings, (12) activation of complement receptor 3 (CR3/C3) expressing cells or (13) neuroinflammation. CH50 hemolysis may comprise human, mouse, rat, dog, rhesus, and/or cynomolgus monkey CH50 hemolysis. The antibody may be capable of neutralizing from at least about 50%, to at least about 100% of human CH50 hemolysis; and/or may be capable of neutralizing at least 50% of human CH50 hemolysis at a dose of less than 150 ng, less than 100 ng, less than 50 ng, or less than 20 ng. In some embodiments, the antibody binds C1q and inhibits biological function with a binding stoichiometry that ranges from less than 6:1 to 1:1, or less than 2:1 to 1:1. The antibody may be humanized.

In one aspect, the present disclosure provides a host cell expressing the antibody disclosed herein. In another aspect, the present disclosure provides an isolated DNA sequence encoding the heavy and/or light chain regions of the antibody disclosed herein. In another aspect, the present disclosure provides a cloning or expression vector comprising one or more DNA sequences described herein. The host cell may comprise one or more cloning or expression vectors disclosed herein. In one aspect, the present disclosure provides an isolated polynucleotide comprising a nucleic acid sequence encoding the antibody disclosed herein. In another aspect, the present disclosure provides a process for producing the antibody disclosed herein. The process may comprise culturing the host cell described herein and isolating the antibody. In another aspect, the present disclosure provides a pharmaceutical composition comprising the antibody disclosed herein and a pharmaceutically acceptable carrier.

In one aspect, the present disclosure provides a method of inhibiting synapse loss. The method comprises administering to a patient suffering from adverse synapse loss an antibody described herein. In some embodiments, the patient has suffered synapse loss as a result of a neurodegenerative disorder, central nervous system disorder, or a peripheral nervous system disorder. The neurodegenerative disorder may be Guillain Barre Disease (GBS), amyotrophic lateral sclerosis (ALS), or Huntington's disease (HD). The method may further comprise administering neural progenitors, or a neurogenesis enhancer.

In one aspect, the present disclosure provides a method of treating or preventing a disease associated with complement activation in an individual in need of such treatment, the method comprising administering the antibody disclosed herein. In some embodiments, the disease associated with complement activation is a neurodegenerative disorder. The neurodegenerative disorder may be associated with loss of synapses or loss nerve connections; associated with synapse loss that is dependent on the complement receptor 3(CR3)/C3 or complement receptor CR1; associated with pathological activity-dependent synaptic pruning; and/or associated with synapse phagocytosis by microglia. In some embodiments, the neurodegenerative disorder is Alzheimer's disease, amyotrophic lateral sclerosis (ALS), multiple sclerosis, an ophthalmic disorder, glaucoma, myotonic dystrophy, Guillain-Barrésyndrome (GBS), Myasthenia Gravis, Bullous Pemphigoid, spinal muscular atrophy, Down syndrome, Parkinson's disease, Multifocal Motor Neuropathy (MMN), traumatic brain injury (TBI), epilepsy, or Huntington's disease (HD).

In some embodiments, the disease associated with complement activation is an inflammatory disease, autoimmune disease, complement-associated eye disease or metabolic disorder. The inflammatory disease, autoimmune disease, complement-associated eye disease or metabolic disorder may be selected from diabetes, obesity, rheumatoid arthritis (RA), acute respiratory distress syndrome (ARDS), remote tissue injury after ischemia and reperfusion, complement activation during cardiopulmonary bypass surgery, dermatomyositis, pemphigus, lupus nephritis and resultant glomerulonephritis and vasculitis, cardiopulmonary bypass, cardioplegia-induced coronary endothelial dysfunction, type II membranoproliferative glomerulonephritis, IgA nephropathy, acute renal failure, cryoglobulinemia, antiphospholipid syndrome, glaucoma, Chronic open-angle glaucoma, acute closed angle glaucoma, macular degenerative diseases, age-related macular degeneration (AMD), geographic atrophy, choroidal neovascularization (CNV), uveitis, diabetic retinopathy, ischemia-related retinopathy, endophthalmitis, intraocular neovascular disease, diabetic macular edema, pathological myopia, von Hippel-Lindau disease, histoplasmosis of the eye, Neuromyelitis Optica (NMO), Central Retinal Vein Occlusion (CRVO), corneal neovascularization, retinal neovascularization, Leber's hereditary optic neuropathy, optic neuritis, Behcet's retinopathy, ischemic optic neuropathy, retinal vasculitis, ANCA vasculitis, Purtscher retinopathy, Sjogren's dry eye disease, dry AMD, sarcoidosis, temporal arteritis, polyarteritis nodosa, allotransplantation, hyperacute rejection, hemodialysis, chronic occlusive pulmonary distress syndrome (COPD), asthma, aspiration pneumonia, multiple sclerosis, Traumatic Brain Injury (TBI), epilepsy, Multifocal Motor Neuropathy (MMN), Guillain-Barré syndrome, Myasthenia Gravis, Bullous Pemphigoid, or myositis. In some embodiments, the disease associated with complement activation is an autoimmune disease selected from Diabetes mellitus type 1, Hashimoto's thyroiditis, Addison's disease, Coeliac disease, Crohn's disease, pernicious anemia, Pemphigus vulgaris, vitiligo, autoimmune hemolytic anemias, paraneoplastic syndromes, a vasculitis disease, hypocomplementemic urticarial vasculitis (HUV), polymyalgia rheumatica, temporal arteritis, Wegener's granulomatosis, multiple sclerosis, Multifocal Motor Neuropathy (MMN), Guillain-Barré syndrome, Myasthenia Gravis, Bullous Pemphigoid, or myositis. In some embodiments, the disease associated with complement activation is a blood disorder selected from cold agglutinin hemolytic anemia (cold agglutinin disease), cold antibody hemolytic anemia, ABO incompatible acute hemolytic reactions, warm agglutinin hemolytic anemia, warm antibody hemolytic anemia, warm autoimmune hemolytic anemia (WAIHA), autoimmune hemolytic anemia (AIHA) autoimmune thrombocytopenia, antiphospholipid syndrome, Evan's syndrome, neonatal alloimmune thrombocytopenia, red blood cell alloimmunization, Felty's syndrome, antibody-mediated thrombocytopenia, heparin-induced thrombocytopenia (HIT), heparin-induced thrombocytopenia and thrombosis (HITT), thrombotic thrombocytopenic purpura (TTP), immune thrombocytopenic purpura (ITP), thrombocytopenia, thrombosis, vasculitis, lupus nephritis, systemic lupus erythematosus (SLE), glomerulonephritis, anti-phospholipid antibody syndrome (APS), an infection, or a drug-induced hematologic disorder.

In one aspect, the present disclosure provides a kit comprising an antibody disclosed herein, and a package insert comprising instructions for using the antibody to treat or prevent a disease associated with complement activation in an individual in need of such treatment.

In one aspect, the present disclosure provides a method of determining a subject's risk of developing a disease associated with complement activation, comprising administering an antibody disclosed herein to the subject, wherein the antibody is coupled to a detectable label; detecting the detectable label to measure the amount or location of C1q in the subject; and comparing the amount or location of C1q to a reference, wherein the risk of developing a disease associated with complement activation is characterized based on the comparison of the amount of C1q as compared to the reference. In some embodiments, the detectable label comprises a nucleic acid, oligonucleotide, enzyme, radioactive isotope, biotin, or a fluorescent label. The detectable label may be detected using an imaging agent for x-ray, CT, MRI, ultrasound, PET and SPECT. The fluorescent label may be selected from fluorescein, rhodamine, cyanine dyes or BODIPY.

In one aspect, the present disclosure provides a method of reducing a subject's risk of developing a disease associated with complement activation, comprising administering an antibody disclosed herein, wherein the antibody prevents or reduces the risk of developing a disease associated with complement activation, thereby preventing or reducing the risk of future diseases associated with complement activation.

In one aspect, the present disclosure provides an antibody that binds to C1q, comprising a light chain domain comprising the amino acid sequence of SEQ ID NO: 1; a first heavy chain domain comprising the amino acid sequence of SEQ ID NO: 2; and a second heavy chain domain comprising the amino acid sequence of SEQ ID NO: 3; the second heavy chain domain is an N-terminally truncated heavy chain.

In one aspect, the present disclosure provides a method of treating or preventing Guillain Barre Syndrome (GBS), amyotrophic lateral sclerosis (ALS) or Huntington's disease, the method comprising administering an antibody that binds to C1q, comprising a light chain domain comprising the amino acid sequence of SEQ ID NO: 1; a first heavy chain domain comprising the amino acid sequence of SEQ ID NO: 2; and a second heavy chain domain comprising the amino acid sequence of SEQ ID NO: 3; the second heavy chain domain is an N-terminally truncated heavy chain.

In certain aspects, the present disclosure provides an antibody that binds to a protein in the complement cascade, such as a C1q protein. The antibody that binds to C1q comprises a single C1q antigen-binding arm and an Fc region. The single C1q antigen-binding arm may comprise a light chain variable domain and a heavy chain variable domain. The Fc region may comprise a complex of a first and a second Fc polypeptide. In some embodiments, one but not both of the Fc polypeptide is an N-terminally truncated heavy chain.

In some embodiments, the antibody comprises only a single binding site for C1q; and/or the antibody does not crosslink C1q to form multi-C1q complexes. The formation of immune complexes and crosslinking C1q may be measured by any suitable method known in the art, e.g., an ELISA assay as described in Example 3. In some embodiments, the antibody induces less solution phase activation of C1q as compared to its corresponding full-length antibody. In some embodiments, the antibody does not induce solution phase activation of C1q. The solution phase activation of C1q may be measured by immune complex formation (e.g., C1q-C3 or C1q-C4 conjugates) or release of complement activation products (e.g., but not limited to, C1s-C1 inhibitor (inh), C1r-C1inh, C2a, C2b, C4a, C4b, C3a, C3b, C5a or C5b). In some embodiments, the antibody induces less cell surface activation of C1q as compared to its corresponding full-length antibody. In some embodiments, the antibody does not induce cell surface activation of C1q. The cell surface activation of C1q may be measured by immune complex formation (e.g., but not limited to, C1q-C3 or C1q-C4 conjugates) or release of complement activation products (e.g., C1s-C1 inh, C1r-C1inh, C2a, C2b, C4a, C4b, C3a, C3b, C5a or C5b). In some embodiments, the antibody induces fewer infusion-related reactions (IRRs) as compared to its corresponding full-length antibody; the antibody does not cause infusion-related reactions (IRRs); the antibody cannot bridge two C1q molecules; the antibody has the same or greater pharmacokinetic activity as compared to its corresponding full-length antibody; and/or the antibody has the same or greater half-life as compared to its corresponding full-length antibody. In some embodiments, the N-terminally truncated heavy chain lacks a heavy chain variable domain, preferably the N-terminally truncated heavy chain lacks a heavy chain constant domain 1.

In some embodiments, the single antigen-binding arm comprises a light chain variable domain comprising an HVR-L1 having the amino acid sequence of SEQ ID NO: 4, an HVR-L2 having the amino acid of SEQ ID NO: 5, and an HVR-L3 having the amino acid of SEQ ID NO: 6. The single antigen-binding arm may comprise a heavy chain variable domain comprising an HVR-H1 having the amino acid sequence of SEQ ID NO: 7, an HVR-H2 having the amino acid of SEQ ID NO: 8, and an HVR-H3 having the amino acid of SEQ ID NO: 9. In some embodiments, the antibody comprises a light chain comprising an amino acid sequence with at least about 85% homology to the amino acid sequence of SEQ ID NO: 1 and wherein the light chain comprises an HVR-L1 having the amino acid sequence of SEQ ID NO: 4, an HVR-L2 having the amino acid of SEQ ID NO: 5, and an HVR-L3 having the amino acid of SEQ ID NO: 6; preferably the light chain comprises an amino acid sequence of SEQ ID NO: 1. In some embodiments, the single-arm antibody comprises a light chain variable domain comprising an amino acid sequence with at least about 85% homology to the amino acid sequence of any one of SEQ ID NOs: 10-14 and wherein the light chain variable domain comprises an HVR-L1 having the amino acid sequence of SEQ ID NO: 4, an HVR-L2 having the amino acid of SEQ ID NO: 5, and an HVR-L3 having the amino acid of SEQ ID NO: 6; preferably the light chain variable domain comprises an amino acid sequence of any one of SEQ ID NOs: 10-14.

In some embodiments, the antibody comprises a first and a second heavy chain, wherein the first heavy chain comprises the heavy chain variable domain comprising an amino acid sequence with at least about 85% homology to the amino acid sequence of any one of SEQ ID NOs: 15-19 and wherein the heavy chain variable domain comprises an HVR-H1 having the amino acid sequence of SEQ ID NO: 7, an HVR-H2 having the amino acid of SEQ ID NO: 8, and an HVR-H3 having the amino acid of SEQ ID NO: 9; preferably the heavy chain variable domain comprises an amino acid sequence of any one of SEQ ID NOs: 15-19.

In some embodiments, the antibody is of an IgG class, such as IgG1, IgG2, IgG3, or IgG4; preferably IgG4. In some embodiments, the antibody comprises a first and a second heavy chain, wherein the first heavy chain comprises the amino acid sequence of SEQ ID NO: 20. In some embodiments, the second heavy chain comprises the amino acid sequence of SEQ ID NO: 27.

In some embodiments, the IgG class is IgG1. In some embodiments, the Fc region comprises a Fcγ receptor binding site and complement binding site mutation. The Fcγ receptor may be FcγRI, FcγRII, or FcγRIII, preferably FcγRI. the Fcγ receptor binding site and complement binding site mutation may comprise IgG1 L117 and L118 mutations. In some embodiments, the antibody comprises a first and a second heavy chain, wherein the first heavy chain comprises the amino acid sequence of SEQ ID NO: 21. In some embodiments, the second heavy chain comprises the amino acid sequence of SEQ ID NO: 22.

In some embodiments, the antibody further comprises an inactive antigen-binding arm, wherein the inactive antigen-binding arm is incapable of binding to C1q. In some embodiments, the antibody comprises only a single binding site for C1q; and/or the antibody does not crosslink C1q to form multi-C1q complexes. The formation of immune complexes and crosslinking C1q may be measured by any suitable method known in the art, e.g., an ELISA assay as described in Example 3. In some embodiments, the antibody does not induce solution phase activation of C1q. The solution phase activation of C1q may be measured by immune complex formation (e.g., C1q-C3 or C1q-C4 conjugates) or release of complement activation products (e.g., but not limited to, C1s-C1 inh, C1r-C1inh, C2a, C2b, C4a, C4b, C3a, C3b, C5a or C5b). In some embodiments, the antibody does not induce cell surface activation of C1q. The cell surface activation of C1q may be measured by immune complex formation (e.g., but not limited to, C1q-C3 or C1q-C4 conjugates) or release of complement activation products (e.g., C1s-C1 inh, C1r-C1inh, C2a, C2b, C4a, C4b, C3a, C3b, C5a or C5b). In some embodiments, the antibody induces fewer infusion-related reactions (IRRs) as compared to its corresponding full-length antibody; the antibody does not cause infusion-related reactions (IRRs); the antibody cannot bridge two C1q molecules; the antibody has the same or greater pharmacokinetic activity as compared to its corresponding full-length antibody; and/or the antibody has the same or greater half-life as compared to its corresponding full-length antibody.

In some embodiments, the single antigen-binding arm comprises a light chain variable domain comprising an HVR-L1 having the amino acid sequence of SEQ ID NO: 4, an HVR-L2 having the amino acid of SEQ ID NO: 5, and an HVR-L3 having the amino acid of SEQ ID NO: 6. The single antigen-binding arm may comprise a heavy chain variable domain comprising an HVR-H1 having the amino acid sequence of SEQ ID NO: 7, an HVR-H2 having the amino acid of SEQ ID NO: 8, and an HVR-H3 having the amino acid of SEQ ID NO: 9. In some embodiments, the antibody comprises a light chain comprising an amino acid sequence with at least about 85% homology to the amino acid sequence of SEQ ID NO: 1 and wherein the light chain comprises an HVR-L1 having the amino acid sequence of SEQ ID NO: 4, an HVR-L2 having the amino acid of SEQ ID NO: 5, and an HVR-L3 having the amino acid of SEQ ID NO: 6; preferably the light chain comprises an amino acid sequence of SEQ ID NO: 1. In some embodiments, the single-arm antibody comprises a light chain variable domain comprising an amino acid sequence with at least about 85% homology to the amino acid sequence of any one of SEQ ID NOs: 10-14 and wherein the light chain variable domain comprises an HVR-L1 having the amino acid sequence of SEQ ID NO: 4, an HVR-L2 having the amino acid of SEQ ID NO: 5, and an HVR-L3 having the amino acid of SEQ ID NO: 6; preferably the light chain variable domain comprises an amino acid sequence of any one of SEQ ID NOs: 10-14.

In some embodiments, the antibody comprises a first and a second heavy chain, wherein the first heavy chain comprises the heavy chain variable domain comprising an amino acid sequence with at least about 85% homology to the amino acid sequence of any one of SEQ ID NOs: 15-19 and wherein the heavy chain variable domain comprises an HVR-H1 having the amino acid sequence of SEQ ID NO: 7, an HVR-H2 having the amino acid of SEQ ID NO: 8, an HVR-H3 having the amino acid of SEQ ID NO: 9; preferably the heavy chain variable domain comprises an amino acid sequence of any one of SEQ ID NOs: 15-19.

In some embodiments, the antibody is of an IgG class, such as IgG1, IgG2, IgG3, or IgG4, preferably IgG4. In some embodiments, the antibody comprises a first and a heavy chain, wherein the first heavy chain comprises the amino acid sequence of SEQ ID NO: 20. In some embodiments, the second heavy chain comprises the amino acid sequence of any one of SEQ ID NOs: 28-31.

In some embodiments, the IgG class is IgG1. In some embodiments, the Fc region comprises a Fcγ receptor binding site and complement binding site mutation. The Fcγ receptor may be FcγRI, FcγRII, or FcγRIII, preferably FcγRI. In some embodiments, the Fcγ receptor binding site and complement binding site mutation comprises IgG1 L117 and L118 mutations.

In some embodiments, the antibody competitively inhibits the binding of the monoclonal antibody M1 produced by the hybridoma cell line with ATCC Accession Number PTA-120399 to human C1q or to mouse C1q. The antibody may bind to rat C1q, mouse C1q, dog C1q, rhesus C1q, cynomolgus monkey C1q, or human C1q, or combinations thereof. In some embodiments, the antibody has a dissociation constant (KD) for human C1q that ranges from 10 pM to 20 pM, or 1 pM to less than 10 pM or the antibody has a dissociation constant (KD) for mouse C1q that ranges from 1 pM to 200 pM. In some embodiments, the antibody specifically binds to and neutralizes a biological activity of C1q.

In some embodiments, the biological activity is (1) C1q binding to an autoantibody, (2) C1q binding to C1r, (3) C1q binding to C1s, (4) C1q binding to IgM, (5) C1q binding to phosphatidylserine, (6) C1q binding to pentraxin-3, (7) C1q binding to C-reactive protein (CRP), (8) C1q binding to globular C1q receptor (gC1qR), (9) C1q binding to complement receptor 1 (CR1), (10) C1q binding to beta-amyloid, (11) C1q binding to calreticulin, (12) C1q binding to apoptotic cells, or (13) C1q binding to B cells and/or the biological activity is (1) activation of the classical complement activation pathway, (2) activation of antibody and complement dependent cytotoxicity, (3) CH50 hemolysis, (4) synapse loss, (5) B-cell antibody production, (6) dendritic cell maturation, (7) T-cell proliferation, (8) cytokine production (9) microglia or macrophage activation, (10) immune complex formation, (11) phagocytosis of synapses or nerve endings, (12) activation of complement receptor 3 (CR3/C3) expressing cells or (13) neuroinflammation. CH50 hemolysis may comprise human, mouse, rat, dog, rhesus, and/or cynomolgus monkey CH50 hemolysis. The antibody may be capable of neutralizing from at least about 50%, to at least about 100% of human CH50 hemolysis; and/or may be capable of neutralizing at least 50% of human CH50 hemolysis at a dose of less than 150 ng, less than 100 ng, less than 50 ng, or less than 20 ng. In some embodiments, the antibody binds C1q and inhibits biological function with a binding stoichiometry that ranges from less than 6:1 to 1:1, or less than 2:1 to 1:1. The antibody may be humanized.

In one aspect, the present disclosure provides a host cell expressing the antibody disclosed herein. In another aspect, the present disclosure provides an isolated DNA sequence encoding the heavy and/or light chain regions of the antibody disclosed herein. In another aspect, the present disclosure provides a cloning or expression vector comprising one or more DNA sequences described herein. The host cell may comprise one or more cloning or expression vectors disclosed herein. In one aspect, the present disclosure provides an isolated polynucleotide comprising a nucleic acid sequence encoding the antibody disclosed herein. In another aspect, the present disclosure provides a process for producing the antibody disclosed herein. The process may comprise culturing the host cell described herein and isolating the antibody. In another aspect, the present disclosure provides a pharmaceutical composition comprising the antibody disclosed herein and a pharmaceutically acceptable carrier.

In one aspect, the present disclosure provides a method of inhibiting synapse loss. The method comprises administering to a patient suffering from adverse synapse loss an antibody described herein. In some embodiments, the patient has suffered synapse loss as a result of a neurodegenerative disorder, central nervous system disorder, or a peripheral nervous system disorder. The neurodegenerative disorder may be Guillain Barre Disease (GBS), amyotrophic lateral sclerosis (ALS), or Huntington's disease (HD). The method may further comprise administering neural progenitors, or a neurogenesis enhancer.

In one aspect, the present disclosure provides a method of treating or preventing a disease associated with complement activation in an individual in need of such treatment, the method comprising administering the antibody disclosed herein. In some embodiments, the disease associated with complement activation is a neurodegenerative disorder. The neurodegenerative disorder may be associated with loss of synapses or loss nerve connections; associated with synapse loss that is dependent on the complement receptor 3(CR3)/C3 or complement receptor CR1; associated with pathological activity-dependent synaptic pruning; and/or associated with synapse phagocytosis by microglia. In some embodiments, the neurodegenerative disorder is Alzheimer's disease, amyotrophic lateral sclerosis (ALS), multiple sclerosis, an ophthalmic disorder, glaucoma, myotonic dystrophy, Guillain-Barre' syndrome (GBS), Myasthenia Gravis, Bullous Pemphigoid, spinal muscular atrophy, Down syndrome, Parkinson's disease, Multifocal Motor Neuropathy (MMN), traumatic brain injury (TBI), epilepsy, or Huntington's disease (HD).

In some embodiments, the disease associated with complement activation is an inflammatory disease, autoimmune disease, complement-associated eye disease or metabolic disorder. The inflammatory disease, autoimmune disease, complement-associated eye disease or metabolic disorder may be selected from diabetes, obesity, rheumatoid arthritis (RA), acute respiratory distress syndrome (ARDS), remote tissue injury after ischemia and reperfusion, complement activation during cardiopulmonary bypass surgery, dermatomyositis, pemphigus, lupus nephritis and resultant glomerulonephritis and vasculitis, cardiopulmonary bypass, cardioplegia-induced coronary endothelial dysfunction, type II membranoproliferative glomerulonephritis, IgA nephropathy, acute renal failure, cryoglobulinemia, antiphospholipid syndrome, glaucoma, Chronic open-angle glaucoma, acute closed angle glaucoma, macular degenerative diseases, age-related macular degeneration (AMD), geographic atrophy, choroidal neovascularization (CNV), uveitis, diabetic retinopathy, ischemia-related retinopathy, endophthalmitis, intraocular neovascular disease, diabetic macular edema, pathological myopia, von Hippel-Lindau disease, histoplasmosis of the eye, Neuromyelitis Optica (NMO), Central Retinal Vein Occlusion (CRVO), corneal neovascularization, retinal neovascularization, Leber's hereditary optic neuropathy, optic neuritis, Behcet's retinopathy, ischemic optic neuropathy, retinal vasculitis, ANCA vasculitis, Purtscher retinopathy, Sjogren's dry eye disease, dry AMD, sarcoidosis, temporal arteritis, polyarteritis nodosa, allotransplantation, hyperacute rejection, hemodialysis, chronic occlusive pulmonary distress syndrome (COPD), asthma, aspiration pneumonia, multiple sclerosis, Traumatic Brain Injury (TBI), epilepsy, Multifocal Motor Neuropathy (MMN), Guillain-Barre syndrome, Myasthenia Gravis, Bullous Pemphigoid, or myositis. In some embodiments, the disease associated with complement activation is an autoimmune disease selected from Diabetes mellitus type 1, Hashimoto's thyroiditis, Addison's disease, Coeliac disease, Crohn's disease, pernicious anemia, Pemphigus vulgaris, vitiligo, autoimmune hemolytic anemias, paraneoplastic syndromes, a vasculitis disease, hypocomplementemic urticarial vasculitis (HUV), polymyalgia rheumatica, temporal arteritis, Wegener's granulomatosis, multiple sclerosis, Multifocal Motor Neuropathy (MMN), Guillain-Barre syndrome, Myasthenia Gravis, Bullous Pemphigoid, or myositis. In some embodiments, the disease associated with complement activation is a blood disorder selected from cold agglutinin hemolytic anemia (cold agglutinin disease), cold antibody hemolytic anemia, ABO incompatible acute hemolytic reactions, warm agglutinin hemolytic anemia, warm antibody hemolytic anemia, warm autoimmune hemolytic anemia (WAIHA), autoimmune hemolytic anemia (AIHA) autoimmune thrombocytopenia, antiphospholipid syndrome, Evan's syndrome, neonatal alloimmune thrombocytopenia, red blood cell alloimmunization, Felty's syndrome, antibody-mediated thrombocytopenia, heparin-induced thrombocytopenia (HIT), heparin-induced thrombocytopenia and thrombosis (HITT), thrombotic thrombocytopenic purpura (TTP), immune thrombocytopenic purpura (ITP), thrombocytopenia, thrombosis, vasculitis, lupus nephritis, systemic lupus erythematosus (SLE), glomerulonephritis, anti-phospholipid antibody syndrome (APS), an infection, or a drug-induced hematologic disorder.

In one aspect, the present disclosure provides a kit comprising an antibody disclosed herein, and a package insert comprising instructions for using the antibody to treat or prevent a disease associated with complement activation in an individual in need of such treatment.

In one aspect, the present disclosure provides a method of determining a subject's risk of developing a disease associated with complement activation, comprising administering an antibody disclosed herein to the subject, wherein the antibody is coupled to a detectable label; detecting the detectable label to measure the amount or location of C1q in the subject; and comparing the amount or location of C1q to a reference, wherein the risk of developing a disease associated with complement activation is characterized based on the comparison of the amount of C1q as compared to the reference. In some embodiments, the detectable label comprises a nucleic acid, oligonucleotide, enzyme, radioactive isotope, biotin, or a fluorescent label. The detectable label may be detected using an imaging agent for x-ray, CT, MRI, ultrasound, PET and SPECT. The fluorescent label may be selected from fluorescein, rhodamine, cyanine dyes or BODIPY.

In one aspect, the present disclosure provides a method of reducing a subject's risk of developing a disease associated with complement activation, comprising administering an antibody disclosed herein, wherein the antibody prevents or reduces the risk of developing a disease associated with complement activation, thereby preventing or reducing the risk of future diseases associated with complement activation.

In one aspect, the present disclosure provides an antibody that binds to C1q, comprising a light chain domain comprising the amino acid sequence of SEQ ID NO: 1; a first heavy chain domain comprising the amino acid sequence of SEQ ID NOs: 20; and a second heavy chain domain comprising the amino acid sequence of SEQ ID NO: 27; the second heavy chain domain is an N-terminally truncated heavy chain.

In one aspect, the present disclosure provides a method of treating or preventing Guillain Barre Syndrome (GBS), amyotrophic lateral sclerosis (ALS) or Huntington's disease, the method comprising administering an antibody that binds to C1q, comprising a light chain domain comprising the amino acid sequence of SEQ ID NO: 1; a first heavy chain domain comprising the amino acid sequence of SEQ ID NOs: 20; and a second heavy chain domain comprising the amino acid sequence of SEQ ID NO: 27; the second heavy chain domain is an N-terminally truncated heavy chain.

In one aspect, the present disclosure provides an antibody that binds to C1q, comprising a light chain domain comprising the amino acid sequence of SEQ ID NO: 1; a first heavy chain domain comprising the amino acid sequence of SEQ ID NO: 21; and a second heavy chain domain comprising the amino acid sequence of SEQ ID NO: 22; the second heavy chain domain is an N-terminally truncated heavy chain.

In one aspect, the present disclosure provides a method of treating or preventing Guillain Barre Syndrome (GBS), amyotrophic lateral sclerosis (ALS) or Huntington's disease, the method comprising administering an antibody that binds to C1q, comprising a light chain domain comprising the amino acid sequence of SEQ ID NO: 1; a first heavy chain domain comprising the amino acid sequence of SEQ ID NO: 21; and a second heavy chain domain comprising the amino acid sequence of SEQ ID NO: 22; the second heavy chain domain is an N-terminally truncated heavy chain.

In one aspect, the present disclosure provides an antibody that binds to C1q, comprising a light chain domain comprising the amino acid sequence of SEQ ID NO: 1; a first heavy chain domain comprising the amino acid sequence of SEQ ID NO: 20; and a second heavy chain domain comprising the amino acid sequence of SEQ ID NO: 27; the second heavy chain domain is an N-terminally truncated heavy chain.

In one aspect, the present disclosure provides an antibody that binds to C1q, comprising a light chain domain comprising the amino acid sequence of SEQ ID NO: 1; a first heavy chain domain comprising the amino acid sequence of SEQ ID NO: 21; and a second heavy chain domain comprising the amino acid sequence of SEQ ID NO: 22; the second heavy chain domain is an N-terminally truncated heavy chain.

DESCRIPTION OF THE FIGURES

FIG. 1A shows anti-C1q full-length antibody (bivalent), anti-C1q single-arm antibody (monovalent), anti-C1q Fab (monovalent). FIG. 1B shows that anti-C1q full-length antibody (bivalent) can cross-link and activate C1q while single-arm antibody is incapable of cross-linking C1q.

FIG. 2A shows that anti-C1q single-arm antibody has similar or higher binding IC50 to human C1q when compared to anti-C1q full-length antibody and anti-C1q-Fab. FIG. 2B shows that anti-C1q single-arm antibody has similar potency as the full-length antibody and Fab fragment for inhibition of serum hemolysis.

DETAILED DESCRIPTION

General

Polyclonal and monoclonal antibodies are naturally generated as immunoglobulin (Ig) molecules in the immune system's response to a pathogen. A dominating format with a concentration of 8 mg/ml in human serum, the ~150-kDa IgG1 molecule is composed of two identical ~50-kDa heavy chains and two identical ~25-kDa light chains.

Figure 1A:
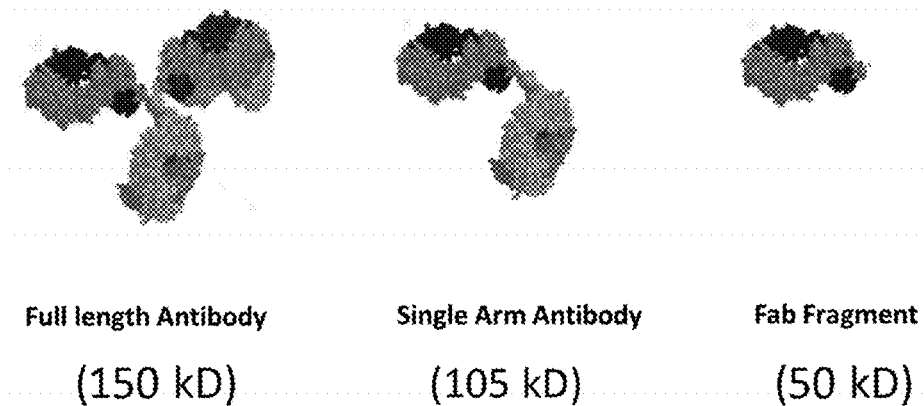
FIGS. 1A-1B show anti-C1q antibodies.
Figure 1B:
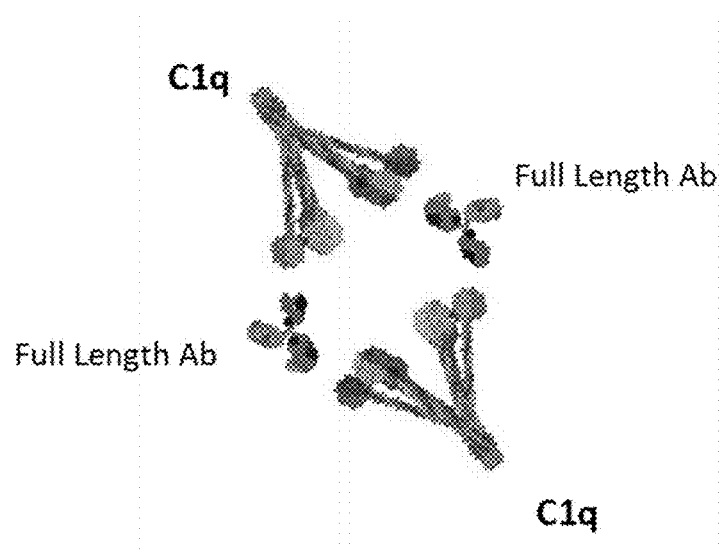

C1q has six identical head groups that anti-C1q antibodies can bind to. A full-length anti-C1q antibody has two binding arms, which can induce cross-linking of C1q (FIG. 1B). The two binding arms of the full-length anti-C1q antibody can bridge separate C1q molecules, bringing them together and triggering C1q activation. C1q activation releases C3a to potentially trigger an infusion reaction. Due to C1q cross-linking, intravenous dosing with full-length anti-C1q antibodies can cause infusion related reactions (IRR) known as complement activation-related pseudoallergy (CARPA). Infusion related reactions (IRR) can occur in some patients as administered full-length anti-C1q antibody drug concentrations move through full C1q saturation zone. IRR is a disorder characterized by an adverse reaction to the infusion of the anti-C1q antibody. An anti-C1q single-arm antibody (monovalent) and/or anti-C1q antibody with a single antigen-binding arm can avoid solution-phase activation of C1q. Anti-C1q full-length antibody (bivalent) can cross-link and activate C1q while the single-arm antibody and Fab fragment are incapable of cross-linking C1q (FIGS. 1A-1B).

CARPA symptoms are common during administration of nanomedicines, liposomal drugs and monoclonal antibodies (Mabs). Some of the symptoms associated with CARPA are cardiopulmonary events (hypo/hypertension, brady/tachycardia and other arrythmias, shortness of breath/bronchospasm and apnea), hematological (leukopenia/leukocytosis, thrombocytopenia), laboratory (SC5b-9 or C3a elevation), skin (flushing, rash, itching, feeling of warmth and pruritus). Infusion related reactions (IRRs) typically occur at first exposure only, early in the infusion, are mild/transient (hours), and often controllable with premedication and slow initial infusion rate. Patterns of hemodynamic response during infusion of CARPA causing agents in porcine model of CARPA and in humans are compound specific.

Figure 2A:
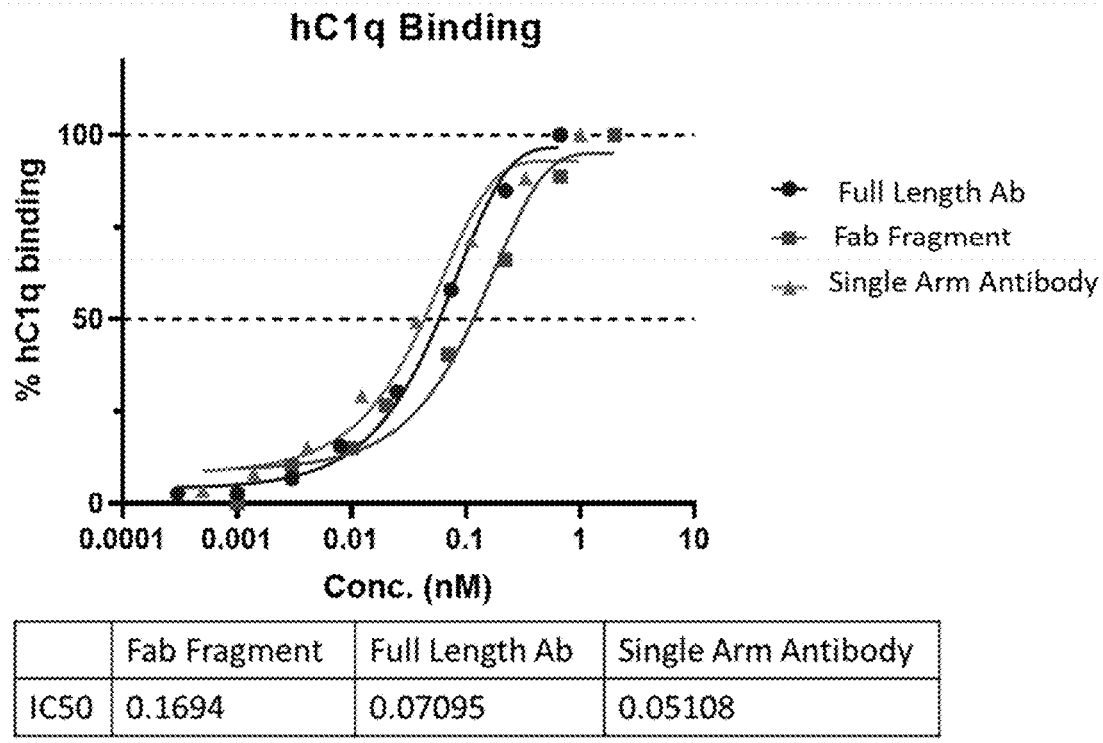
FIGS. 2A-2B shows that anti-C1q single-arm antibody (monovalent) is equipotent with anti-C1q full-length antibody (bivalent) for binding C1q and inhibition of function.
Figure 2B:
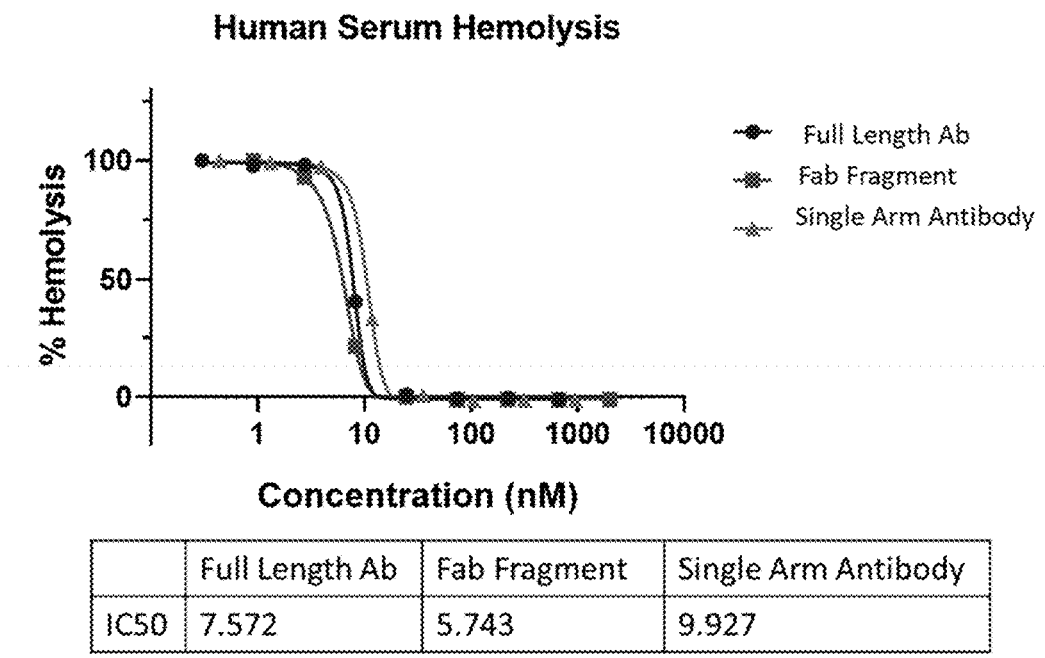
Figure 3:
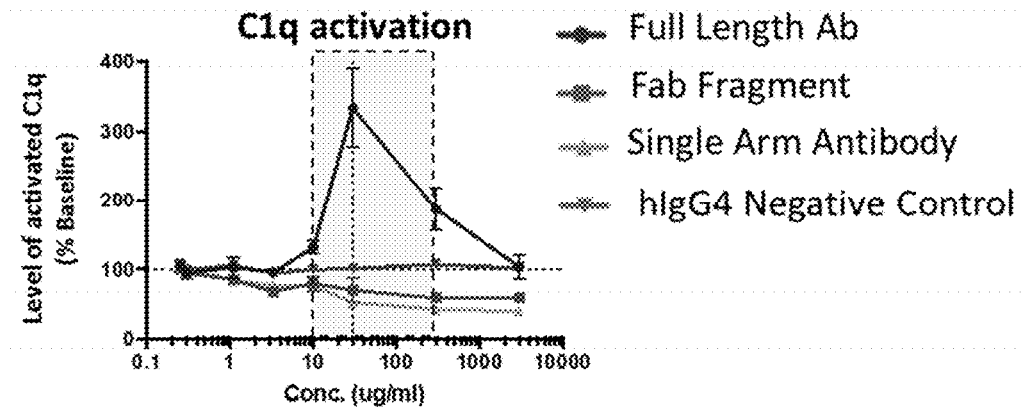
FIG. 3 shows that anti-C1q full-length murine antibody induces C1q activation in serum samples while anti-C1q single-arm antibody and Fab fragment do not trigger activation.
Figure 6A:
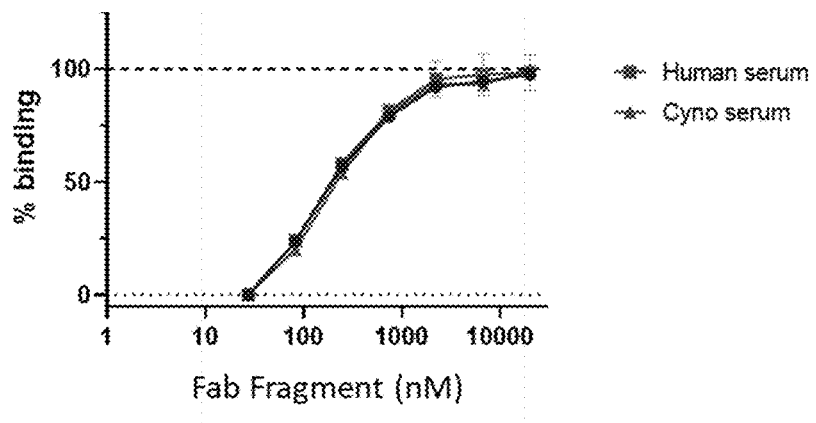
FIGS. 6A-6C show that the Fab fragment antibody (FIG. 6A), the full-length humanized anti-C1q antibody (FIG. 6B), and anti-C1q single-arm antibody (FIG. 6C) show similar binding profiles to Cynomolgus and human serum derived C1q.
Figure 6B:
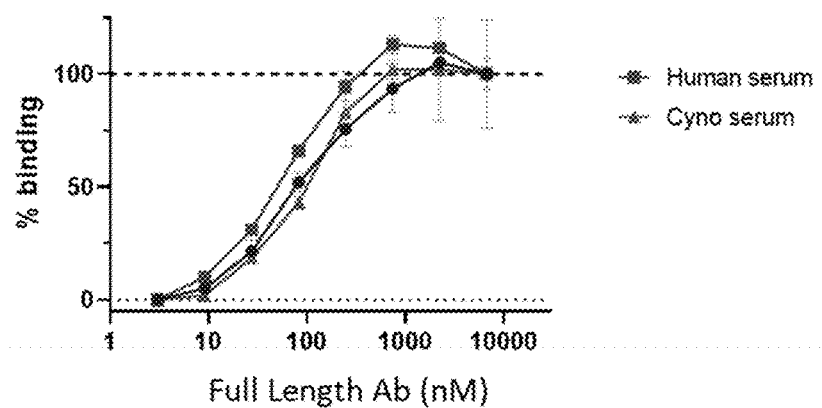
Figure 6C:
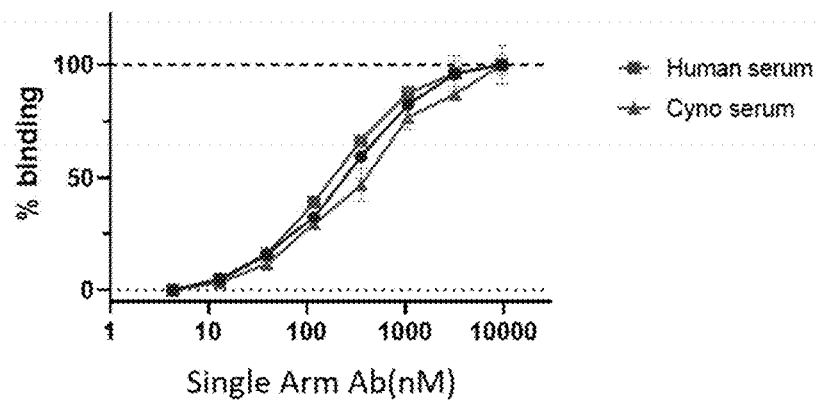
Figure 7A:
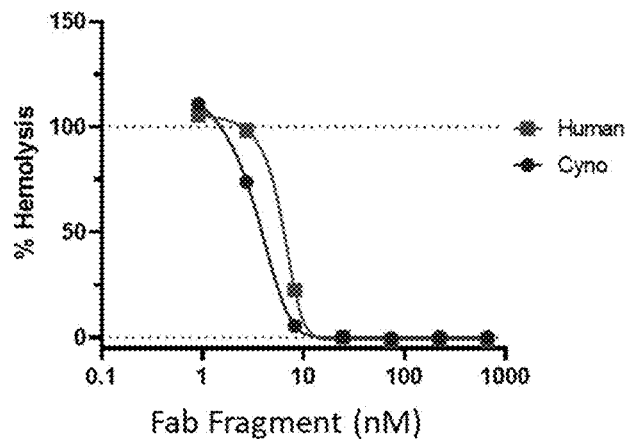
FIGS. 7A-7C show that the Fab fragment antibody (FIG. 7A), full-length humanized anti-C1q antibody (FIG. 7B), and anti-C1q single-arm antibody (FIG. 7C) show similar potency for hemolysis inhibition in human and cynomolgus serum.
Figure 7B:
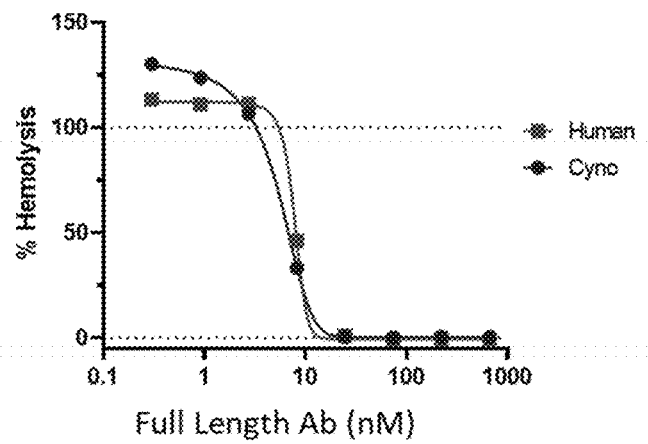
Figure 7C:
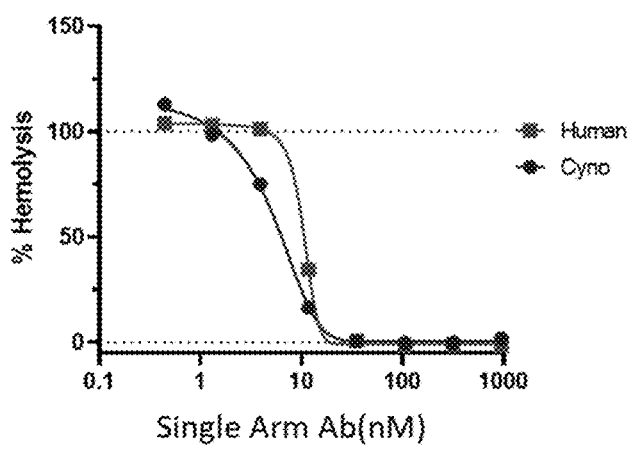

As disclosed herein, an anti-C1q single-arm antibody has similar or higher binding IC50 to human C1q when compared to anti-C1q full-length antibody and anti-C1q-Fab (FIG. 2A) and has similar potency as the full-length antibody and Fab fragment for inhibition of serum hemolysis (FIG. 2B). Unlike anti-C1q full-length antibody, however, anti-C1q single-arm antibody and Fab fragment do not trigger C1q activation in ex vivo serum samples (FIG. 3). At concentrations between 10 and 300 ug/ml, anti-C1q full-length antibody induces C1q activation in serum samples (peak at 30 ug/ml), while anti-C1q single-arm antibody does not trigger activation, which is consistent with its lack of ability to cross-link C1q. Full-length humanized anti-C1q antibody, the Fab fragment antibody, and anti-C1q single-arm antibody, specifically block C1q and only inhibit activation of the classical complement cascade without impact on the other complement pathways (FIGS. 4A-4D). The single-arm antibody does not cross-link C1q or result in in vivo C1q driven classical complement cascade activation following IV dosing in monkeys (FIGS. 5A-5D). A similar binding profile was observed for C1q derived from human and Cynomolgus serum for the full-length humanized anti-C1q antibody, the Fab fragment antibody, and anti-C1q single-arm antibody (FIGS. 6A, 6B, 6C). The full-length humanized anti-C1q antibody, the Fab fragment antibody, and anti-C1q single-arm antibody showed a similar IC50 for inhibition of classical complement mediated hemolysis (FIGS. 7A, 7B, 7C).

In certain preferred embodiments, the single-arm antibody is an anti-C1q antibody. The single-arm antibody that binds to C1q comprises an antigen-binding arm and an Fc region, wherein the single antigen-binding arm comprises a light chain variable domain and a heavy chain variable domain; and the Fc region comprises a complex of a first and a second Fc polypeptide, wherein one but not both of the Fc polypeptides is an N-terminally truncated heavy chain. In alternate embodiments, described herein is an antibody that binds C1q, comprising an antigen-binding arm, an inactive antigen-binding arm, and an Fc region, wherein the antigen-binding arm comprises a light chain variable domain and a heavy chain variable domain that bind to C1q; the inactive antigen-binding arm is incapable of binding to C1q; and the Fc region comprises a complex of a first and a second Fc polypeptide.

The single-arm antibody and/or anti-C1q antibody with a single antigen-binding arm may be prepared by any suitable method known in the art. For example, the single-arm antibody and/or anti-C1q antibody with a single antigen-binding arm may be obtained by mutating a CH3 domain of the Fc fragment with the "knob" mutation (T366W).

In embodiments where the single-arm antibody construct and/or anti-C1q antibody with a single antigen-binding arm construct comprises an antigen-binding polypeptide construct that binds to C1q, the antigen-binding polypeptide construct can be derived from known anti-C1q antibodies or anti-C1q binding domains in various formats including Fab fragments, scFvs, and sdab. In certain embodiments the antigen-binding polypeptide construct can be derived from humanized, or chimeric versions of these antibodies.

Dimeric/Heterodimeric Fc Construct

The single-arm antibody and/or anti-C1q antibody with a single antigen-binding arm constructs according to the invention comprise a dimeric Fc polypeptide construct comprising two monomeric Fc polypeptides, each comprising a CH3 domain. In some embodiments of the invention, the dimeric Fc polypeptide construct is heterodimeric and comprises monomeric Fc polypeptides that have been modified to promote the formation of a heterodimeric Fc. In some embodiments, the monomeric Fc polypeptides comprise variant CH3 domains having amino acid modifications that promote the formation of heterodimeric Fc domains. Suitable variant CH3 domains are known in the art and include, for example, those described in International Patent Publication Nos. WO 2012/058768, and WO 2005/063816, and U.S. Pat. Nos. 7,183,076, 5,821,333, and 7,695,936. In some embodiments, the heteromultimer according to the invention comprises an IgG FcD construct wherein one of said first and second Fc polypeptides comprises the CH3 amino acid modifications T366L and the other Fc polypeptide comprises the CH3 amino acid modifications T366S/L368A/Y407V. In some embodiments, the heteromultimer according to the invention comprises an IgG FcD construct wherein one of said first and second Fc polypeptides comprises the CH3 amino acid modifications T366L/N390R/K392R/T394W and the other Fc polypeptide comprises the CH3 amino acid modifications L351Y/S400E/F405A/Y407V.

Additional methods for modifying monomeric Fc polypeptides to promote heterodimeric Fc formation are described in International Patent Publication No. WO 96/027011 (knobs into holes), in Gunasekaran et al. (Gunasekaran K. et al. (2010) J Biol Chem. 285, 19637-46, electrostatic design to achieve selective heterodimerization), in Davis et al. (Davis, J H. et al. (2010) Prot Eng Des Sel; 23(4): 195-202, strand exchange engineered domain (SEED) technology), and in Labrijn et al [Efficient generation of stable bispecific IgG1 by controlled Fab-arm exchange. Labrijn A F, Meesters J I, de Goeij B E, van den Bremer E T, Neijssen J, van Kampen M D, Strumane K, Verploegen S, Kundu A, Gramer M J, van Berkel P H, van de Winkel J G, Schuurman J, Parren P W. Proc Natl Acad Sci USA. 2013 Mar. 26; 110(13):5145-50.

In some embodiments, the modified monomeric Fc polypeptides further comprise amino acid modifications that increase the stability of the heterodimeric Fc polypeptide construct, as determined by its melting temperature. Suitable amino acid modifications are known in the art and include, for example, those described in International Patent Application No. PCT/CA2012/050780. Specifically, in some embodiments, the heterodimeric Fc polypeptide construct comprises modified monomeric Fc polypeptides with the amino acid modification T350V in both peptides.

In some embodiments, the single-arm antibody and/or anti-C1q antibody with a single antigen-binding arm is an isolated monovalent antibody construct described herein comprising an antigen-binding polypeptide construct which monovalently binds an antigen; and a dimeric Fc polypeptide construct comprising a variant CH3 domain. In some embodiments, the variant CH3 domain comprises amino acid mutations that promote the formation of said heterodimer with stability comparable to a native homodimeric Fc region.

In some embodiments, the single-arm antibody and/or anti-C1q antibody with a single antigen-binding arm is an isolated monovalent antibody construct described herein comprising an antigen-binding polypeptide construct which monovalently binds an antigen; and a dimeric Fc polypeptide construct comprising a CH3 domain wherein the Fc construct does not comprise an additional disulfide bond in the CH3 domain relative to a wild type Fc region. In certain embodiments, the Fc construct comprises an additional disulfide bond in the variant CH3 domain relative to a wild type Fc region. In specific embodiments, the dimeric Fc construct is a heterodimeric Fc construct formed with a purity greater than about 75%, greater than about 80%, greater than about 90%, or even greater than about 95%.

Single-arm antibodies and/or anti-C1q antibodies with a single antigen-binding arm of the present disclosure may be produced using recombinant methods and compositions, e.g., as described in U.S. Pat. No. 4,816,567.

In certain aspects, the present disclosure provides an antibody that binds to a protein in the complement cascade, such as a C1q protein. The antibody that binds to C1q comprises a single C1q antigen-binding arm and an Fc region. The single C1q antigen-binding arm may comprise a light chain variable domain and a heavy chain variable domain. The Fc region may comprise a complex of a first and a second Fc polypeptide. The Fc region may comprise a Fcγ receptor binding site mutation. The antibody may be of the IgG4 class. In some embodiments, one but not both of the Fc polypeptide is an N-terminally truncated heavy chain. In some embodiments, the Fcγ receptor is FcγRI, FcγRII, or FcγRIII, preferably FcγRI. The Fcγ receptor binding site mutation may comprise a IgG4 L115E mutation.

(SEQ ID NO: 1)
DVQITQSPSSLSASLGERATINCRASKSINKYLAWYQQKPGKAPKLLIY

SGSTLQSGIPARFSGSGSGTDFTLTISSLEPEDFAMYYCQQHNEYPLTF

GQGTKLEIKRTVAAPSVFIFPPSDEQLKSGTASVVCLLNNFYPREAKVQ

WKVDNALQSGNSQESVTEQDSKDSTYSLSSTLTLSKADYEKHKVYACEV

THQGLSSPVTKSFNRGEC

The complementarity determining regions (CDRs) of SEQ ID NO: 1 are depicted in bolded and underlined text. In some embodiments, the HVR-L1 of the light chain variable domain has the sequence RASKSINKYLA (SEQ ID NO:4), the HVR-L2 of the light chain variable domain has the sequence SGSTLQS (SEQ ID NO:5), and the HVR-L3 of the light chain variable domain has the sequence QQHNEYPLT (SEQ ID NO:6).

The light chain of the single-arm antibody may comprise the following light chain variable domain amino acid sequence:

(SEQ ID NO: 10)
DVQITQSPSYLAASPGETITINCRASKSINKYLAWYQEKPGKTNKLLIY
SGSTLQSGIPSRFSGSGSGTDFTLTISSLEPEDFAMYYCQQHNEYPLTF
GAGTKLELK.

The single-arm antibody may comprise a light chain variable domain amino acid sequence that is at least 85%, 90%, or 95% identical to SEQ ID NO: 10, preferably while retaining the HVR-L1 RASKSINKYLA (SEQ ID NO: 4), the HVR-L2 SGSTLQS (SEQ ID NO: 5), and the HVR-L3 QQHNEYPLT (SEQ ID NO: 6).

The single-arm antibody may comprise the following amino acid sequence of kappa light chain variable domain variant 1 (Vκ1): DVQITQSPSYLAASLGERATINCRASK-SINKYLAWYQQKPGKTNKLLIYSGSTLQSG IPARFSGSGSGTDFTLTISSLEPEDFAMYYCQQHNEY- PLTFGQGTKLEIK (SEQ ID NO: 11). The hyper variable regions (HVRs) of Vκ1 are depicted in bolded and underlined text.

The single-arm antibody may comprise the following amino acid sequence of kappa light chain variable domain variant 2 (Vκ2): DVQITQSPSSLSASLGERATINCRASK-SINKYLAWYQQKPGKANKLLIYSGSTLQSGI PARFSGSGSGTDFTLTISSLEPEDFAMYYCQQHNEY-PLTFGQGTKLEIK (SEQ ID NO: 12). The hyper variable regions (HVRs) of Vκ2 are depicted in bolded and underlined text.

The single-arm antibody may comprise the following amino acid sequence of kappa light chain variable domain variant 3 (Vκ3): DVQITQSPSSLSASLGERATINCRASK-SINKYLAWYQQKPGKAPKLLIYSGSTLQSGI PARFSGSGSGTDFTLTISSLEPEDFAMYYCQQHNEY-PLTFGQGTKLEIK (SEQ ID NO: 13). The hyper variable regions (HVRs) of Vκ3 are depicted in bolded and underlined text.

The single-arm antibody may comprise the following amino acid sequence of kappa light chain variable domain variant 4 (Vκ4): DIQLTQSPSSLSASLGERATINCRASK-SINKYLAWYQQKPGKAPKLLIYSGSTLQSGI PARFSGSGSGTDFTLTISSLEPEDFAMYYCQQHNEY-PLTFGQGTKLEIK (SEQ ID NO: 14). The hyper variable regions (HVRs) of Vκ4 are depicted in bolded and underlined text.

The single-arm antibody may comprise a light chain variable domain amino acid sequence that is at least 85%, 90%, or 95% identical to SEQ ID NO: 11-14 while retaining the HVR-L1 RASKSINKYLA (SEQ ID NO: 4), the HVR-L2 SGSTLQS (SEQ ID NO: 5), and the HVR-L3 QQH-NEYPLT (SEQ ID NO: 6).

The antibody may be of the IgG4 class. The sequence of IgG4 heavy chain is (SEQ ID NO: 32)

| | | | | | | |
|---|---|---|---|---|---|---|
| 1 | ASTKGPSVFP | LAPCSRSTSE | STAALGCLVK | DYFPEPVTVS | WNSGALTSGV | HTFPAVLQSS |
| 61 | GLYSLSSVVT | VPSSSLGTKT | YTCNVDHKPS | NTKVDKRVES | KYGPPCPSCP | APEFLGGPSV |
| 121 | FLFPPKPKDT | LMISRTPEVT | CVVVDVSQED | PEVQFNWYVD | GVEVHNAKTK | PREEQFNSTY |
| 181 | RVVSVLTVLH | QDWLNGKEYK | CKVSNKGLPS | SIEKTISKAK | GQPREPQVYT | LPPSQEEMTK |
| 241 | NQVSLTCLVK | GFYPSDIAVE | WESNGQPENN | YKTTPPVLDS | DGSFFLYSRL | TVDKSRWQEG |
| 301 | NVFSCSVMHE | ALHNHYTQKS | LSLSLGK | | | |

The domains of IgG4 are as follow: CH1: 1-98, Hinge: 99-110, CH2: 111-220, and CH3: 221-327. IgG4 may comprise mutations. For example, S108P mutation (for IgG4 arm swapping), L115E mutation (for FcR binding), T246W mutation (for knob in hole mutation), T246S mutation (for knob in hole mutation), L248A mutation (for knob in hole mutation), Y187V mutation (for knob in hole mutation), and/or N187A (aglycosylated for FcR binding), N187Q (aglycosylated for FcR binding), or N187G (aglycosylated for FcR binding).

One heavy chain of the single-arm antibody (the heavy chain 1 domain) of the single-arm antibody may comprise the following amino acid sequence (SEQ ID NO:2):

(SEQ ID NO: 2)
QVQLVQSGAELKKPGASVKVSCKSSGYHFTSYWMHWVKQAPGQGLEWIG

VIHPNSGSINYNEKFESRVTITVDKSTSTAYMELSSLRSEDTAVYYCAG

ERDSTEVLPMDYWGQGTTVTVSSASTKGPSVFPLAPCSRSTSESTAALG

-continued
CLVKDYFPEPVTVSWNSGALTSGVHTFPAVLQSSGLYSLSSVVTVPSSS

LGTKTYTCNVDHKPSNTKVDKRVESKYGPPCPPCPAPEFEGGPSVFLFP

PKPKDTLMISRTPEVTCVVVDVSQEDPEVQFNWYVDGVEVHNAKTKPRE

EQFNSTYRVVSVLTVLHQDWLNGKEYKCKVSNKGLPSSIEKTISKAKGQ

PREPQVYTLPPSQEEMTKNQVSL<u>W</u>CLVKGFYPSDIAVEWESNGQPENNY

KTTPPVLDSDGSFFLYSRLTVDKSRWQEGNVFSCSVMHEALHNHYTQKS

LSLSLGK

The complementarity determining regions (CDRs) of SEQ ID NO: 2 are depicted in bolded and underlined text. The knob in hole T366W mutation (corresponding to IgG4 T246W mutation) in SEQ ID NO: 2 is depicted in underlined text. The S241P (for IgG4 arm swapping, corresponding to S108P) and L248E (for FCR, corresponding to L115E mutation) mutations are depicted in bolded text. In some embodiments, the HVR-H1 of the heavy chain variable domain has the sequence GYHFTSYWMH (SEQ ID NO:7), the HVR-H2 of the heavy chain variable domain has the sequence VIHPNSGSINYNEKFES (SEQ ID NO:8), and the HVR-H3 of the heavy chain variable domain has the sequence ERDSTEVLPMDY (SEQ ID NO:9).

One heavy chain of the single-arm antibody (the heavy chain 1 domain) of the single-arm antibody may comprise the following amino acid sequence (SEQ ID NO:20):

(SEQ ID NO: 20)
QVQLVQSGAELKKPGASVKVSCKSS<u>GYHFTSYWMH</u>WVKQAPGQGLEWIG

<u>VIHPNSGSINYNEKFES</u>RVTITVDKSTSTAYMELSSLRSEDTAVYYCAG

<u>ERDSTEVLPMDY</u>WGQGTTVTVSSASTKGPSVFPLAPCSRSTSESTAALG

CLVKDYFPEPVTVSWNSGALTSGVHTFPAVLQSSGLYSLSSVVTVPSSS

LGTKTYTCNVDHKPSNTKVDKRVESKYGPPCPPCPAPEFLGGPSVFLFP

PKPKDTLMISRTPEVTCVVVDVSQEDPEVQFNWYVDGVEVHNAKTKPRE

EQFNSTYRVVSVLTVLHQDWLNGKEYKCKVSNKGLPSSIEKTISKAKGQ

PREPQVYTLPPSQEEMTKNQVSL<u>W</u>CLVKGFYPSDIAVEWESNGQPENNY

KTTPPVLDSDGSFFLYSRLTVDKSRWQEGNVFSCSVMHEALHNHYTQKS

LSLSLGK

The complementarity determining regions (CDRs) of SEQ ID NO: 20 are depicted in bolded and underlined text. The knob in hole T366W mutation (corresponding to IgG4 T246W mutation) in SEQ ID NO: 20 is depicted in underlined text. The S241P (for IgG4 arm swapping, corresponding to S108P) mutation and L248 (corresponding to L115E mutation) are depicted in bolded text.

The antibody may be of the IgG1 class. The sequence of IgG1 heavy chain is (SEQ ID NO: 33)
```
  1  ASTKGPSVFP LAPSSKSTSG GTAALGCLVK DYFPEPVTVS WNSGALTSGV HTFPAVLQSS
 61  GLYSLSSVVT VPSSSLGTQT YICNVNHKPS NTKVDKKVEP KSCDKTHTCP PCPAPELLGG
121  PSVFLFPPKP KDTLMISRTP EVTCVVVDVS HEDPEVKFNW YVDGVEVHNA KTKPREEQYN
181  STYRVVSVLT VLHQDWLNGK EYKCKVSNKA LPAPIEKTIS KAKGQPREPQ VYTLPPSRDE
241  LTKNQVSLTC LVKGFYPSDI AVEWESNGQP ENNYKTTPPV LDSDGSFFLY SKLTVDKSRW
301  QQGNVFSCSV MHEALHNHYT QKSLSLSPGK
```

The domains of IgG1 are as follow: CH1: 1-98, Hinge: 99-110, CH2: 111-223, and CH3: 224-330. IgG1 may comprise mutations. For example, L117A mutation (for FcR binding), L118A mutation (for FcR binding), T249W mutation (for knob in hole mutation), T249S mutation (for knob in hole mutation), L251A mutation (for knob in hole mutation), and/or Y290V mutation (for knob in hole mutation). One heavy chain of the single-arm antibody (the heavy chain 1 domain) of the single-arm antibody may comprise the following amino acid sequence (SEQ ID NO: 21):

(SEQ ID NO: 21)
QVQLVQSGAELKKPGASVKVSCKSS<u>GYHFTSYWMH</u>WVKQAPGQGLEWIG

<u>VIHPNSGSINYNEKFES</u>RVTITVDKSTSTAYMELSSLRSEDTAVYYCAG

<u>ERDSTEVLPMDY</u>WGQGTTVTVSSASTKGPSVFPLAPSSKSTSGGTAALG

CLVKDYFPEPVTVSWNSGALTSGVHTFPAVLQSSGLYSLSSVVTVPSSS

LGTQTYICNVNHKPSNTKVDKKVEPKSCDKTHTCPPCPAPEAAGGPSVF

LFPPKPKDTLMISRTPEVTCVVVDVSHEDPEVKFNWYVDGVEVHNAKTK

PREEQYNSTYRVVSVLTVLHQDWLNGKEYKCKVSNKALPAPIEKTISKA

KGQPREPQVYTLPPSRDELTKNQVSL<u>W</u>CLVKGFYPSDIAVEWESNGQPE

NNYKTTPPVLDSDGSFFLYSKLTVDKSRWQQGNVFSCSVMHEALHNHYT

QKSLSLSPGK

The complementarity determining regions (CDRs) of SEQ ID NO: 21 are depicted in bolded and underlined text. The knob in hole T366W mutation (corresponding to IgG1 T249W mutation) in SEQ ID NO: 21 is depicted in underlined text. The L234A (corresponding to IgG1 L117A mutation) and L235A (corresponding to IgG1 L1178 mutation) mutations are depicted in bolded text.

The heavy chain 1 of the single-arm antibody may comprise the following heavy chain variable domain amino acid sequence:

(SEQ ID NO: 15)
QVQLQQPGAELVKPGASVKLSCKSS<u>GYHFTSYWMH</u>WVKQRPGQGLEWIG
<u>VIHPNSGSINYNEKFES</u>KATLTVDK<u>S</u>SSTAYMQLSSLTSEDSAVYYCAG
<u>ERDSTEVLPMDY</u>WGQGTSVTVSS

The single-arm antibody may comprise a heavy chain variable domain amino acid sequence that is at least 85%, 90%, or 95% identical to SEQ ID NO: 15, preferably while retaining the HVR-H1 GYHFTSYWMH (SEQ ID NO: 7), the HVR-H2 VIHPNSGSINYNEKFES (SEQ ID NO: 8), and the HVR-H3 ERDSTEVLPMDY (SEQ ID NO: 9).

The single-arm antibody may comprise the following amino acid sequence of heavy chain variable domain variant 1 (VH1): QVQLVQSGAELKKPGASVKVSCKSSGYHFT-SYWMHWVKQAPGQGLEWIGVIHPN SGS-INYNEKFESKATITVDKSTSTAYMQLSSLTSED-SAVYYCAGERDSTEVLPMDY WGQGTSVTVSS (SEQ ID NO: 16). The hyper variable regions (HVRs) of VH1 are depicted in bolded and underlined text.

The single-arm antibody may comprise the following amino acid sequence of heavy chain variable domain variant 2 (VH2): QVQLVQSGAELKKPGASVKVSCKSSGYHFT-SYWMHWVKQAPGQGLEWIGVIHPN SGS-INYNEKFESRATITVDKSTSTAYMELSSLRSED-TAVYYCAGERDSTEVLPMDY WGQGTTVTVSS (SEQ ID NO: 17). The hyper variable regions (HVRs) of VH2 are depicted in bolded and underlined text.

The single-arm antibody may comprise the following amino acid sequence of heavy chain variable domain variant 3 (VH3): QVQLVQSGAELKKPGASVKVSCKSSGYHFT-SYWMHWVKQAPGQGLEWIGVIHPN SGS-INYNEKFESRVTITVDKSTSTAYMELSSLRSED-TAVYYCAGERDSTEVLPMDY WGQGTTVTVSS (SEQ ID NO: 18). The hyper variable regions (HVRs) of VH3 are depicted in bolded and underlined text.

The single-arm antibody may comprise the following amino acid sequence of heavy chain variable domain variant 4 (VH4): QVQLVQSGAELKKPGASVKVSCKSSGYHFT-SYWMHWVRQAPGQGLEWIGVIHPN SGS-INYNEKFESRVTITVDKSTSTAYMELSSLRSED-TAVYYCAGERDSTEVLPMDY WGQGTTVTVSS (SEQ ID NO: 19). The hyper variable regions (HVRs) of VH4 are depicted in bolded and underlined text.

The single-arm antibody may comprise a heavy chain variable domain amino acid sequence that is at least 85%, 90%, or 95% identical to SEQ ID NO: 16-19 while retaining the HVR-H1 GYHFTSYWMH (SEQ ID NO: 7), the HVR-H2 VIHPNSGSINYNEKFES (SEQ ID NO: 8), and the HVR-H3 ERDSTEVLPMDY (SEQ ID NO: 9).

A second heavy chain of the single-arm antibody (the heavy chain 2 domain) of the single-arm antibody, which is N-terminally truncated, may comprise the following amino acid sequence (SEQ ID NO: 3):

(SEQ ID NO: 3)
ESKYGPPCPPCPAPEFEGGPSVFLFPPKPKDTLMISRTPEVTCVVVDVS

QEDPEVQFNWYVDGVEVHNAKTKPREEQFNSTYRVVSVLTVLHQDWLNG

KEYKCKVSNKGLPSSIEKTISKAKGQPREPQVYTLPPSQEEMTKNQVSL

<u>S</u>C<u>A</u>VKGFYPSDIAVEWESNGQPENNYKTTPPVLDSDGSFFL<u>V</u>SRLTVDK

SRWQEGNVFSCSVMHEALHNHYTQKSLSLSLGK

There is no heavy chain variable domain and no CDRs in SEQ ID NO: 3. The knob in hole T366S/L368A/Y407V mutations in SEQ ID NO: 3 are depicted in underlined text. The S241P and L248E mutations are depicted in bolded text.

A second heavy chain of the single-arm antibody (the heavy chain 2 domain) of the single-arm antibody, which is N-terminally truncated, may comprise the following amino acid sequence (SEQ ID NO: 27):

(SEQ ID NO: 27)
ESKYGPPCPPCPAPEFLGGPSVFLFPPKPKDTLMISRTPEVTCVVVDVS

QEDPEVQFNWYVDGVEVHNAKTKPREEQFNSTYRVVSVLTVLHQDWLNG

KEYKCKVSNKGLPSSIEKTISKAKGQPREPQVYTLPPSQEEMTKNQVSL

<u>S</u>C<u>A</u>VKGFYPSDIAVEWESNGQPENNYKTTPPVLDSDGSFFL<u>V</u>SRLTVDK

SRWQEGNVFSCSVMHEALHNHYTQKSLSLSLGK

A second heavy chain of the single-arm antibody (the heavy chain 2 domain) of the single-arm antibody, which is N-terminally truncated, may comprise the following amino acid sequence (SEQ ID NO: 22):

(SEQ ID NO: 22)
DKTHTCPPCPAPEAAGGPSVFLFPPKPKDTLMISRTPEVTCVVVDVSHE

DPEVKFNWYVDGVEVHNAKTKPREEQYNSTYRVVSVLTVLHQDWLNGKE

YKCKVSNKALPAPIEKTISKAKGQPREPQVYTLPPSRDELTKNQVSL<u>S</u>C

<u>A</u>VKGFYPSDIAVEWESNGQPENNYKTTPPVLDSDGSFFL<u>V</u>SKLTVDKSR

WQQGNVFSCSVMHEALHNHYTQKSLSLSPGK

There is no heavy chain variable domain and no CDRs in SEQ ID NO: 22. The knob in hole T366S/L368A/Y407V mutations in SEQ ID NO: 22 are depicted in underlined text. The L234A and L235A mutations are depicted in bolded text.

In some embodiments, the amino acid sequence of the light chain variable domain and heavy chain variable 1 domain comprise one or more of SEQ ID NO:4 of HVR-L1, SEQ ID NO:5 of HVR-L2, SEQ ID NO:6 of HVR-L3, SEQ ID NO:7 of HVR-H1, SEQ ID NO:8 of HVR-H2, and SEQ ID NO:9 of HVR-H3.

The antibody may comprise a light chain variable domain amino acid sequence that is at least 85%, 90%, or 95% identical to any one of SEQ ID NOs:1 and 10-14, preferably while retaining the HVR-L1 RASKSINKYLA (SEQ ID NO:4), the HVR-L2 SGSTLQS (SEQ ID NO:5), and the HVR-L3 QQHNEYPLT (SEQ ID NO:6). The antibody may comprise a heavy chain variable 1 domain amino acid sequence that is at least 85%, 90%, or 95% identical to any one of SEQ ID NOs:2 and 15-19, preferably while retaining the HVR-H1 GYHFTSYWMH (SEQ ID NO:7), the HVR-H2 VIHPNSGSINYNEKFES (SEQ ID NO:8), and the HVR-H3 ERDSTEVLPMDY (SEQ ID NO:9). The antibody may comprise a heavy chain variable 2 domain amino acid sequence that is at least 85%, 90%, or 95% identical to SEQ ID NO:3.

In certain aspects, the present disclosure provides an antibody with a single antigen-binding arm that binds to a protein in the complement cascade, such as a C1q protein. In some embodiments, the antibody that binds C1q, comprises an antigen-binding arm, an inactive antigen-binding arm, and an Fc region, wherein the antigen-binding arm comprises a light chain variable domain and a heavy chain variable domain that bind to C1q; the inactive antigen-binding arm is incapable of binding to C1q; and the Fc region comprises a complex of a first and a second Fc polypeptide. In some embodiments, the antigen-binding arm comprises a light chain variable domain comprising an HVR-L1 having the amino acid sequence of SEQ ID NO: 4, an HVR-L2 having the amino acid of SEQ ID NO: 5, and an HVR-L3 having the amino acid of SEQ ID NO: 6, or the antigen-binding arm comprises a heavy chain variable domain comprising an HVR-H1 having the amino acid sequence of SEQ ID NO: 7, an HVR-H2 having the amino acid of SEQ ID NO: 8, and an HVR-H3 having the amino acid of SEQ ID NO: 9. In some embodiments, the antibody comprises a light chain domain comprising an amino acid sequence with at least about 85% homology to the amino acid sequence of SEQ ID NO: 1 and wherein the light chain domain comprises an HVR-L1 having the amino acid sequence of SEQ ID NO: 4, an HVR-L2 having the amino acid of SEQ ID NO: 5, and an HVR-L3 having the amino acid of SEQ ID NO: 6 or, the light chain domain comprises an amino acid sequence of SEQ ID NO: 1. In some embodiments, the light chain variable domain comprises an amino acid sequence with at least about 85% homology to the amino acid sequence of any one of SEQ ID NOs: 10-14 and wherein the light chain variable domain comprises an HVR-L1 having the amino acid sequence of SEQ ID NO: 4, an HVR-L2 having the amino acid of SEQ ID NO: 5, and an HVR-L3 having the amino acid of SEQ ID NO: 6 or the light chain variable domain comprises an amino acid sequence of any one of SEQ ID NOs: 10-14.

In some embodiments, the antibody comprises a first and a heavy chain domain comprising an amino acid sequence with at least about 85% homology to the amino acid sequence of any one of SEQ ID NOs: 2, 20, and 21, and wherein the heavy chain domain comprises an HVR-H1 having the amino acid sequence of SEQ ID NO: 7, an HVR-H2 having the amino acid of SEQ ID NO: 8, and an HVR-H3 having the amino acid of SEQ ID NO: 9 or the heavy chain domain comprises an amino acid sequence of any one of SEQ ID NOs: 2, 20, and 21. In some embodiments, the heavy chain variable domain comprises an amino acid sequence with at least about 85% homology to the amino acid sequence of any one of SEQ ID NOs: 15-19 and wherein the heavy chain variable domain comprises an HVR-H1 having the amino acid sequence of SEQ ID NO: 7, an HVR-H2 having the amino acid of SEQ ID NO: 8, and an HVR-H3 having the amino acid of SEQ ID NO: 9 or the heavy chain variable domain comprises an amino acid sequence of any one of SEQ ID NOs: 15-19.

A second heavy chain of the antibody (the heavy chain 2 domain) may comprise any one of the following amino acid sequences (SEQ ID NOs: 23-26):

(SEQ ID NO: 23)
QVQLVQSGAELKKPGASVKVSCKSSGYHFTSYWMHWVKQAPGQGLEWIG

VIHPNSGSINYNEKFESRVTITVDKSTSTAYMELSSLRSEDTAVYYCAG

KRKSTKVLPMDYWGQGTTVTVSSASTKGPSVFPLAPCSRSTSESTAALG

CLVKDYFPEPVTVSWNSGALTSGVHTFPAVLQSSGLYSLSSVVTVPSSS

LGTKTYTCNVDHKPSNTKVDKRVESKYGPPCPPCPAPEFEGGPSVFLFP

PKPKDTLMISRTPEVTCVVVDVSQEDPEVQFNWYVDGVEVHNAKTKPRE

EQFNSTYRVVSVLTVLHQDWLNGKEYKCKVSNKGLPSSIEKTISKAKGQ

PREPQVYTLPPSQEEMTKNQVSLS<u>C</u>AVKGFYPSDIAVEWESNGQPENNY

KTTPPVLDSDGSFFL<u>V</u>SRLTVDKSRWQEGNVFSCSVMHEALHNHYTQKS

LSLSLGK (SEQ ID NO: 24)
QVQLVQSGAELKKPGASVKVSCKSSGYHFTSYWMKWVKQAPGQGLEWIG

VIHPNSGSINYN<u>KK</u>FESRVTITVDKSTSTAYMELSSLRSEDTAVYYCAG

ARKSTEVLPMDYWGQGTTVTVSSASTKGPSVFPLAPCSRSTSESTAALG

CLVKDYFPEPVTVSWNSGALTSGVHTFPAVLQSSGLYSLSSVVTVPSSS

LGTKTYTCNVDHKPSNTKVDKRVESKYGPPCPPCPAPEFEGGPSVFLFP

PKPKDTLMISRTPEVTCVVVDVSQEDPEVQFNWYVDGVEVHNAKTKPRE

EQFNSTYRVVSVLTVLHQDWLNGKEYKCKVSNKGLPSSIEKTISKAKGQ

PREPQVYTLPPSQEEMTKNQVSLS<u>C</u>AVKGFYPSDIAVEWESNGQPENNY

KTTPPVLDSDGSFFL<u>V</u>SRLTVDKSRWQEGNVFSCSVMHEALHNHYTQKS

LSLSLGK (SEQ ID NO: 25)
QVQLVQSGAELKKPGASVKVSCKSSGYHFTSYWMHWVKQAPGQGLEWIG

VIHPNSGSINYNKKFKSRVTITVDKSTSTAYMELSSLRSEDTAVYYCAG

KRKSTKVLPMDYWGQGTTVTVSSASTKGPSVFPLAPCSRSTSESTAALG

CLVKDYFPEPVTVSWNSGALTSGVHTFPAVLQSSGLYSLSSVVTVPSSS

LGTKTYTCNVDHKPSNTKVDKRVESKYGPPCPPCPAPEFEGGPSVFLFP

PKPKDTLMISRTPEVTCVVVDVSQEDPEVQFNWYVDGVEVHNAKTKPRE

EQFNSTYRVVSVLTVLHQDWLNGKEYKCKVSNKGLPSSIEKTISKAKGQ

PREPQVYTLPPSQEEMTKNQVSLS<u>C</u>AVKGFYPSDIAVEWESNGQPENNY

KTTPPVLDSDGSFFL<u>V</u>SRLTVDKSRWQEGNVFSCSVMHEALHNHYTQKS

LSLSLGK (SEQ ID NO: 26)
QVQLVQSGAELKKPGASVKVSCKSSGYHFTSYWMHWVKQAPGQGLEWIG

VIHPNSGSINYNEKFESRVTITVDKSTSTAYMELSSLRSEDTAVYYCAG

ARASTAVLPMDYWGQGTTVTVSSASTKGPSVFPLAPCSRSTSESTAALG

CLVKDYFPEPVTVSWNSGALTSGVHTFPAVLQSSGLYSLSSVVTVPSSS

LGTKTYTCNVDHKPSNTKVDKRVESKYGPPCPPCPAPEFEGGPSVFLFP

PKPKDTLMISRTPEVTCVVVDVSQEDPEVQFNWYVDGVEVHNAKTKPRE

EQFNSTYRVVSVLTVLHQDWLNGKEYKCKVSNKGLPSSIEKTISKAKGQ

PREPQVYTLPPSQEEMTKNQVSLS<u>C</u>AVKGFYPSDIAVEWESNGQPENNY

KTTPPVLDSDGSFFL<u>V</u>SRLTVDKSRWQEGNVFSCSVMHEALHNHYTQKS

LSLSLGK

A second heavy chain of the antibody (the heavy chain 2 domain) may comprise any one of the following amino acid sequences (SEQ ID NOs: 28-31):

(SEQ ID NO: 28)
QVQLVQSGAELKKPGASVKVSCKSSGYHFTSYWMHWVKQAPGQGLEWIG

VIHPNSGSINYNEKFESRVTITVDKSTSTAYMELSSLRSEDTAVYYCAG

KRKSTKVLPMDYWGQGTTVTVSSASTKGPSVFPLAPCSRSTSESTAALG

CLVKDYFPEPVTVSWNSGALTSGVHTFPAVLQSSGLYSLSSVVTVPSSS

LGTKTYTCNVDHKPSNTKVDKRVESKYGPPCPPCPAPEFLGGPSVFLFP

PKPKDTLMISRTPEVTCVVVDVSQEDPEVQFNWYVDGVEVHNAKTKPRE

EQFNSTYRVVSVLTVLHQDWLNGKEYKCKVSNKGLPSSIEKTISKAKGQ

PREPQVYTLPPSQEEMTKNQVSLS<u>C</u>AVKGFYPSDIAVEWESNGQPENNY

KTTPPVLDSDGSFFL<u>V</u>SRLTVDKSRWQEGNVFSCSVMHEALHNHYTQKS

LSLSLGK (SEQ ID NO: 29)
QVQLVQSGAELKKPGASVKVSCKSSGYHFTSYWMKWVKQAPGQGLEWIG

VIHPNSGSINYNKKFESRVTITVDKSTSTAYMELSSLRSEDTAVYYCAG

ARKSTEVLPMDYWGQGTTVTVSSASTKGPSVFPLAPCSRSTSESTAALG

CLVKDYFPEPVTVSWNSGALTSGVHTFPAVLQSSGLYSLSSVVTVPSSS

LGTKTYTCNVDHKPSNTKVDKRVESKYGPPCPPCPAPEFLGGPSVFLFP

PKPKDTLMISRTPEVTCVVVDVSQEDPEVQFNWYVDGVEVHNAKTKPRE

EQFNSTYRVVSVLTVLHQDWLNGKEYKCKVSNKGLPSSIEKTISKAKGQ

PREPQVYTLPPSQEEMTKNQVSLS C AVKGFYPSDIAVEWESNGQPENNY

KTTPPVLDSDGSFFL V SRLTVDKSRWQEGNVFSCSVMHEALHNHYTQKS

LSLSLGK (SEQ ID NO: 30)
QVQLVQSGAELKKPGASVKVSCKSSGYHFTSYWMHWVKQAPGQGLEWIG

VIHPNSGSINYNKKFKSRVTITVDKSTSTAYMELSSLRSEDTAVYYCAG

KRKSTKVLPMDYWGQGTTVTVSSASTKGPSVFPLAPCSRSTSESTAALG

CLVKDYFPEPVTVSWNSGALTSGVHTFPAVLQSSGLYSLSSVVTVPSSS

LGTKTYTCNVDHKPSNTKVDKRVESKYGPPCPPCPAPEFLGGPSVFLFP

PKPKDTLMISRTPEVTCVVVDVSQEDPEVQFNWYVDGVEVHNAKTKPRE

EQFNSTYRVVSVLTVLHQDWLNGKEYKCKVSNKGLPSSIEKTISKAKGQ

PREPQVYTLPPSQEEMTKNQVSLS C AVKGFYPSDIAVEWESNGQPENNY

KTTPPVLDSDGSFFL V SRLTVDKSRWQEGNVFSCSVMHEALHNHYTQKS

LSLSLGK (SEQ ID NO: 31)
QVQLVQSGAELKKPGASVKVSCKSSGYHFTSYWMHWVKQAPGQGLEWIG

VIHPNSGSINYNEKFESRVTITVDKSTSTAYMELSSLRSEDTAVYYCAG

ARASTAVLPMDYWGQGTTVTVSSASTKGPSVFPLAPCSRSTSESTAALG

CLVKDYFPEPVTVSWNSGALTSGVHTFPAVLQSSGLYSLSSVVTVPSSS

LGTKTYTCNVDHKPSNTKVDKRVESKYGPPCPPCPAPEFLGGPSVFLFP

PKPKDTLMISRTPEVTCVVVDVSQEDPEVQFNWYVDGVEVHNAKTKPRE

EQFNSTYRVVSVLTVLHQDWLNGKEYKCKVSNKGLPSSIEKTISKAKGQ

PREPQVYTLPPSQEEMTKNQVSLS C AVKGFYPSDIAVEWESNGQPENNY

KTTPPVLDSDGSFFL V SRLTVDKSRWQEGNVFSCSVMHEALHNHYTQKS

LSLSLGK

The CDRs in the second heavy chain variable domain are mutated in SEQ ID NOs: 23-26 to prevent binding to C1q. The CDR mutations are depicted in bolded and underlined text. The knob in hole T366S/L368A/Y407V mutations in SEQ ID NOs: 23-26 are depicted in underlined text.

Definitions

As used herein the specification, "a" or "an" may mean one or more. As used herein in the claim(s), when used in conjunction with the word "comprising", the words "a" or "an" may mean one or more than one. For example, reference to an "antibody" is a reference to from one to many antibodies, and includes equivalents thereof known to those skilled in the art, and so forth. As used herein "another" may mean at least a second or more.

The term "preventing" is art-recognized, and when used in relation to a condition, such as a disease associated with complement activation, is well understood in the art, and includes administration of a composition which reduces the frequency or severity, or delays the onset, of one or more symptoms of the medical condition in a subject relative to a subject who does not receive the composition. Thus, the prevention of a disease associated with complement activation progression includes, for example, slowing or halting C1q activation in a population of patients receiving a therapy relative to a control population that did not receive the therapy, e.g., by a statistically and/or clinically significant amount.

The term "subject" as used herein refers to a living mammal and may be interchangeably used with the term "patient". Examples of mammals include, but are not limited to, any member of the mammalian class: humans, non-human primates such as chimpanzees, and other apes and monkey species; farm animals such as cattle, horses, sheep, goats, swine; domestic animals such as rabbits, dogs, and cats; laboratory animals including rodents, such as rats, mice and guinea pigs, and the like. The term does not denote a particular age or gender.

As used herein, the term "treating" or "treatment" includes reducing, arresting, or reversing the symptoms, clinical signs, or underlying pathology of a condition to stabilize or improve a subject's condition or to reduce the likelihood that the subject's condition will worsen as much as if the subject did not receive the treatment.

The term "therapeutically effective amount" of a compound with respect to the subject method of treatment refers to an amount of the compound(s) in a preparation which, when administered as part of a desired dosage regimen (to a mammal, preferably a human), alleviates a symptom, ameliorates a condition, or slows the onset of disease conditions according to clinically acceptable standards for the disorder or condition to be treated or the cosmetic purpose, e.g., at a reasonable benefit/risk ratio applicable to any medical treatment. A therapeutically effective amount herein may vary according to factors such as the disease state, age, sex, and weight of the patient, and the ability of the antibody to elicit a desired response in the individual.

As used herein, an individual "at risk" of developing a particular disease, disorder, or condition may or may not have detectable disease or symptoms of disease, and may or may not have displayed detectable disease or symptoms of disease prior to the treatment methods described herein. "At risk" denotes that an individual has one or more risk factors, which are measurable parameters that correlate with development of a particular disease, disorder, or condition, as known in the art. An individual having one or more of these risk factors has a higher probability of developing a particular disease, disorder, or condition than an individual without one or more of these risk factors.

"Chronic" administration refers to administration of the medicament(s) in a continuous as opposed to acute mode, so as to maintain the initial therapeutic effect (activity) for an extended period of time. "Intermittent" administration refers to treatment that is not administered consecutively without interruption, but rather is cyclic/periodic in nature.

As used herein, administration "conjointly" with another compound or composition includes simultaneous administration and/or administration at different times. Conjoint administration also encompasses administration as a co-formulation or administration as separate compositions, including at different dosing frequencies or intervals, and using the same route of administration or different routes of administration.

Synapse loss. Synapses are asymmetric communication junctions formed between two neurons, or, at the neuromuscular junction (NMJ) between a neuron and a muscle cell. Chemical synapses enable cell-to-cell communication via secretion of neurotransmitters, whereas in electrical synapses signals are transmitted through gap junctions, specialized intercellular channels that permit ionic current flow. In addition to ions, other molecules that modulate synaptic function (such as ATP and second messenger molecules) can diffuse through gap junctional pores. At the mature NMJ, pre- and postsynaptic membranes are separated by a synaptic cleft containing extracellular proteins that form the basal lamina. Synaptic vesicles are clustered at the presynaptic release site, transmitter receptors are clustered in junctional folds at the postsynaptic membrane, and glial processes surround the nerve terminal.

A preferred group of complement-associated eye conditions includes glaucoma, geographic atrophy and age-related macular degeneration (AMD), including non-exudative (wet) and exudative (dry or atrophic) AMD, choroidal neovascularization (CNV), diabetic retinopathy (DR), and endophthalmitis.

The term "immunoglobulin" (Ig) is used interchangeably with "antibody" herein. The term "antibody" herein is used in the broadest sense and specifically covers monoclonal antibodies, polyclonal antibodies, multispecific antibodies (e.g., bispecific antibodies) formed from at least two intact antibodies, and antibody fragments so long as they exhibit the desired biological activity. The term "antibody" also covers a single-arm antibody.

The term "complement activation" herein is used to refer to complement activation by immune complexes or other C1q substrates via the C1-dependent classical pathway. The interaction of C1q with its substrates causes C1q conformational changes that activate its associated serine proteases (C1r and C1s) leading to the activation of downstream components within the classical complement pathway (C4 and C2), which then lead to activation of additional downstream components (C3 and C5). Pathway activation leads to release of complement breakdown products such as C4a, C3a and C5a which can trigger an infusion reaction. The interaction of C1q with immune complexes or other substrates and activation of the pathway can be measured by any suitable method known in the art, e.g., an ELISA assay as described in Example 3.

The term "solution phase activation of C1q" herein is used to refer to the cross-linking of two or more C1q molecules in solution to trigger C1q activation. The two binding arms of the full-length anti-C1q antibodies can bridge separate C1q molecules, bringing them together and causing a conformational change in C1q that triggers its activation. The solution phase activation of C1q may be measured by immune complex formation (e.g., C1q-C3 or C1q-C4 conjugates) or release of complement activation products (e.g., but not limited to, C1s-C1 inh, C1r-C1inh, C2a, C2b, C4a, C4b, C3a, C3b, C5a or C5b). This may be measured by any suitable method known in the art, e.g., an ELISA assay as described in Example 3.

The term "cell surface activation of C1q" herein is used to refer to the cross-linking of two C1q at a cell surface. A C1q antibody may bind to an Fc receptor via the antibody's FcR binding domain. The cell surface activation of C1q may be measured by immune complex formation (e.g., but not limited to, C1q-C3 or C1q-C4 conjugates) or release of complement activation products (e.g., C1s-C1 inh, C1r-C1inh, C2a, C2b, C4a, C4b, C3a, C3b, C5a or C5b). This may be measured by any suitable method known in the art, e.g., an in vivo experiment followed by analyzing blood serum by an ELISA assay as described in Example 8.

The term "infusion related reaction" is defined as a disorder characterized by adverse reaction to the infusion of pharmacological or biological substances. There are five grades according to the NCI Common Terminology Criteria for Adverse Events (CTCAE) version 5.0 (November 2017) for infusion related reaction. Grade 1: Mild transient reaction with no indication of infusion interruption or intervention. Examples of grade 1 signs or symptoms include, but not limited to, mucocutaneous symptoms, such as, erythema, flushing, nasal congestion, pruritus, rash, rhinitis, swelling, tearing, urticaria, and wheezing. Grade 1 symptoms may include gastrointestinal symptoms, such as bloating, cramping, diarrhea, metallic taste, nausea, and vomiting. Grade 1 symptoms may include transient signs or symptoms, such as, chills, diaphoresis, fever, feeling of warmth, rash, rigors, sweating, and wheezing. Grade 2: Therapy or infusion interruption indicated but responds promptly to symptomatic treatment (e.g., antihistamines, NSAIDS, narcotics, IV fluids); prophylactic medications indicated for <=24 hrs. Examples of grade 2 symptoms include, but not limited to, signs and symptoms listed under grade 1 requiring treatment, mild cardiovascular and bronchopulmonary symptoms, such as, hypertension, hypotension, syncope, hypoxia, bronchoconstriction, dyspnea, bronchospasm and tachycardia Grade 3: Prolonged (e.g., not rapidly responsive to symptomatic medication and/or brief interruption of infusion); recurrence of symptoms following initial improvement; hospitalization indicated for clinical sequelae. Examples of grade 3 symptoms include cardiovascular symptoms, such as, angioedema, arrhythmia, edema, hypertension, hypotension, hypoxia, myocardial infarction, shock, syncope, tachycardia, ventricular fibrillation. Bronchopulmonary symptoms including bronchospasm, hypoxia, angioedema, dyspnea, apnea, pulmonary embolism, laryngospasm. Grade 4: Life-threatening consequences; urgent intervention indicated. More severe manifestations of those listed under Grade 3. Grade 5: Death. In some embodiments, the antibody disclosed herein has an improved safety profile. In some embodiments, the antibody disclosed herein induces fewer infusion related reactions (IRRs) as compared to its corresponding full-length antibody. In some embodiments, the antibody disclosed herein causes IRR symptoms associated with CTCAE Grade 1. In some embodiments, the corresponding full-length antibody causes IRR symptoms associated with CTCAE Grade 2.

The term "hemodynamic profile" describes the relationship between cardiac output and total peripheral resistance in the homeostatic regulation of blood pressure. The hemodynamic profile may be monitored by checking the blood circulation to evaluate how well the heart is performing. The hemodynamic profile checks for hemodynamic parameters such as cardiac index, vascular tone (systemic vascular resistance index {SVRI}), heart rate, and blood pressure (BP). In some embodiments, the antibody disclosed herein has an improved hemodynamic profile. In some embodiments, the antibody disclosed herein does not cause rise in heart rate as compared to its corresponding full-length antibody. In some embodiments, the antibody disclosed herein does not cause a change in mean arterial pressure (MAP) as compared to its corresponding full-length antibody.

The term "single-arm antibody" herein is used to cover an antibody that comprises a single antigen-binding arm. The single-arm antibody may comprise an antigen-binding arm and an Fc region, wherein the single antigen-binding arm comprises a light chain variable domain and a heavy chain variable domain; and the Fc region comprises a complex of a first and a second Fc polypeptide. In some embodiments, one but not both of the Fc polypeptides is an N-terminally truncated heavy chain. In some embodiments, the antibody may be a bivalent antibody—where one arm binds C1q and the other binds a different antigen. Depending on the other antigen, such an antibody would not crosslink and activate C1q.

"An antibody with a single antigen-binding arm" as used herein means an antibody comprising a single antigen-binding arm and an Fc region, wherein the antigen-binding arm comprises a light chain variable domain and a heavy chain variable domain. In some embodiments, the antibody further comprises an inactive antigen-binding arm, which is incapable of binding to the antigen, or comprises an arm that binds to a different antigen. In some embodiments, the Fc region comprises a complex of a first and a second Fc polypeptide.

The basic 4-chain antibody unit is a heterotetrameric glycoprotein composed of two identical light (L) chains and two identical heavy (H) chains. The pairing of a $V_H$ and $V_L$ together forms a single antigen-binding site. For the structure and properties of the different classes of antibodies, see, e.g., *Basic and Clinical Immunology*, 8th Ed., Daniel P. Stites, Abba I. Terr and Tristram G. Parslow (eds.), Appleton & Lange, Norwalk, CT, 1994, page 71 and Chapter 6.

The L chain from any vertebrate species can be assigned to one of two clearly distinct types, called kappa ("κ") and lambda ("λ"), based on the amino acid sequences of their constant domains. Depending on the amino acid sequence of the constant domain of their heavy chains (CH), immunoglobulins can be assigned to different classes or isotypes. There are five classes of immunoglobulins: IgA, IgD, IgE, IgG, and IgM, having heavy chains designated alpha ("α"), delta ("δ"), epsilon ("ε"), gamma ("γ") and mu ("μ"), respectively. The γ and α classes are further divided into subclasses (isotypes) on the basis of relatively minor differences in the CH sequence and function, e.g., humans express the following subclasses: IgG1, IgG2, IgG3, IgG4, IgA1, and IgA2. The subunit structures and three dimensional configurations of different classes of immunoglobulins are well known and described generally in, for example, Abbas et al., Cellular and Molecular Immunology, $4^{th}$ ed. (W.B. Saunders Co., 2000).

An "isolated" molecule or cell is a molecule or a cell that is identified and separated from at least one contaminant molecule or cell with which it is ordinarily associated in the environment in which it was produced. Preferably, the isolated molecule or cell is free of association with all components associated with the production environment. The isolated molecule or cell is in a form other than in the form or setting in which it is found in nature. Isolated molecules therefore are distinguished from molecules existing naturally in cells; isolated cells are distinguished from cells existing naturally in tissues, organs, or individuals. In some embodiments, the isolated molecule is an anti-C1q single-arm antibody and/or anti-C1q antibody with a single antigen-binding arm of the present disclosure. In other embodiments, the isolated cell is a host cell or hybridoma cell producing an anti-C1q single-arm antibody and/or anti-C1q antibody with a single antigen-binding arm of the present disclosure.

An "isolated" antibody is one that has been identified, separated and/or recovered from a component of its production environment (e.g., naturally or recombinantly). Preferably, the isolated polypeptide is free of association with all other contaminant components from its production environment. Contaminant components from its production environment, such as those resulting from recombinant transfected cells, are materials that would typically interfere with research, diagnostic or therapeutic uses for the antibody, and may include enzymes, hormones, and other proteinaceous or non-proteinaceous solutes. In preferred embodiments, the polypeptide will be purified: (1) to greater than 95% by weight of antibody as determined by, for example, the Lowry method, and in some embodiments, to greater than 99% by weight; (2) to a degree sufficient to obtain at least 15 residues of N-terminal or internal amino acid sequence by use of a spinning cup sequenator, or (3) to homogeneity by SDS-PAGE under non-reducing or reducing conditions using Coomassie blue or, preferably, silver stain. Isolated antibody includes the antibody in situ within recombinant T-cells since at least one component of the antibody's natural environment will not be present. Ordinarily, however, an isolated polypeptide or antibody will be prepared by a process including at least one purification step.

The "variable region" or "variable domain" of an antibody refers to the amino-terminal domains of the heavy or light chain of the antibody. The variable domains of the heavy chain and light chain may be referred to as "$V_H$" and "$V_L$", respectively. These domains are generally the most variable parts of the antibody (relative to other antibodies of the same class) and contain the antigen binding sites.

The term "variable" refers to the fact that certain segments of the variable domains differ extensively in sequence among antibodies. The V domain mediates antigen binding and defines the specificity of a particular antibody for its particular antigen. However, the variability is not evenly distributed across the entire span of the variable domains. Instead, it is concentrated in three segments called hypervariable regions (HVRs) both in the light-chain and the heavy chain variable domains. The more highly conserved portions of variable domains are called the framework regions (FR). The variable domains of native heavy and light chains each comprise four FR regions, largely adopting a beta-sheet configuration, connected by three HVRs, which form loops connecting, and in some cases forming part of, the beta-sheet structure. The HVRs in each chain are held together in close proximity by the FR regions and, with the HVRs from the other chain, contribute to the formation of the antigen binding site of antibodies (see Kabat et al., *Sequences of Immunological Interest*, Fifth Edition, National Institute of Health, Bethesda, Md. (1991)). The constant domains are not involved directly in the binding of antibody to an antigen, but exhibit various effector functions, such as participation of the antibody in antibody-dependent-cellular toxicity.

As used herein, the term "CDR" or "complementarity determining region" is intended to mean the non-contiguous antigen combining sites found within the variable region of both heavy and light chain polypeptides. CDRs have been described by Kabat et al., J. Biol. Chem. 252:6609-6616 (1977); Kabat et al., U.S. Dept. of Health and Human Services, "Sequences of proteins of immunological interest" (1991) (also referred to herein as Kabat 1991); by Chothia et al., J. Mol. Biol. 196:901-917 (1987) (also referred to herein as Chothia 1987); and MacCallum et al., J. Mol. Biol. 262:732-745 (1996), where the definitions include overlapping or subsets of amino acid residues when compared against each other. Nevertheless, application of either definition to refer to a CDR of an antibody or grafted antibodies or variants thereof is intended to be within the scope of the term as defined and used herein. The amino acid residues, which encompass the CDRs, as defined by each of the above cited references are set forth below in Table (X) as a comparison. The CDRs listed in Table (X) were defined in accordance with Kabat 1991.

As used herein, the terms "CDR-L1", "CDR-L2", and "CDR-L3" refer, respectively, to the first, second, and third CDRs in a light chain variable region. As used herein, the terms "CDR-H1", "CDR-H2", and "CDR-H3" refer, respectively, to the first, second, and third CDRs in a heavy chain variable region. As used herein, the terms "CDR-1", "CDR-2", and "CDR-3" refer, respectively, to the first, second and third CDRs of either chain's variable region.

The term "monoclonal antibody" as used herein refers to an antibody obtained from a population of substantially homogeneous antibodies, i.e., the individual antibodies of the population are identical except for possible naturally occurring mutations and/or post-translation modifications (e.g., isomerizations, amidations) that may be present in minor amounts. Monoclonal antibodies are highly specific, being directed against a single antigenic site. In contrast to polyclonal antibody preparations which typically include different antibodies directed against different determinants (epitopes), each monoclonal antibody is directed against a single determinant on the antigen. In addition to their specificity, the monoclonal antibodies are advantageous in that they are synthesized by the hybridoma culture, uncontaminated by other immunoglobulins. The modifier "monoclonal" indicates the character of the antibody as being obtained from a substantially homogeneous population of antibodies, and is not to be construed as requiring production of the antibody by any particular method. For example, the monoclonal antibodies to be used in accordance with the present invention may be made by a variety of techniques, including, for example, the hybridoma method (e.g., Kohler and Milstein, *Nature,* 256:495-97 (1975); Hongo et al., *Hybridoma,* 14 (3):253-260 (1995), Harlow et al., *Antibodies: A Laboratory Manual,* (Cold Spring Harbor Laboratory Press, 2d ed. 1988); Hammerling et al., in: *Monoclonal Antibodies and T-Cell Hybridomas* 563-681 (Elsevier, N.Y., 1981)), recombinant DNA methods (see, e.g., U.S. Pat. No. 4,816,567), phage-display technologies (see, e.g., Clackson et al., *Nature,* 352:624-628 (1991); Marks et al., *J. Mol. Biol.* 222:581-597 (1992); Sidhu et al., *J. Mol. Biol.* 338(2): 299-310 (2004); Lee et al., *J. Mol. Biol.* 340(5):1073-1093 (2004); Fellouse, *Proc. Nat'l Acad. Sci. USA* 101(34): 12467-472 (2004); and Lee et al., *J. Immunol. Methods* 284(1-2):119-132 (2004), and technologies for producing human or human-like antibodies in animals that have parts or all of the human immunoglobulin loci or genes encoding human immunoglobulin sequences (see, e.g., WO 1998/ 24893; WO 1996/34096; WO 1996/33735; WO 1991/ 10741; Jakobovits et al., *Proc. Nat'l Acad. Sci. USA* 90:2551 (1993); Jakobovits et al., *Nature* 362:255-258 (1993); Bruggemann et al., *Year in Immunol.* 7:33 (1993); U.S. Pat. Nos. 5,545,807; 5,545,806; 5,569,825; 5,625,126; 5,633, 425; and U.S. Pat. No. 5,661,016; Marks et al., *Bio/Technology* 10:779-783 (1992); Lonberg et al., *Nature* 368:856-859 (1994); Morrison, *Nature* 368:812-813 (1994); Fishwild et al., *Nature Biotechnol.* 14:845-851 (1996); Neuberger, *Nature Biotechnol.* 14:826 (1996); and Lonberg and Huszar, *Intern. Rev. Immunol.* 13:65-93 (1995).

The terms "full-length antibody," "intact antibody" and "whole antibody" are used interchangeably to refer to an antibody in its substantially intact form, as opposed to an antibody fragment. Specifically whole antibodies include those with heavy and light chains including an Fc region. The constant domains may be native sequence constant domains (e.g., human native sequence constant domains) or amino acid sequence variants thereof. In some cases, the intact antibody may have one or more effector functions. The full-length antibody consists of two heavy and two light chains forming two Fab arms containing identical domains at either end attached by a flexible hinge region to the Fc domain. The full-length anti-C1q antibody described herein is capable of binding two C1q molecules, as opposed to a single-arm antibody or an antibody with a single antigen-binding arm that comprises only a single binding site to one C1q molecule.

An "antibody fragment" comprises a portion of an intact antibody, preferably the antigen binding and/or the variable region of the intact antibody. Examples of antibody fragments include Fab, Fab', F(ab')$_2$ and Fv fragments; diabodies; linear antibodies (see U.S. Pat. No. 5,641,870, Example 2; Zapata et al., *Protein Eng.* 8(10):1057-1062 (1995)); single-chain antibody molecules and multispecific antibodies formed from antibody fragments.

Papain digestion of antibodies produces two identical antigen-binding fragments, called "Fab" fragments, and a residual "Fc" fragment, a designation reflecting the ability to crystallize readily. The Fab fragment consists of an entire L chain along with the variable region domain of the H chain ($V_H$), and the first constant domain of one heavy chain ($C_H1$). Each Fab fragment is monovalent with respect to antigen binding, i.e., it has a single antigen-binding site. Pepsin treatment of an antibody yields a single large F(ab')$_2$ fragment which roughly corresponds to two disulfide linked Fab fragments having different antigen-binding activity and is still capable of cross-linking antigen. Fab' fragments differ from Fab fragments by having a few additional residues at the carboxy terminus of the $C_H1$ domain including one or more cysteines from the antibody hinge region. Fab'-SH is the designation herein for Fab' in which the cysteine residue(s) of the constant domains bear a free thiol group. F(ab')$_2$ antibody fragments originally were produced as pairs of Fab' fragments with hinge cysteines between them. Other chemical couplings of antibody fragments are also known.

The term "Fc region" herein is used to define a C-terminal region of an immunoglobulin heavy chain, which is a dimeric Fc polypeptide, including native-sequence Fc regions and variant Fc regions. Suitable native-sequence Fc regions for use in the antibodies of the invention include human IgG1, IgG2, IgG3 and IgG4. In some embodiments, the dimeric Fc polypeptide construct is heterodimeric and comprises monomeric Fc polypeptides that have been modified to promote the formation of a heterodimeric Fc. In some embodiments, the monomeric Fc polypeptides comprise variant CH3 domains having amino acid modifications that promote the formation of heterodimeric Fc domains.

A "native sequence Fc region" comprises an amino acid sequence identical to the amino acid sequence of an Fc region found in nature. Native sequence human Fc regions include a native sequence human IgG1 Fc region (non-A and A allotypes); native sequence human IgG2 Fc region; native sequence human IgG3 Fc region; and native sequence human IgG4 Fc region as well as naturally occurring variants thereof.

A "variant Fc region" comprises an amino acid sequence which differs from that of a native sequence Fc region by virtue of at least one amino acid modification, preferably one or more amino acid substitution(s). Preferably, the variant Fc region has at least one amino acid substitution compared to a native sequence Fc region or to the Fc region of a parent polypeptide, e.g. from about one to about ten amino acid substitutions, and preferably from about one to about five amino acid substitutions in a native sequence Fc region or in the Fc region of the parent polypeptide. The variant Fc region herein will preferably possess at least about 80% homology with a native sequence Fc region and/or with an Fc region of a parent polypeptide, and most preferably at least about 90% homology therewith, more preferably at least about 95% homology therewith. In some embodiments, the dimeric Fc polypeptide construct is heterodimeric and comprises monomeric Fc polypeptides that have been modified to promote the formation of a heterodimeric Fc. In some embodiments, the monomeric Fc polypeptides comprise variant CH3 domains having amino acid modifications that promote the formation of heterodimeric Fc domains.

"Fc receptor" or "FcR" describes a receptor that binds to the Fc region of an antibody. The preferred FcR is a native sequence human FcR. Moreover, a preferred FcR is one which binds an IgG antibody (a gamma receptor) and includes receptors of the FcγRI, FcγRII, and FcγRIII subclasses, including allelic variants and alternatively spliced forms of these receptors, FcγRII receptors include FcγRIIA (an "activating receptor") and FcγRIIB (an "inhibiting receptor"), which have similar amino acid sequences that differ primarily in the cytoplasmic domains thereof. Activating receptor FcγRIIA contains an immunoreceptor tyrosine-based activation motif ("ITAM") in its cytoplasmic domain. Inhibiting receptor FcγRIIB contains an immunoreceptor tyrosine-based inhibition motif ("ITIM") in its cytoplasmic domain. (see, e.g., M. Daëron, *Annu. Rev. Immunol.* 15:203-234 (1997)). FcRs are reviewed in Ravetch and Kinet, *Annu. Rev. Immunol.* 9:457-92 (1991); Capel et al., *Immunomethods* 4:25-34 (1994); and de Haas et al., *J. Lab. Clin. Med.* 126: 330-41 (1995). Other FcRs, including those to be identified in the future, are encompassed by the term "FcR" herein. FcRs can also increase the serum half-life of antibodies. The FcR binding site in the antibody may be mutated to prevent binding of the antibody to Fc receptor. Examples of FcR binding site mutations are known in the art, for example Wang, et al., IgG Fc engineering to modulate effector functions, *Protein Cell*, 2018, 9(1):63-73. Examples of FcR binding site mutations to reduce effector function are: Aglycosylated N297A or N297Q or N297G (Bolt et al., 1993; Leabman et al., 2013; Tao and Morrison, 1989; Walker et al., 1989), to reduce FcγR and C1q binding L235E (Alegre et al., 1992), to reduced FcγR and C1q binding IgG1: L234A/L235A; IgG4: F234A/L235A (Xu et al., 2000), to reduced FcγR and C1q binding IgG2/IgG4 cross isotype (Rother et al., 2007), to reduced FcγR and C1q binding IgG2: H268Q/V309L/A330S/P331S (An et al., 2009), to reduced FcγR and C1q binding IgG2: V234A/G237A/P238S/H268A/V309L/A330S/P331S (Vafa et al., 2014).

Binding to FcRn in vivo and serum half-life of human FcRn high-affinity binding polypeptides can be assayed, e.g., in transgenic mice or transfected human cell lines expressing human FcRn, or in primates to which the polypeptides having a variant Fc region are administered. WO 2004/42072 (Presta) describes antibody variants with improved or diminished binding to FcRs. See also, e.g., Shields et al., *J. Biol. Chem.* 9(2):6591-6604 (2001).

As used herein, a "chimeric antibody" refers to an antibody (immunoglobulin) in which a portion of the heavy and/or light chain is identical with or homologous to corresponding sequences in antibodies derived from a particular species or belonging to a particular antibody class or subclass, while the remainder of the chain(s) is(are) identical with or homologous to corresponding sequences in antibodies derived from another species or belonging to another antibody class or subclass, as well as fragments of such antibodies, so long as they exhibit the desired biological activity (U.S. Pat. No. 4,816,567; Morrison et al., *Proc. Nat'l Acad. Sci. USA,* 81:6851-55 (1984)). Chimeric antibodies of interest herein include PRIMATIZED® antibodies wherein the antigen-binding region of the antibody is derived from an antibody produced by, e.g., immunizing macaque monkeys with an antigen of interest. As used herein, "humanized antibody" is a subset of "chimeric antibodies."

"Humanized" forms of non-human (e.g., murine) antibodies are chimeric antibodies that contain minimal sequence derived from non-human immunoglobulin. In some embodiments, a humanized antibody is a human immunoglobulin (recipient antibody) in which residues from an HVR of the recipient are replaced by residues from an HVR of a non-human species (donor antibody) such as mouse, rat, rabbit or non-human primate having the desired specificity, affinity, and/or capacity. In some instances, FR residues of the human immunoglobulin are replaced by corresponding non-human residues. Furthermore, humanized antibodies may comprise residues that are not found in the recipient antibody or in the donor antibody. These modifications may be made to further refine antibody performance, such as binding affinity. In general, a humanized antibody will comprise substantially all of at least one, and typically two, variable domains, in which all or substantially all of the hypervariable loops correspond to those of a non-human immunoglobulin sequence, and all or substantially all of the FR regions are those of a human immunoglobulin sequence, although the FR regions may include one or more individual FR residue substitutions that improve antibody performance, such as binding affinity, isomerization, immunogenicity, and the like. The number of these amino acid substitutions in the FR is typically no more than 6 in the H chain, and in the L chain, no more than 3. The humanized antibody optionally will also comprise at least a portion of an immunoglobulin constant region (Fc), typically that of a human immunoglobulin. For further details, see, e.g., Jones et al., *Nature* 321:522-525 (1986); Riechmann et al., *Nature* 332:323-329 (1988); and Presta, *Curr. Op. Struct. Biol.* 2:593-596 (1992). See also, for example, Vaswani and Hamilton, *Ann. Allergy, Asthma & Immunol.* 1:105-115 (1998); Harris, *Biochem. Soc. Transactions* 23:1035-1038 (1995); Hurle and Gross, *Curr. Op. Biotech.* 5:428-433 (1994); and U.S. Pat. Nos. 6,982,321 and 7,087,409.

A "human antibody" is one that possesses an amino-acid sequence corresponding to that of an antibody produced by a human and/or has been made using any of the techniques for making human antibodies as disclosed herein. This definition of a human antibody specifically excludes a humanized antibody comprising non-human antigen-binding residues. Human antibodies can be produced using various techniques known in the art, including phage-display libraries. Hoogenboom and Winter, *J. Mol. Biol.,* 227: 381 (1991); Marks et al., *J. Mol. Biol.,* 222:581 (1991). Also available for the preparation of human monoclonal antibodies are methods described in Cole et al., *Monoclonal Antibodies and Cancer Therapy*, Alan R. Liss, p. 77 (1985); Boerner et al., *J. Immunol.,* 147(1):86-95 (1991). See also van Dijk and van de Winkel, *Curr. Opin. Pharmacol.* 5:368-74 (2001). Human antibodies can be prepared by administering the antigen to a transgenic animal that has been modified to produce such antibodies in response to antigenic challenge, but whose endogenous loci have been disabled, e.g., immunized xenomice (see, e.g., U.S. Pat. Nos. 6,075,181 and 6,150,584 regarding XENOMOUSE™ technology). See also, for example, Li et al., *Proc. Nat'l Acad. Sci. USA*, 103:3557-3562 (2006) regarding human antibodies generated via a human B-cell hybridoma technology.

The term "hypervariable region," "HVR," or "HV," when used herein refers to the regions of an antibody-variable domain that are hypervariable in sequence and/or form structurally defined loops. Generally, antibodies comprise six HVRs; three in the VH (H1, H2, H3), and three in the VL (L1, L2, L3). In native antibodies, H3 and L3 display the most diversity of the six HVRs, and H3 in particular is believed to play a unique role in conferring fine specificity to antibodies. See, e.g., Xu et al., *Immunity* 13:37-45 (2000); Johnson and Wu in *Methods in Molecular Biology* 248:1-25 (Lo, ed., Human Press, Totowa, NJ, 2003)). Indeed, naturally occurring camelid antibodies consisting of a heavy chain only are functional and stable in the absence of light chain. See, e.g., Hamers-Casterman et al., *Nature* 363:446-448 (1993) and Sheriff et al., *Nature Struct. Biol.* 3:733-736 (1996).

A number of HVR delineations are in use and are encompassed herein. The HVRs that are Kabat complementarity-determining regions (CDRs) are based on sequence variability and are the most commonly used (Kabat et al., supra). Chothia refers instead to the location of the structural loops (Chothia and Lesk *J. Mol. Biol.* 196:901-917 (1987)). The AbM HVRs represent a compromise between the Kabat CDRs and Chothia structural loops, and are used by Oxford Molecular's AbM antibody-modeling software. The "contact" HVRs are based on an analysis of the available complex crystal structures. The residues from each of these HVRs are noted below.

| Loop | Kabat | AbM | Chothia | Contact |
|---|---|---|---|---|
| L1 | L24-L34 | L24-L34 | L26-L32 | L30-L36 |
| L2 | L50-L56 | L50-L56 | L50-L52 | L46-L55 |
| L3 | L89-L97 | L89-L97 | L91-L96 | L89-L96 |
| H1 | H31-H35B | H26-H35B | H26-H32 | H30-H35B (Kabat numbering) |
| H1 | H31-H35 | H26-H35 | H26-H32 | H30-H35 (Chothia numbering) |
| H2 | H50-H65 | H50-H58 | H53-H55 | H47-H58 |
| H3 | H95-H102 | H95-H102 | H96-H101 | H93-H101 |

HVRs may comprise "extended HVRs" as follows: 24-36 or 24-34 (L1), 46-56 or 50-56 (L2), and 89-97 or 89-96 (L3) in the $V_L$, and 26-35 (H1), 50-65 or 49-65 (a preferred embodiment) (H2), and 93-102, 94-102, or 95-102 (H3) in the VH. The variable-domain residues are numbered according to Kabat et al., supra, for each of these extended-HVR definitions.

"Framework" or "FR" residues are those variable-domain residues other than the HVR residues as herein defined.

The Kabat numbering system is generally used when referring to a residue in the variable domain (approximately residues 1-107 of the light chain and residues 1-113 of the heavy chain) (e.g., Kabat et al., Sequences of Immunological Interest. 5th Ed. Public Health Service, National Institutes of Health, Bethesda, Md. (1991)). The "EU numbering system" or "EU index" is generally used when referring to a residue in an immunoglobulin heavy chain constant region (e.g., the EU index reported in Kabat et al., supra). The "EU index as in Kabat" refers to the residue numbering of the human IgG1 EU antibody. Unless stated otherwise herein, references to residue numbers in the variable domain of antibodies means residue numbering by the Kabat numbering system. Unless stated otherwise herein, references to residue numbers in the constant domain of antibodies means residue numbering by the EU numbering system (e.g., see United States Patent Publication No. 2010-280227).

An "acceptor human framework" as used herein is a framework comprising the amino acid sequence of a VL or VH framework derived from a human immunoglobulin framework or a human consensus framework. An acceptor human framework "derived from" a human immunoglobulin framework or a human consensus framework may comprise the same amino acid sequence thereof, or it may contain pre-existing amino acid sequence changes. In some embodiments, the number of pre-existing amino acid changes are 10 or fewer, 9 or fewer, 8 or fewer, 7 or fewer, 6 or fewer, 5 or fewer, 4 or fewer, 3 or fewer, or 2 or fewer. Where pre-existing amino acid changes are present in a VH, preferable those changes occur at only three, two, or one of positions 71H, 73H and 78H; for instance, the amino acid residues at those positions may by 71A, 73T and/or 78A. In some embodiments, the VL acceptor human framework is identical in sequence to the VL human immunoglobulin framework sequence or human consensus framework sequence.

A "human consensus framework" is a framework that represents the most commonly occurring amino acid residues in a selection of human immunoglobulin VL or VH framework sequences. Generally, the selection of human immunoglobulin VL or VH sequences is from a subgroup of variable domain sequences. Generally, the subgroup of sequences is a subgroup as in Kabat et al., *Sequences of Proteins of Immunological Interest*, 5th Ed. Public Health Service, National Institutes of Health, Bethesda, Md. (1991). Examples include for the VL, the subgroup may be subgroup kappa I, kappa II, kappa III or kappa IV as in Kabat et al., supra. Additionally, for the VH, the subgroup may be subgroup I, subgroup II, or subgroup III as in Kabat et al., supra.

An "amino-acid modification" at a specified position refers to the substitution or deletion of the specified residue, or the insertion of at least one amino acid residue adjacent the specified residue. Insertion "adjacent" to a specified residue means insertion within one to two residues thereof. The insertion may be N-terminal or C-terminal to the specified residue. The preferred amino acid modification herein is a substitution.

An "affinity-matured" antibody is one with one or more alterations in one or more HVRs thereof that result in an improvement in the affinity of the antibody for antigen, compared to a parent antibody that does not possess those alteration(s). In some embodiments, an affinity-matured antibody has nanomolar or even picomolar affinities for the target antigen. Affinity-matured antibodies are produced by procedures known in the art. For example, Marks et al., *Bio/Technology* 10:779-783 (1992) describes affinity maturation by VH- and VL-domain shuffling. Random mutagenesis of HVR and/or framework residues is described by, for example: Barbas et al. *Proc Nat. Acad. Sci. USA* 91:3809-3813 (1994); Schier et al. *Gene* 169:147-155 (1995); Yelton et al. *J. Immunol.* 155:1994-2004 (1995); Jackson et al., *J. Immunol.* 154(7):3310-9 (1995); and Hawkins et al, *J. Mol. Biol.* 226:889-896 (1992).

As use herein, the term "specifically recognizes" or "specifically binds" refers to measurable and reproducible interactions such as attraction or binding between a target and an antibody that is determinative of the presence of the target in the presence of a heterogeneous population of molecules including biological molecules. For example, an antibody that specifically or preferentially binds to a target or an epitope is an antibody that binds this target or epitope with greater affinity, avidity, more readily, and/or with greater duration than it binds to other targets or other epitopes of the target. It is also understood that, for example, an antibody (or a moiety) that specifically or preferentially binds to a first target may or may not specifically or preferentially bind to a second target. As such, "specific binding" or "preferential binding" does not necessarily require (although it can include) exclusive binding. An antibody that specifically binds to a target may have an association constant of at least about $10^3$ $M^{-1}$ or $10^4$ $M^{-1}$, sometimes about $10^5$ $M^{-1}$ or $10^6$ $M^{-1}$, in other instances about $10^6$ $M^{-1}$ or $10^7$ $M^{-1}$, about $10^8 M^{-1}$ to $10^9$ $M^{-1}$, or about $10^{10}$ $M^{-1}$ to $10^{11}$ $M^{-1}$ or higher. A variety of immunoassay formats can be used to select antibodies specifically immunoreactive with a particular protein. For example, solid-phase ELISA immunoassays are routinely used to select monoclonal antibodies specifically immunoreactive with a protein. See, e.g., Harlow and Lane (1988) Antibodies, A Laboratory Manual, Cold Spring Harbor Publications, New York, for a description of immunoassay formats and conditions that can be used to determine specific immunoreactivity.

As used herein, an "interaction" between a complement protein and a second protein encompasses, without limitation, protein-protein interaction, a physical interaction, a chemical interaction, binding, covalent binding, and ionic binding. As used herein, an antibody "inhibits interaction" between two proteins when the antibody disrupts, reduces, or completely eliminates an interaction between the two proteins. An antibody of the present disclosure, or fragment thereof, "inhibits interaction" between two proteins when the antibody or fragment thereof binds to one of the two proteins.

A "blocking" antibody, an "antagonist" antibody, an "inhibitory" antibody, or a "neutralizing" antibody is an antibody that inhibits or reduces one or more biological activities of the antigen it binds, such as interactions with one or more proteins. In some embodiments, blocking antibodies, antagonist antibodies, inhibitory antibodies, or "neutralizing" antibodies substantially or completely inhibit one or more biological activities or interactions of the antigen.

Antibody "effector functions" refer to those biological activities attributable to the Fc region (a native sequence Fc region or amino acid sequence variant Fc region) of an antibody, and vary with the antibody isotype.

As used herein, the term "affinity" refers to the equilibrium constant for the reversible binding of two agents (e.g., an antibody and an antigen) and is expressed as a dissociation constant (KD). Affinity can be at least 1-fold greater, at least 2-fold greater, at least 3-fold greater, at least 4-fold greater, at least 5-fold greater, at least 6-fold greater, at least 7-fold greater, at least 8-fold greater, at least 9-fold greater, at least 10-fold greater, at least 20-fold greater, at least 30-fold greater, at least 40-fold greater, at least 50-fold greater, at least 60-fold greater, at least 70-fold greater, at least 80-fold greater, at least 90-fold greater, at least 100-fold greater, or at least 1,000-fold greater, or more, than the affinity of an antibody for unrelated amino acid sequences. Affinity of an antibody to a target protein can be, for example, from about 100 nanomolar (nM) to about 0.1 nM, from about 100 nM to about 1 picomolar (pM), or from about 100 nM to about 1 femtomolar (fM) or more. As used herein, the term "avidity" refers to the resistance of a complex of two or more agents to dissociation after dilution. The terms "immunoreactive" and "preferentially binds" are used interchangeably herein with respect to antibodies and/or antigen-binding fragments.

The term "binding" refers to a direct association between two molecules, due to, for example, covalent, electrostatic, hydrophobic, and ionic and/or hydrogen-bond interactions, including interactions such as salt bridges and water bridges. A subject anti-C1s antibody binds specifically to an epitope within a complement C1s protein. "Specific binding" refers to binding with an affinity of at least about $10^{-7}$ M or greater, e.g., $5 \times 10^{-7}$ M, $10^{-8}$ M, $5 \times 10^{-8}$ M, and greater. "Nonspecific binding" refers to binding with an affinity of less than about $10^{-7}$ M, e.g., binding with an affinity of $10^{-6}$ M, $10^{-5}$ M, $10^{-4}$ M, etc.

The term "$k_{on}$", as used herein, is intended to refer to the rate constant for association of an antibody to an antigen.

The term "$k_{off}$", as used herein, is intended to refer to the rate constant for dissociation of an antibody from the antibody/antigen complex.

The term "$K_D$", as used herein, is intended to refer to the equilibrium dissociation constant of an antibody-antigen interaction.

As used herein, "percent (%) amino acid sequence identity" and "homology" with respect to a peptide, polypeptide or antibody sequence refers to the percentage of amino acid residues in a candidate sequence that are identical with the amino acid residues in the specific peptide or polypeptide sequence, after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are within the skill in the art, for instance, using publicly available computer software such as BLAST, BLAST-2, ALIGN or MEGALIGN™ (DNASTAR) software. Those skilled in the art can determine appropriate parameters for measuring alignment, including any algorithms known in the art needed to achieve maximal alignment over the full length of the sequences being compared.

A "biological sample" encompasses a variety of sample types obtained from an individual and can be used in a diagnostic or monitoring assay. The definition encompasses blood and other liquid samples of biological origin, solid tissue samples such as a biopsy specimen or tissue cultures or cells derived therefrom and the progeny thereof. The definition also includes samples that have been manipulated in any way after their procurement, such as by treatment with reagents, solubilization, or enrichment for certain components, such as polynucleotides. The term "biological sample" encompasses a clinical sample, and also includes cells in culture, cell supernatants, cell lysates, serum, plasma, biological fluid, and tissue samples. The term "biological sample" includes urine, saliva, cerebrospinal fluid, interstitial fluid, ocular fluid, synovial fluid, blood fractions such as plasma and serum, and the like. The term "biological sample" also includes solid tissue samples, tissue culture samples, and cellular samples.

An "isolated" nucleic acid molecule is a nucleic acid molecule that is identified and separated from at least one contaminant nucleic acid molecule with which it is ordinarily associated in the environment in which it was produced. Preferably, the isolated nucleic acid is free of association with all components associated with the production environment. The isolated nucleic acid molecules encoding the polypeptides and antibodies herein is in a form other than in the form or setting in which it is found in nature. Isolated nucleic acid molecules therefore are distinguished from nucleic acids encoding any polypeptides and antibodies herein that exist naturally in cells.

The term "vector," as used herein, is intended to refer to a nucleic acid molecule capable of transporting another nucleic acid to which it has been linked. One type of vector is a "plasmid," which refers to a circular double stranded DNA into which additional DNA segments may be ligated. Another type of vector is a phage vector. Another type of vector is a viral vector, wherein additional DNA segments may be ligated into the viral genome. Certain vectors are capable of autonomous replication in a host cell into which they are introduced (e.g., bacterial vectors having a bacterial origin of replication and episomal mammalian vectors). Other vectors (e.g., non-episomal mammalian vectors) can be integrated into the genome of a host cell upon introduction into the host cell, and thereby are replicated along with the host genome. Moreover, certain vectors are capable of directing the expression of genes to which they are operatively linked. Such vectors are referred to herein as "recombinant expression vectors," or simply, "expression vectors." In general, expression vectors useful in recombinant DNA techniques are often in the form of plasmids. In the present specification, "plasmid" and "vector" may be used interchangeably as the plasmid is the most commonly used form of vector.

"Polynucleotide," or "nucleic acid," as used interchangeably herein, refer to polymers of nucleotides of any length, and include DNA and RNA. The nucleotides can be deoxyribonucleotides, ribonucleotides, modified nucleotides or bases, and/or their analogs, or any substrate that can be incorporated into a polymer by DNA or RNA polymerase or by a synthetic reaction. A polynucleotide may comprise modified nucleotides, such as methylated nucleotides and their analogs. If present, modification to the nucleotide structure may be imparted before or after assembly of the polymer. The sequence of nucleotides may be interrupted by non-nucleotide components. A polynucleotide may comprise modification(s) made after synthesis, such as conjugation to a label. Other types of modifications include, for example, "caps," substitution of one or more of the naturally occurring nucleotides with an analog, internucleotide modifications such as, for example, those with uncharged linkages (e.g., methyl phosphonates, phosphotriesters, phosphoamidates, carbamates, etc.) and with charged linkages (e.g., phosphorothioates, phosphorodithioates, etc.), those containing pendant moieties, such as, for example, proteins (e.g., nucleases, toxins, antibodies, signal peptides, ply-L-lysine, etc.), those with intercalators (e.g., acridine, psoralen, etc.), those containing chelators (e.g., metals, radioactive metals, boron, oxidative metals, etc.), those containing alkylators, those with modified linkages (e.g., alpha anomeric nucleic acids, etc.), as well as unmodified forms of the polynucleotides(s). Further, any of the hydroxyl groups ordinarily present in the sugars may be replaced, for example, by phosphonate groups, phosphate groups, protected by standard protecting groups, or activated to prepare additional linkages to additional nucleotides, or may be conjugated to solid or semi-solid supports. The 5' and 3' terminal OH can be phosphorylated or substituted with amines or organic capping group moieties of from 1 to 20 carbon atoms. Other hydroxyls may also be derivatized to standard protecting groups. Polynucleotides can also contain analogous forms of ribose or deoxyribose sugars that are generally known in the art, including, for example, 2'-O-methyl-, 2'-O-allyl-, 2'-fluoro- or 2'-azido-ribose, carbocyclic sugar analogs, α-anomeric sugars, epimeric sugars such as arabinose, xyloses or lyxoses, pyranose sugars, furanose sugars, sedoheptuloses, acyclic analogs, and basic nucleoside analogs such as methyl riboside. One or more phosphodiester linkages may be replaced by alternative linking groups. These alternative linking groups include, but are not limited to, embodiments wherein phosphate is replaced by P(O)S ("thioate"), P(S)S ("dithioate"), (O)NR$_2$ ("amidate"), P(O)R, P(O)OR', CO, or CH$_2$ ("formacetal"), in which each R or R' is independently H or substituted or unsubstituted alkyl (1-20 C) optionally containing an ether (—O—) linkage, aryl, alkenyl, cycloalkyl, cycloalkenyl or aralkyl. Not all linkages in a polynucleotide need be identical. The preceding description applies to all polynucleotides referred to herein, including RNA and DNA.

A "host cell" includes an individual cell or cell culture that can be or has been a recipient for vector(s) for incorporation of polynucleotide inserts. Host cells include progeny of a single host cell, and the progeny may not necessarily be completely identical (in morphology or in genomic DNA complement) to the original parent cell due to natural, accidental, or deliberate mutation. A host cell includes cells transfected in vivo with a polynucleotide(s) of this invention.

"Carriers" as used herein include pharmaceutically acceptable carriers, excipients, or stabilizers that are non-toxic to the cell or mammal being exposed thereto at the dosages and concentrations employed. Often the physiologically acceptable carrier is an aqueous pH buffered solution. Examples of physiologically acceptable carriers include buffers such as phosphate, citrate, and other organic acids; antioxidants including ascorbic acid; low molecular weight (less than about 10 residues) polypeptide; proteins, such as serum albumin, gelatin, or immunoglobulins; hydrophilic polymers such as polyvinylpyrrolidone; amino acids such as glycine, glutamine, asparagine, arginine or lysine; monosaccharides, disaccharides, and other carbohydrates including glucose, mannose, or dextrins; chelating agents such as EDTA; sugar alcohols such as mannitol or sorbitol; salt-forming counterions such as sodium; and/or nonionic surfactants such as polysorbate 20, polysorbate 40, polysorbate 60, polysorbate 80, TWEEN™ polyethylene glycol (PEG), and PLURONICS™.

The term "about" as used herein refers to the usual error range for the respective value readily known to the skilled person in this technical field. Reference to "about" a value or parameter herein includes (and describes) embodiments that are directed to that value or parameter per se.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited. such as, for example, the widely utilized methodologies described in Sambrook et al., *Molecular Cloning: A Laboratory Manual* 3d edition (2001) Cold Spring Harbor Laboratory Press, Cold Spring Harbor, N.Y.; *Current Protocols in Molecular Biology* (F. M. Ausubel, et al. eds., (2003)); the series *Methods in Enzymology* (Academic Press, Inc.): PCR 2: A Practical Approach (M. J. MacPherson, B. D. Hames and G. R. Taylor eds. (1995)), Harlow and Lane, eds. (1988)

*Antibodies, A Laboratory Manual*, and *Animal Cell Culture* (R. I. Freshney, ed. (1987)); *Oligonucleotide Synthesis* (M. J. Gait, ed., 1984); *Methods in Molecular Biology*, Humana Press; *Cell Biology: A Laboratory Notebook* (J. E. Cellis, ed., 1998) Academic Press; *Animal Cell Culture* (R. I. Freshney), ed., 1987); *Introduction to Cell and Tissue Culture* (J. P. Mather and P. E. Roberts, 1998) Plenum Press; *Cell and Tissue Culture: Laboratory Procedures* (A. Doyle, J. B. Griffiths, and D. G. Newell, eds., 1993-8) J. Wiley and Sons; *Handbook of Experimental Immunology* (D. M. Weir and C. C. Blackwell, eds.); *Gene Transfer Vectors for Mammalian Cells* (J. M. Miller and M. P. Calos, eds., 1987); *PCR: The Polymerase Chain Reaction*, (Mullis et al., eds., 1994); *Current Protocols in Immunology* (J. E. Coligan et al., eds., 1991); *Short Protocols in Molecular Biology* (Wiley and Sons, 1999); *Immunobiology* (C. A. Janeway and P. Travers, 1997); *Antibodies* (P. Finch, 1997); *Antibodies: A Practical Approach* (D. Catty., ed., IRL Press, 1988-1989); *Monoclonal Antibodies: A Practical Approach* (P. Shepherd and C. Dean, eds., Oxford University Press, 2000); *Using Antibodies: A Laboratory Manual* (E. Harlow and D. Lane (Cold Spring Harbor Laboratory Press, 1999); *The Antibodies* (M. Zanetti and J. D. Capra, eds., Harwood Academic Publishers, 1995); and *Cancer: Principles and Practice of Oncology* (V. T. DeVita et al., eds., J. B. Lippincott Company, 1993).

Methods of Treatment

The methods of the invention provide for modulating the immune response to diseases disclosed herein through administering agents that are antagonists of complement. For example, without being bound by theory, immature astrocytes induce expression of C1q proteins in neurons during development. Inflammatory mediators such as complement factor are normally expressed at very low levels in healthy brain tissue but can be rapidly induced by a variety of insults to the brain such as infection, ischaemia, and injury. Activation of C1q, C1r, and C1s contributes to the inflammatory response, which leads to synaptic loss, along with the generation and recurrence of seizures and seizure-related neuronal damage. During the developmental process of neurodegenerative disease, overexpression of C1q, C1r, and C1s may be coupled with a signal for complement activation, e.g., β-amyloid, APP, cytokines such as IFNγ, TNFα, and the like, also resulting in inflammation.

By administering a single-arm antibody and/or anti-C1q antibody with a single antigen-binding arm as disclosed herein that inhibits complement activation, synapses can be maintained that would otherwise be lost.

The methods neutralize complement biological activity. The affected complement biological activity could be (1) C1q binding to an autoantibody, (2) C1q binding to C1r, (3) C1q binding to C1s, (4) C1q binding to IgM, (5) C1q binding to phosphatidylserine, (6) C1q binding to pentraxin-3, (7) C1q binding to C-reactive protein (CRP), (8) C1q binding to globular C1q receptor (gC1qR), (9) C1q binding to complement receptor 1 (CR1), (10) C1q binding to beta-amyloid, (11) C1q binding to calreticulin, (12) C1q binding to apoptotic cells, or (13) C1q binding to B cells. The affected complement biological activity could further be (1) activation of the classical complement activation pathway, (2) activation of antibody and complement dependent cytotoxicity, (3) CH50 hemolysis, (4) synapse loss, (5) B-cell antibody production, (6) dendritic cell maturation, (7) T-cell proliferation, (8) cytokine production (9) microglia or macrophage activation, (10) Arthus reaction, (11) phagocytosis of synapses or nerve endings, or (12) activation of complement receptor 3 (CR3/C3) expressing cells.

The methods promote improved maintenance of neuronal function in conditions associated with synapse loss. The maintenance of neural connections provides for functional improvement in neurodegenerative disease relative to untreated patients. The prevention of synapse loss may comprise at least a measurable improvement relative to a control lacking such treatment over the period of 1, 2, 3, 4, 5, 6 days or at least one week, for example at least a 10% improvement in the number of synapses, at least a 20% improvement, at least a 50% improvement, or more.

In one aspect, described herein is a method of inhibiting synapse loss comprising administering to a patient suffering from adverse synapse loss an antibody described herein. In some embodiments, the patient has suffered synapse loss as a result of a neurodegenerative disorder, central nervous system disorder, or a peripheral nervous system disorder. The neurodegenerative disorder may be Alzheimer's disease. In some embodiments, the method further comprises administration of neural progenitors, or a neurogenesis enhancer. In some embodiments, the antibody binds to C1q and inhibits complement activation.

In one aspect, described herein is a method of treating or preventing a disease associated with complement activation in an individual in need of such treatment, the method comprising administering the antibody described herein. The disease associated with complement activation may be a neurodegenerative disorder, which may be associated with loss of synapses or loss nerve connections, associated with synapse loss that is dependent on the complement receptor 3(CR3)/C3 or complement receptor CR1, associated with pathological activity-dependent synaptic pruning, or associated with synapse phagocytosis by microglia. The neurodegenerative disorder may be Alzheimer's disease, amyotrophic lateral sclerosis (ALS), multiple sclerosis, an ophthalmic disorder, glaucoma, myotonic dystrophy, Guillain-Barre' syndrome (GBS), Myasthenia Gravis, Bullous Pemphigoid, spinal muscular atrophy, Down syndrome, Parkinson's disease, or Huntington's disease (HD). In some embodiments, the neurodegenerative disorder is ALS, GBS or HD.

In some embodiments, the disease associated with complement activation is an inflammatory disease, autoimmune disease, complement-associated eye disease or metabolic disorder, such as diabetes, obesity, rheumatoid arthritis (RA), acute respiratory distress syndrome (ARDS), remote tissue injury after ischemia and reperfusion, complement activation during cardiopulmonary bypass surgery, dermatomyositis, pemphigus, lupus nephritis and resultant glomerulonephritis and vasculitis, cardiopulmonary bypass, cardioplegia-induced coronary endothelial dysfunction, type II membranoproliferative glomerulonephritis, IgA nephropathy, acute renal failure, cryoglobulinemia, antiphospholipid syndrome, glaucoma, Chronic open-angle glaucoma, acute closed angle glaucoma, macular degenerative diseases, age-related macular degeneration (AMD), geographic atrophy, choroidal neovascularization (CNV), uveitis, diabetic retinopathy, ischemia-related retinopathy, endophthalmitis, intraocular neovascular disease, diabetic macular edema, pathological myopia, von Hippel-Lindau disease, histoplasmosis of the eye, Neuromyelitis Optica (NMO), Central Retinal Vein Occlusion (CRVO), corneal neovascularization, retinal neovascularization, Leber's hereditary optic neuropathy, optic neuritis, Behcet's retinopathy, ischemic optic neuropathy, retinal vasculitis, ANCA vasculitis, Purtscher retinopathy, Sjogren's dry eye disease, dry AMD, sarcoidosis, temporal arteritis, polyarteritis nodosa, multiple sclerosis, allo-transplantation, hyperacute rejection, hemodialysis, chronic occlusive pulmonary distress syndrome (COPD), asthma, aspiration pneumonia, multiple sclerosis, Guillain-Barre syndrome, Myasthenia Gravis, Bullous Pemphigoid, or myositis.

In some embodiments, the disease associated with complement activation is an autoimmune disease selected from myasthenia gravis, Diabetes mellitus type 1, Hashimoto's thyroiditis, Addison's disease, Coeliac disease, Crohn's disease, pernicious anemia, Pemphigus vulgaris, vitiligo, autoimmune hemolytic anemias, paraneoplastic syndromes, a vasculitis disease, hypocomplementemic urticarial vasculitis (HUV), polymyalgia rheumatica, temporal arteritis, Wegener's granulomatosis, multiple sclerosis, Guillain-Barre syndrome, Myasthenia Gravis, Bullous Pemphigoid, or myositis.

In some embodiments, the disease associated with complement activation is a blood disorder selected from cold agglutinin hemolytic anemia (cold agglutinin disease), cold antibody hemolytic anemia, ABO incompatible acute hemolytic reactions, warm agglutinin hemolytic anemia, warm antibody hemolytic anemia, warm autoimmune hemolytic anemia (WAIHA), autoimmune hemolytic anemia (AIHA) autoimmune thrombocytopenia, antiphospholipid syndrome, Evan's syndrome, neonatal alloimmune thrombocytopenia, red blood cell alloimmunization, Felty's syndrome, antibody mediated thrombocytopenia, heparin-induced thrombocytopenia (HIT), heparin-induced thrombocytopenia and thrombosis (HITT), thrombotic thrombocytopenic purpura (TTP), immune thrombocytopenic purpura (ITP), thrombocytopenia, thrombosis, vasculitis, lupus nephritis, systemic lupus erythematosus (SLE), glomerulonephritis, anti-phospholipid antibody syndrome (APS), an infection, or a drug-induced hematologic disorder.

By "neurological" or "cognitive" function as used herein, it is meant that the decrease of synapses in the brain enhances the patient's ability to think, function, etc. As used herein, the term "subject" encompasses mammals and non-mammals. Examples of mammals include, but are not limited to, any member of the mammalian class: humans, non-human primates such as chimpanzees, and other apes and monkey species; farm animals such as cattle, horses, sheep, goats, swine; domestic animals such as rabbits, dogs, and cats; laboratory animals including rodents, such as rats, mice and guinea pigs, and the like. The term does not denote a particular age or gender.

Amyotrophic lateral sclerosis (ALS) is a rapidly progressive, invariably fatal neurological disease that attacks motor neurons. Muscular weakness and atrophy and signs of anterior horn cell dysfunction are initially noted most often in the hands and less often in the feet. The site of onset is random, and progression is asymmetric. Cramps are common and may precede weakness. Rarely, a patient survives 30 yr; 50% die within 3 yr of onset, 20% live 5 yr, and 10% live 10 yr. Diagnostic features include onset during middle or late adult life and progressive, generalized motor involvement without sensory abnormalities. Nerve conduction velocities are normal until late in the disease.

A decrease in cell body area, number of synapses and total synaptic length has been reported in even normal-appearing neurons of the ALS patients. It has been suggested that when the plasticity of the active zone reaches its limit, a continuing loss of synapses can lead to functional impairment. Preventing synapse loss may maintain neuron function in these patients.

Huntington's disease (HD) is a hereditary progressive neurodegenerative disorder characterized by the development of emotional, behavioral, and psychiatric abnormalities; loss of previously acquired intellectual or cognitive functioning; and movement abnormalities (motor disturbances). The classic signs of HD include the development of chorea—or involuntary, rapid, irregular, jerky movements that may affect the face, arms, legs, or trunk—as well as the gradual loss of thought processing and acquired intellectual abilities (dementia). There may be impairment of memory, abstract thinking, and judgment; improper perceptions of time, place, or identity (disorientation); increased agitation; and personality changes (personality disintegration). Although symptoms typically become evident during the fourth or fifth decades of life, the age at onset is variable and ranges from early childhood to late adulthood (e.g., 70s or 80s).

HD is transmitted within families as an autosomal dominant trait. The disorder occurs as the result of abnormally long sequences or "repeats" of coded instructions within a gene on chromosome 4 (4p16.3). The progressive loss of nervous system function associated with HD results from loss of neurons in certain areas of the brain, including the basal ganglia and cerebral cortex.

The complement inhibitors of the present disclosure may be used, without limitation, conjointly with any additional treatment, such as immunosuppressive therapies, for any disease disclosed herein, including autoimmune and/or neurodegenerative diseases.

In some embodiments, the antibodies of this disclosure are administered in combination with an inhibitor of the alternative pathway of complement activation. Such inhibitors may include, without limitation, factor B blocking antibodies, factor D blocking antibodies, soluble, membrane-bound, tagged or fusion-protein forms of CD59, DAF, CR1, CR2, Crry or Comstatin-like peptides that block the cleavage of C3, non-peptide C3aR antagonists such as SB 290157, Cobra venom factor or non-specific complement inhibitors such as nafamostat mesilate (FUTHAN; FUT-175), aprotinin, K-76 monocarboxylic acid (MX-1) and heparin (see, e.g., T. E. Mollnes & M. Kirschfink, Molecular Immunology 43 (2006) 107-121). In some embodiments, the antibodies of this disclosure are administered in combination with an inhibitor of the interaction between the autoantibody and its autoantigen. Such inhibitors may include purified soluble forms of the autoantigen, or antigen mimetics such as peptide or RNA-derived mimotopes, including mimotopes of the AQP4 antigen. Alternatively, such inhibitors may include blocking agents that recognize the autoantigen and prevent binding of the autoantibody without triggering the classical complement pathway. Such blocking agents may include, e.g., autoantigen-binding RNA aptamers or antibodies lacking functional C1q binding sites in their Fc domains (e.g., Fab fragments or antibody otherwise engineered not to bind C1q).

Pharmaceutical Compositions

The single-arm antibody and/or anti-C1q antibody with a single antigen-binding arm of the present invention may be administered for the treatment of complement-associated conditions in the form of pharmaceutical compositions.

It is contemplated that compositions may be obtained and used under the guidance of a physician for in vivo use. The dosage of the therapeutic formulation may vary widely, depending upon the nature of the disease, the frequency of administration, the manner of administration, the clearance of the agent from the host, and the like.

Therapeutic formulations of a single-arm antibody and/or anti-C1q antibody with a single antigen-binding arm of the invention, are prepared for storage by mixing the single-arm antibody and/or anti-C1q antibody with a single antigen-binding arm having the desired degree of purity with optional pharmaceutically acceptable carriers, excipients or stabilizers (*Remington's Pharmaceutical Sciences* 16th edition, Osol, A. Ed. [1980]), in the form of lyophilized formulations or aqueous solutions. Acceptable carriers, excipients, or stabilizers are nontoxic to recipients at the dosages and concentrations employed, and include buffers such as phosphate, citrate, sodium succinate and other organic acids; antioxidants including ascorbic acid and methionine; preservatives (such as octadecyldimethylbenzyl ammonium chloride; hexamethonium chloride; benzalkonium chloride, benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g. Zn-protein complexes); and/or non-ionic surfactants such as polysorbate 20, polysorbate 40, polysorbate 60, polysorbate 80, TWEEN™, PLURONICS™ or polyethylene glycol (PEG). In some embodiments, the therapeutic formulation comprises a single-arm antibody and/or anti-C1q antibody with a single antigen-binding arm, sodium succinate buffer, trehalose and polysorbate 80. In further embodiments, the single-arm antibody and/or anti-C1q antibody with a single antigen-binding arm is formulated in 20 mM sodium succinate buffer, 240 mM trehalose, 0.04% (w/v) polysorbate 80, pH5.8.

Lipofections or liposomes can also be used to deliver the single-arm antibody and/or anti-C1q antibody with a single antigen-binding arm into cell.

The single-arm antibody and/or anti-C1q antibody with a single antigen-binding arm may also be entrapped in microcapsules prepared, for example, by coascervation techniques or by interfacial polymerization, for example, hydroxymethylcellulose or gelatin-microcapsules and poly-(methylmethacylate) microcapsules, respectively, in colloidal drug delivery systems (for example, liposomes, albumin microspheres, microemulsions, nano-particles and nanocapsules) or in macroemulsions. Such techniques are disclosed in *Remington's Pharmaceutical Sciences* 16th edition, Osol, A. Ed. (1980).

The formulations to be used for in vivo administration are preferably sterile. This is readily accomplished by filtration through sterile filtration membranes.

Sustained-release preparations may be prepared. Suitable examples of sustained-release preparations include semipermeable matrices of solid hydrophobic polymers containing the single-arm antibody and/or anti-C1q antibody with a single antigen-binding arm, which matrices are in the form of shaped articles, e.g. films, or microcapsules. Examples of sustained-release matrices include polyesters, hydrogels (for example, poly(2-hydroxyethyl-methacrylate), or poly(vinylalcohol)), polylactides (U.S. Pat. No. 3,773,919), copolymers of L-glutamic acid and γ ethyl-L-glutamate, non-degradable ethylene-vinyl acetate, degradable lactic acid-glycolic acid copolymers such as the LUPRON DEPOT™ (injectable microspheres composed of lactic acid-glycolic acid copolymer and leuprolide acetate), and poly-D-(-)-3-hydroxybutyric acid. While polymers such as ethylene-vinyl acetate and lactic acid-glycolic acid enable release of molecules for over 100 days, certain hydrogels release proteins for shorter time periods.

The compounds of the invention for prevention or treatment of an ocular disease or condition are typically administered by ocular, intraocular, and/or intravitreal injection. Other methods administration by also be used, which includes but is not limited to, topical, parenteral, subcutaneous, intraperitoneal, intrapulmonary, intranasal, and intralesional administration. Parenteral infusions include intramuscular, intravenous, intra-arterial, intraperitoneal, or subcutaneous administration.

Formulations for ocular, intraocular or intravitreal administration can be prepared by methods and using ingredients known in the art. A main requirement for efficient treatment is proper penetration through the eye. Unlike diseases of the front of the eye, where drugs can be delivered topically, retinal diseases require a more site-specific approach. Eye drops and ointments rarely penetrate the back of the eye, and the blood-ocular barrier hinders penetration of systemically administered drugs into ocular tissue. Accordingly, usually the method of choice for drug delivery to treat retinal disease, such as AMD and CNV, is direct intravitreal injection. Intravitreal injections are usually repeated at intervals which depend on the patient's condition, and the properties and half-life of the drug delivered. For intraocular (e.g., intravitreal) penetration, usually molecules of smaller size are preferred.

The efficacy of the treatment of complement-associated eye conditions, such as AMD or CNV, can be measured by various endpoints commonly used in evaluating intraocular diseases. For example, vision loss can be assessed. Vision loss can be evaluated by, but not limited to, e.g., measuring by the mean change in best correction visual acuity (BCVA) from baseline to a desired time point (e.g., where the BCVA is based on Early Treatment Diabetic Retinopathy Study (ETDRS) visual acuity chart and assessment at a test distance of 4 meters), measuring the proportion of subjects who lose fewer than 15 letters in visual acuity at a desired time point compared to baseline, measuring the proportion of subjects who gain greater than or equal to 15 letters in visual acuity at a desired time point compared to baseline, measuring the proportion of subjects with a visual-acuity Snellen equivalent of 20/2000 or worse at a desired time point, measuring the NEI Visual Functioning Questionnaire, measuring the size of CNV and amount of leakage of CNV at a desired time point, e.g., by fluorescein angiography, etc. Ocular assessments can be done, e.g., which include, but are not limited to, e.g., performing eye exam, measuring intraocular pressure, assessing visual acuity, measuring slit-lamp pressure, assessing intraocular inflammation, etc.

Pharmaceutical compositions can include, depending on the formulation desired, pharmaceutically-acceptable, non-toxic carriers of diluents, which are defined as vehicles commonly used to formulate pharmaceutical compositions for animal or human administration. The diluent is selected so as not to affect the biological activity of the combination. Examples of such diluents are distilled water, buffered water, physiological saline, PBS, Ringer's solution, dextrose solution, and Hank's solution. In addition, the pharmaceutical composition or formulation can include other carriers, adjuvants, or non-toxic, nontherapeutic, non-immunogenic stabilizers, excipients and the like. The compositions can also include additional substances to approximate physiological conditions, such as pH adjusting and buffering agents, toxicity adjusting agents, wetting agents and detergents.

The composition can also include any of a variety of stabilizing agents, such as an antioxidant for example. When the pharmaceutical composition includes a polypeptide, the polypeptide can be complexed with various well-known compounds that enhance the in vivo stability of the polypeptide, or otherwise enhance its pharmacological properties (e.g., increase the half-life of the polypeptide, reduce its toxicity, enhance solubility or uptake). Examples of such modifications or complexing agents include sulfate, gluconate, citrate and phosphate. The polypeptides of a composition can also be complexed with molecules that enhance their in vivo attributes. Such molecules include, for example, carbohydrates, polyamines, amino acids, other peptides, ions (e.g., sodium, potassium, calcium, magnesium, manganese), and lipids.

Further guidance regarding formulations that are suitable for various types of administration can be found in Remington's Pharmaceutical Sciences, Mace Publishing Company, Philadelphia, Pa., 17th ed. (1985). For a brief review of methods for drug delivery, see, Langer, Science 249: 1527-1533 (1990).

The pharmaceutical compositions can be administered for prophylactic and/or therapeutic treatments. Toxicity and therapeutic efficacy of the active ingredient can be determined according to standard pharmaceutical procedures in cell cultures and/or experimental animals, including, for example, determining the $LD_{50}$ (the dose lethal to 50% of the population) and the $ED_{50}$ (the dose therapeutically effective in 50% of the population). The dose ratio between toxic and therapeutic effects is the therapeutic index and it can be expressed as the ratio $LD_{50}/ED_{50}$. Compounds that exhibit large therapeutic indices are preferred.

The data obtained from cell culture and/or animal studies can be used in formulating a range of dosages for humans. The dosage of the active ingredient typically lines within a range of circulating concentrations that include the $ED_{50}$ with low toxicity. The dosage can vary within this range depending upon the dosage form employed and the route of administration utilized.

The pharmaceutical compositions described herein can be administered in a variety of different ways. Examples include administering a composition containing a pharmaceutically acceptable carrier via oral, intranasal, rectal, topical, intraperitoneal, intravenous, intramuscular, subcutaneous, subdermal, transdermal, intrathecal, and intracranial methods.

Formulations suitable for parenteral administration include aqueous and non-aqueous, isotonic sterile injection solutions, which can contain antioxidants, buffers, bacteriostats, and solutes that render the formulation isotonic with the blood of the intended recipient, and aqueous and non-aqueous sterile suspensions that can include suspending agents, solubilizers, thickening agents, stabilizers, and preservatives.

The components used to formulate the pharmaceutical compositions are preferably of high purity and are substantially free of potentially harmful contaminants (e.g., at least National Food (NF) grade, generally at least analytical grade, and more typically at least pharmaceutical grade). Moreover, compositions intended for in vivo use are usually sterile. To the extent that a given compound must be synthesized prior to use, the resulting product is typically substantially free of any potentially toxic agents, particularly any endotoxins, which may be present during the synthesis or purification process. Compositions for parental administration are also sterile, substantially isotonic and made under GMP conditions.

The compositions of the invention may be administered using any medically appropriate procedure, e.g. intravascular (intravenous, intra-arterial, intracapillary) administration, injection into the cerebrospinal fluid, intracavity or direct injection in the brain. Intrathecal administration may be carried out through the use of an Ommaya reservoir, in accordance with known techniques. (F. Balis et al., Am J. Pediatr. Hematol. Oncol. 11, 74, 76 (1989).

Where the therapeutic agents are locally administered in the brain, one method for administration of the therapeutic compositions of the invention is by deposition into or near the site by any suitable technique, such as by direct injection (aided by stereotaxic positioning of an injection syringe, if necessary) or by placing the tip of an Ommaya reservoir into a cavity, or cyst, for administration. Alternatively, a convection-enhanced delivery catheter may be implanted directly into the site, into a natural or surgically created cyst, or into the normal brain mass. Such convection-enhanced pharmaceutical composition delivery devices greatly improve the diffusion of the composition throughout the brain mass. The implanted catheters of these delivery devices utilize high-flow microinfusion (with flow rates in the range of about 0.5 to 15.0 µl/minute), rather than diffusive flow, to deliver the therapeutic composition to the brain and/or tumor mass. Such devices are described in U.S. Pat. No. 5,720,720, incorporated fully herein by reference.

The effective amount of a therapeutic composition to be given to a particular patient will depend on a variety of factors, several of which will be different from patient to patient. A competent clinician will be able to determine an effective amount of a therapeutic agent to administer to a patient. Dosage of the agent will depend on the treatment, route of administration, the nature of the therapeutics, sensitivity of the patient to the therapeutics, etc. Utilizing $LD_{50}$ animal data, and other information, a clinician can determine the maximum safe dose for an individual, depending on the route of administration. Utilizing ordinary skill, the competent clinician will be able to optimize the dosage of a particular therapeutic composition in the course of routine clinical trials. The compositions can be administered to the subject in a series of more than one administration. For therapeutic compositions, regular periodic administration will sometimes be required, or may be desirable. Therapeutic regimens will vary with the agent; for example, some agents may be taken for extended periods of time on a daily or semi-daily basis, while more selective agents may be administered for more defined time courses, e.g., one, two three or more days, one or more weeks, one or more months, etc., taken daily, semi-daily, semi-weekly, weekly, etc.

Formulations may be optimized for retention and stabilization in the brain. When the agent is administered into the cranial compartment, it is desirable for the agent to be retained in the compartment, and not to diffuse or otherwise cross the blood brain barrier. Stabilization techniques include cross-linking, multimerizing, or linking to groups such as polyethylene glycol, polyacrylamide, neutral protein carriers, etc., in order to achieve an increase in molecular weight.

Other strategies for increasing retention include the entrapment of the agent in a biodegradable or bioerodible implant. The rate of release of the therapeutically active agent is controlled by the rate of transport through the polymeric matrix, and the biodegradation of the implant. The transport of drug through the polymer barrier will also be affected by compound solubility, polymer hydrophilicity, extent of polymer cross-linking, expansion of the polymer upon water absorption so as to make the polymer barrier more permeable to the drug, geometry of the implant, and the like. The implants are of dimensions commensurate with the size and shape of the region selected as the site of implantation. Implants may be particles, sheets, patches, plaques, fibers, microcapsules and the like and may be of any size or shape compatible with the selected site of insertion.

The implants may be monolithic, i.e., having the active agent homogenously distributed through the polymeric matrix, or encapsulated, where a reservoir of active agent is encapsulated by the polymeric matrix. The selection of the polymeric composition to be employed will vary with the site of administration, the desired period of treatment, patient tolerance, the nature of the disease to be treated and the like. Characteristics of the polymers will include biodegradability at the site of implantation, compatibility with the agent of interest, ease of encapsulation, a half-life in the physiological environment.

Biodegradable polymeric compositions which may be employed may be organic esters or ethers, which when degraded result in physiologically acceptable degradation products, including the monomers. Anhydrides, amides, orthoesters or the like, by themselves or in combination with other monomers, may find use. The polymers will be condensation polymers. The polymers may be cross-linked or non-cross-linked. Of particular interest are polymers of hydroxyaliphatic carboxylic acids, either homo- or copolymers, and polysaccharides. Included among the polyesters of interest are polymers of D-lactic acid, L-lactic acid, racemic lactic acid, glycolic acid, polycaprolactone, and combinations thereof. By employing the L-lactate or D-lactate, a slowly biodegrading polymer is achieved, while degradation is substantially enhanced with the racemate. Copolymers of glycolic and lactic acid are of particular interest, where the rate of biodegradation is controlled by the ratio of glycolic to lactic acid. The most rapidly degraded copolymer has roughly equal amounts of glycolic and lactic acid, where either homopolymer is more resistant to degradation. The ratio of glycolic acid to lactic acid will also affect the brittleness of in the implant, where a more flexible implant is desirable for larger geometries. Among the polysaccharides of interest are calcium alginate, and functionalized celluloses, particularly carboxymethylcellulose esters characterized by being water insoluble, a molecular weight of about 5 kD to 500 kD, etc. Biodegradable hydrogels may also be employed in the implants of the subject invention. Hydrogels are typically a copolymer material, characterized by the ability to imbibe a liquid. Exemplary biodegradable hydrogels which may be employed are described in Heller in: Hydrogels in Medicine and Pharmacy, N. A. Peppes ed., Vol. III, CRC Press, Boca Raton, Fla., 1987, pp 137-149.

Preferably, the agents of the present invention are administered at a dosage that decreases synapse loss while minimizing any side-effects. It is contemplated that compositions will be obtained and used under the guidance of a physician for in vivo use. The dosage of the therapeutic formulation will vary widely, depending upon the nature of the disease, the frequency of administration, the manner of administration, the clearance of the agent from the host, and the like.

The effective amount of a therapeutic composition to be given to a particular patient will depend on a variety of factors, several of which will be different from patient to patient. Utilizing ordinary skill, the competent clinician will be able to tailor the dosage of a particular therapeutic or imaging composition in the course of routine clinical trials.

Therapeutic agents, e.g., inhibitors of complement, activators of gene expression, etc. can be incorporated into a variety of formulations for therapeutic administration by combination with appropriate pharmaceutically acceptable carriers or diluents, and may be formulated into preparations in solid, semi-solid, liquid or gaseous forms, such as tablets, capsules, powders, granules, ointments, solutions, suppositories, injections, inhalants, gels, microspheres, and aerosols. As such, administration of the compounds can be achieved in various ways, including oral, buccal, rectal, parenteral, intraperitoneal, intradermal, transdermal, intrathecal, nasal, intracheal, etc., administration. The active agent may be systemic after administration or may be localized by the use of regional administration, intramural administration, or use of an implant that acts to retain the active dose at the site of implantation.

Nucleic Acids, Vectors and Host Cells

In some embodiments, isolated nucleic acids having a nucleotide sequence encoding any of the single-arm antibodies and/or anti-C1q antibodies with a single antigen-binding arm of the present disclosure are provided. Such nucleic acids may encode an amino acid sequence containing the light chain and/or an amino acid sequence containing the heavy chain of the single-arm antibodies and/or anti-C1q antibody. In some embodiments, one or more vectors (e.g., expression vectors) containing such nucleic acids are provided. In some embodiments, a host cell containing such nucleic acid is also provided. In some embodiments, the host cell is eukaryotic, e.g., a Chinese Hamster Ovary (CHO) cell or lymphoid cell (e.g., Y0, NS0, Sp20 cell).

Methods of making an anti-C1q single-arm antibody and/or anti-C1q antibody with a single antigen-binding arm of the present disclosure are provided. In some embodiments, the method includes culturing a host cell of the present disclosure containing a nucleic acid encoding the anti-C1q single-arm antibody and/or anti-C1q antibody with a single antigen-binding arm, under conditions suitable for expression of the single-arm antibody and/or anti-C1q antibody with a single antigen-binding arm. In some embodiments, the single-arm antibody and/or anti-C1q antibody with a single antigen-binding arm is subsequently recovered from the host cell (or host cell culture medium).

For recombinant production of a humanized anti-C1q single-arm antibody and/or anti-C1q antibody with a single antigen-binding arm of the present disclosure, a nucleic acid encoding the anti-C1q single-arm antibody and/or anti-C1q antibody with a single antigen-binding arm is isolated and inserted into one or more vectors for further cloning and/or expression in a host cell. Such nucleic acid may be readily isolated and sequenced using conventional procedures (e.g., by using oligonucleotide probes that are capable of binding specifically to genes encoding the heavy and light chains of the antibody).

Suitable vectors containing a nucleic acid sequence encoding any of the anti-C1q single-arm antibody and/or anti-C1q antibody with a single antigen-binding arm of the present disclosure, or fragments thereof polypeptides (including antibodies) described herein include, without limitation, cloning vectors and expression vectors. Suitable cloning vectors can be constructed according to standard techniques, or may be selected from a large number of cloning vectors available in the art. While the cloning vector selected may vary according to the host cell intended to be used, useful cloning vectors generally have the ability to self-replicate, may possess a single target for a particular restriction endonuclease, and/or may carry genes for a marker that can be used in selecting clones containing the vector. Suitable examples include plasmids and bacterial viruses, e.g., pUC18, pUC19, Bluescript (e.g., pBS SK+)

and its derivatives, mpl8, mpl9, pBR322, pMB9, ColEl, pCR1, RP4, phage DNAs, and shuttle vectors such as pSA3 and pAT28. These and many other cloning vectors are available from commercial vendors such as BioRad, Stratagene, and Invitrogen.

Expression vectors generally are replicable polynucleotide constructs that contain a nucleic acid of the present disclosure. The expression vector may replicable in the host cells either as episomes or as an integral part of the chromosomal DNA. Suitable expression vectors include but are not limited to plasmids, viral vectors, including adenoviruses, adeno-associated viruses, retroviruses, cosmids, and expression vector(s) disclosed in PCT Publication No. WO 87/04462. Vector components may generally include, but are not limited to, one or more of the following: a signal sequence; an origin of replication; one or more marker genes; suitable transcriptional controlling elements (such as promoters, enhancers and terminator). For expression (i.e., translation), one or more translational controlling elements are also usually required, such as ribosome binding sites, translation initiation sites, and stop codons.

The vectors containing the nucleic acids of interest can be introduced into the host cell by any of a number of appropriate means, including electroporation, transfection employing calcium chloride, rubidium chloride, calcium phosphate, DEAE-dextran, or other substances; microprojectile bombardment; lipofection; and infection (e.g., where the vector is an infectious agent such as vaccinia virus). The choice of introducing vectors or polynucleotides will often depend on features of the host cell. In some embodiments, the vector contains a nucleic acid containing one or more amino acid sequences encoding an anti-C1q antibody of the present disclosure.

Suitable host cells for cloning or expression of single-arm antibody-encoding vectors include prokaryotic or eukaryotic cells. For example, anti-C1q single-arm antibody of the present disclosure may be produced in bacteria, in particular when glycosylation and Fc effector function are not needed. For expression of antibody fragments and polypeptides in bacteria (e.g., U.S. Pat. Nos. 5,648,237, 5,789,199, and 5,840,523; and Charlton, *Methods in Molecular Biology*, Vol. 248 (B. K. C. Lo, ed., Humana Press, Totowa, N.J., 2003), pp. 245-254, describing expression of antibody fragments in *E. coli*.). After expression, the antibody may be isolated from the bacterial cell paste in a soluble fraction and can be further purified.

In addition to prokaryotes, eukaryotic microorganisms, such as filamentous fungi or yeast, are also suitable cloning or expression hosts for antibody-encoding vectors, including fungi and yeast strains whose glycosylation pathways have been "humanized," resulting in the production of an antibody with a partially or fully human glycosylation pattern (e.g., Gerngross, *Nat. Biotech.* 22:1409-1414 (2004); and Li et al., *Nat. Biotech.* 24:210-215 (2006)).

Suitable host cells for the expression of glycosylated single-arm antibody and/or anti-C1q antibody with a single antigen-binding arm can also be derived from multicellular organisms (invertebrates and vertebrates). Examples of invertebrate cells include plant and insect cells. Numerous baculoviral strains have been identified which may be used in conjunction with insect cells, particularly for transfection of *Spodoptera frugiperda* cells. Plant cell cultures can also be utilized as hosts (e.g., U.S. Pat. Nos. 5,959,177, 6,040, 498, 6,420,548, 7,125,978, and 6,417,429, describing PLANTIBODIES™ technology for producing antibodies in transgenic plants.).

Vertebrate cells may also be used as hosts. For example, mammalian cell lines that are adapted to grow in suspension may be useful. Other examples of useful mammalian host cell lines are monkey kidney CV1 line transformed by SV40 (COS-7); human embryonic kidney line (293 or 293 cells as described, e.g., in Graham et al., *J. Gen Virol.* 36:59 (1977)); baby hamster kidney cells (BHK); mouse sertoli cells (TM4 cells as described, e.g., in Mather, *Biol. Reprod.* 23:243-251 (1980)); monkey kidney cells (CV1); African green monkey kidney cells (VERO-76); human cervical carcinoma cells (HELA); canine kidney cells (MDCK; buffalo rat liver cells (BRL 3A); human lung cells (W138); human liver cells (Hep G2); mouse mammary tumor (MMT 060562); TRI cells, as described, e.g., in Mather et al., *Annals N.Y. Acad. Sci.* 383:44-68 (1982); MRC 5 cells; and FS4 cells. Other useful mammalian host cell lines include Chinese hamster ovary (CHO) cells, including DHFR-CHO cells (Urlaub et al., *Proc. Natl. Acad. Sci. USA* 77:4216 (1980)); and myeloma cell lines such as Y0, NS0 and Sp2/0. For a review of certain mammalian host cell lines suitable for antibody production, see, e.g., Yazaki and Wu, *Methods in Molecular Biology*, Vol. 248 (B. K. C. Lo, ed., Humana Press, Totowa, N.J.), pp. 255-268 (2003).

Kits

The invention also provides a pharmaceutical pack or kit comprising one or more containers filled with one or more of the ingredients of the pharmaceutical compositions of the invention. Associated with such container(s) can be a notice in the form prescribed by a governmental agency regulating the manufacture, use or sale of pharmaceuticals or biological products, which notice reflects approval by the agency of manufacture, use or sale for human administration.

The invention also provides kits containing single-arm antibody and/or anti-C1q antibody with a single antigen-binding arm of this disclosure. Kits of the invention include one or more containers comprising a purified anti-C1q single-arm antibody and/or anti-C1q antibody with a single antigen-binding arm and instructions for use in accordance with methods known in the art. Generally, these instructions comprise a description of administration of the inhibitor to treat or diagnose a disease, according to any methods known in the art. The kit may further comprise a description of selecting an individual suitable for treatment based on identifying whether that individual has the disease and the stage of the disease.

The instructions generally include information as to dosage, dosing schedule, and route of administration for the intended treatment. The containers may be unit doses, bulk packages (e.g., multi-dose packages) or sub-unit doses. Instructions supplied in the kits of the invention are typically written instructions on a label or package insert (e.g., a paper sheet included in the kit), but machine-readable instructions (e.g., instructions carried on a magnetic or optical storage disk) are also acceptable.

The label or package insert indicates that the composition is used for treating a specific disease. Instructions may be provided for practicing any of the methods described herein.

The kits of this invention are in suitable packaging. Suitable packaging includes, but is not limited to, vials, bottles, jars, flexible packaging (e.g., sealed Mylar or plastic bags), and the like. Also contemplated are packages for use in combination with a specific device, such as an inhaler, nasal administration device (e.g., an atomizer) or an infusion device such as a minipump. A kit may have a sterile access port (for example the container may be an intravenous solution bag or a vial having a stopper pierceable by a hypodermic injection needle). The container may also have a sterile access port (e.g., the container may be an intravenous solution bag or a vial having a stopper pierceable by a hypodermic injection needle). At least one active agent in the composition is an inhibitor of classical complement pathway. The container may further comprise a second pharmaceutically active agent.

Kits may optionally provide additional components such as buffers and interpretive information. Normally, the kit comprises a container and a label or package insert(s) on or associated with the container.

Diagnostic Assays

The present invention provides, in part, methods of determining a subject's risk of developing a complement associate condition: administering an anti-C1q single-arm antibody and/or anti-C1q antibody with a single antigen-binding arm to the subject, wherein the anti-C1q single-arm antibody and/or anti-C1q antibody with a single antigen-binding arm is coupled to a detectable label; detecting the detectable label to measure the amount or location of C1q in the subject; and comparing the amount or location of one or more of C1q to a reference, wherein the risk of developing a complement associated condition is characterized based on the comparison of the amount or location of one or more of C1q to the reference.

An exemplary method for detecting the level of C1q, and thus useful for classifying whether a sample is associated with a complement associated condition or a clinical subtype thereof involves obtaining a biological sample from a test subject and contacting the biological sample with an antibody capable of detecting C1q such that the level of C1q is detected in the biological sample. In certain instances, the statistical algorithm is a single learning statistical classifier system. For example, a single learning statistical classifier system can be used to classify a sample as a C1q sample based upon a prediction or probability value and the presence or level of C1q. The use of a single learning statistical classifier system typically classifies the sample as a C1q sample with a sensitivity, specificity, positive predictive value, negative predictive value, and/or overall accuracy of at least about 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

Other suitable statistical algorithms are well-known to those of skill in the art. For example, learning statistical classifier systems include a machine learning algorithmic technique capable of adapting to complex data sets (e.g., panel of markers of interest) and making decisions based upon such data sets. In some embodiments, a single learning statistical classifier system such as a classification tree (e.g., random forest) is used. In other embodiments, a combination of 2, 3, 4, 5, 6, 7, 8, 9, 10, or more learning statistical classifier systems are used, preferably in tandem. Examples of learning statistical classifier systems include, but are not limited to, those using inductive learning (e.g., decision/classification trees such as random forests, classification and regression trees (C&RT), boosted trees, etc.), Probably Approximately Correct (PAC) learning, connectionist learning (e.g., neural networks (NN), artificial neural networks (ANN), neuro fuzzy networks (NFN), network structures, perceptrons such as multi-layer perceptrons, multi-layer feed-forward networks, applications of neural networks, Bayesian learning in belief networks, etc.), reinforcement learning (e.g., passive learning in a known environment such as naive learning, adaptive dynamic learning, and temporal difference learning, passive learning in an unknown environment, active learning in an unknown environment, learning action-value functions, applications of reinforcement learning, etc.), and genetic algorithms and evolutionary programming. Other learning statistical classifier systems include support vector machines (e.g., Kernel methods), multivariate adaptive regression splines (MARS), Levenberg-Marquardt algorithms, Gauss-Newton algorithms, mixtures of Gaussians, gradient descent algorithms, and learning vector quantization (LVQ).

In some embodiments, the methods further involve obtaining a control biological sample (e.g., biological sample from a subject who does not have a condition or disorder mediated by C1q), a biological sample from the subject during remission or before developing a condition or disorder mediated by C1q or a biological sample from the subject during treatment for developing a condition or disorder mediated by C1q.

An exemplary method for detecting the presence or absence of C1q is anti-C1q single-arm antibody and/or anti-C1q antibody with a single antigen-binding arm to the subject, wherein the anti-C1q antibody is coupled to a detectable label. In some embodiments, the detectable label comprises a nucleic acid, oligonucleotide, enzyme, radioactive isotope, biotin or a fluorescent label. In some embodiments, the detectable label is detected using an imaging agent for x-ray, CT, MRI, ultrasound, PET and SPECT. In some embodiments, the fluorescent label is selected from fluorescein, rhodamine, cyanine dyes or BODIPY.

EXEMPLIFICATION

Example 1: C1q Binding Assay

A direct ELISA was used to assess binding of single-arm antibody (with IgG4 and Fcγ receptor binding site mutation) and full-length humanized antibodies to human C1q (FIG. 2A). Black 96-well plates (#437111, Thermo Scientific) were coated with human C1q (2 ug/mL) (Complement Technology) in Bicarbonate buffer (pH 9.4) (#28382, Thermo Scientific), overnight at 4 C. Next day, plates are washed with dPBS thrice and blocked with 3% BSA/PBS for 1 hour at room temperature (RT). Serial dilutions of anti-C1q full-length humanized antibody, anti-C1q-Fab, and anti-C1q single-arm antibody (with IgG4 and Fcγ receptor binding site mutation) were prepared in dPBS 0.3% BSA, 0.1% Tween buffer (50 uL/well). Following incubation for 1 hour at RT, plates are washed 4× with dPBS 0.05% Tween. Then, alkaline phosphatase (AP) conjugated secondary antibodies to human kappa (Abcam) and human FC (Jackson Immunoresearch), respectively at 2000-4000-fold dilution. After an additional 1 hour of incubation at RT, plates are washed 4× with dPBS 0.05% Tween and luminescence signal was developed with AP substrate (#T2214, Thermo Scientific). Luminescence counts were measured using a luminometer (Spectramax i3×, Molecular Devices). Raw counts were fit using a 4-parameter logistic to derive $EC_{50}$ for human C1q binding (Prism, GraphPad).

The anti-C1q single-arm antibody (with IgG4 and Fcγ receptor binding site mutation) shows similar binding $EC_{50}$ to human C1q when compared to the full-length humanized anti-C1q antibody and the Fab fragment antibody (FIG. 2A). The $EC_{50}$ for binding to hC1q were 0.07, 0.17, and 0.05 nM respectively for the full-length humanized anti-C1q antibody, the Fab fragment antibody, and anti-C1q single-arm antibody (with IgG4 and Fcγ receptor binding site mutation), respectively. It was anticipated that full-length humanized antibody would exhibit higher avidity for binding to C1q due to the presence of 2 binding arms when compared to the single-arm antibody (with IgG4 and Fcγ receptor binding site mutation). However, the data demonstrates that the binding $EC_{50}$ was identical between the molecules, supporting the conclusion that the intrinsic affinity of the single-arm molecule (with IgG4 and Fcγ receptor binding site mutation) is driving human C1q binding.

Example 2: Hemolysis

To characterize the functional activity on C1q and the classical complement cascade, anti-C1q antibodies were evaluated for ability to block hemolysis of IgM antibody-sensitized sheep RBCs. The test antibodies, the full-length humanized anti-C1q antibody, the Fab fragment antibody, and anti-C1q single-arm antibody (with IgG4 and Fcγ receptor binding site mutation) were titrated in GVB++ buffer (Complement Technology), to achieve final concentrations in the range of 300 ug/mL to 0.1 ug/mL in the hemolysis reaction. Titrated test antibodies were added to clear U-bottom plates followed by 30% human serum in GVB++ buffer (Complement Technology), both at a volume of 33.3 uL. Hemolysis was triggered by addition of sensitized sheep RBCs (33.3 uL, ~100 million cells/mL) (Complement Technology), which resulted in a final human serum concentration of 1%. Samples were incubated at 37 C for 20 minutes. Plates were then centrifuged at 2000 rpm for 5 minutes, supernatants collected, and absorbance read at 415 nm. Controls were run including serum containing GVB++ with no antibodies, serum with GVB-EDTA (Complement Technology) and water to elicit maximal hemolysis. The raw absorbance was background subtracted (GVB-EDTA signal) and percent hemolysis was calculated using serum in GVB++ without antibody. Data were fit using 4PL-logistic fits to derive $IC_{50}$ for inhibition of hemolysis.

The single-arm antibody (with IgG4 and Fcγ receptor binding site mutation) shows a similar potency as the full-length humanized antibody for inhibition of serum hemolysis (FIG. 2B), which represents functional blockade of the classical complement cascade. The $IC_{50}$ for inhibition of human serum hemolysis for the full-length humanized anti-C1q antibody, the Fab fragment antibody, and anti-C1q single-arm antibody (with IgG4 and Fcγ receptor binding site mutation) was 7.6, 5.7, and 9.9 nM, respectively. It was anticipated that the full-length humanized antibody would exhibit higher potency due its ability to engage multiple functional head groups of C1q, or due to steric hindrance for multiple single-arm antibodies (with IgG4 and Fcγ receptor binding site mutation) to engage all C1q head groups. However, the data demonstrates that the hemolytic inhibition was identical between the molecules, supporting the conclusion that the intrinsic affinity of the single-arm molecule (with IgG4 and Fcγ receptor binding site mutation) is driving potency in this functional measure.

Example 3: In Vitro Serum C1q Activation

Since C1q is a multivalent molecule with six globular heads that can allow cross-linking by bivalent antibody molecules, the full-length humanized anti-C1q antibody, the Fab fragment antibody, and anti-C1q single-arm antibody (with IgG4 and Fcγ receptor binding site mutation) were evaluated for their ability to cross-link and activate C1q in serum samples (FIGS. 1A and 1B).

In vitro serum activation: In vitro serum activation was assessed using M1 (murine precursor of the full-length humanized anti-C1q antibody), the Fab fragment antibody and the single-arm antibody (with IgG4 and Fcγ receptor binding site mutation). Antibody molecules were titrated in dPBS buffer (Dulbecco's phosphate buffered saline) and then spiked into human serum to achieve final concentrations in the range of 4000 to 1 ug/mL. Serum with no antibody spiked were used to evaluate background C1q activation. Serum concentration in the reaction mixture was ~66%. Samples were incubated at 37 C for 30 minutes. At the end of this period, activation was arrested with a buffer containing ~20 mM EDTA (Sigma) and ~500 uM Nafamostat (Sigma) to neutralize the activated C1-complex.

Assays to assess C1q activation: Serum samples were then run in a sandwich ELISA assay to measure C1q-tagged C3d as a measure of C1q activation. The ELISA utilized an antibody to capture C1q (A00136, Agilent), followed by a detection with a C3d specific antibody (#A0063, DAKO), to only measure activated and C3d-complexed C1q. Briefly, 96 well plates were coated with the C1q capture antibody overnight at 2 ug/mL. Next day, plates were washed 4× with dPBS and blocked with 3% BSA/PBS. After 3 hours, serum samples diluted 1000-fold were added to plates and incubated overnight at 4 C. Next day, plates were warmed to room temperature, washed with PBS with 0.05% Tween, and then incubated with alkaline-phosphatase conjugated C3d antibody for 1 hour. Then, plates are washed, assays were developed with an alkaline phosphatase substrate (T-2214, Thermo Scientific) and read in a luminometer (i3×, Spectramax). Sample counts were normalized to samples without any antibody and plotted (Prism, GraphPad).

Unlike anti-C1q full-length antibody M1, anti-C1q single-arm antibody (with IgG4 and Fcγ receptor binding site mutation) and Fab fragment antibody do not trigger C1q activation in vitro in serum samples (FIG. 3). At concentrations between 10 and 1000 ug/ml, anti-C1q full-length murine antibody induces C1q activation in serum samples (peak at ~30 ug/ml), while nti-C1q single-arm antibody (with IgG4 and Fcγ receptor binding site mutation) and Fab fragment antibody do not trigger activation. Negative control hIgG4 isotype antibody also shows no in vitro serum C1q activation. These results support our hypothesis that the bivalent M1 antibody but not monovalent molecules (single-arm, Fab) drive C1q activation and triggers the classical complement cascade. Thus, the single-arm antibody (with IgG4 and Fcγ receptor binding site mutation) is predicted to not result in dosing-related complement activation in in vivo monkey studies.

Example 4: Specificity for Inhibition of the Classical Complement Pathway

The full-length humanized anti-C1q antibody, the Fab fragment antibody, and anti-C1q single-arm antibody (with IgG4 and Fcγ receptor binding site mutation) were evaluated for their ability to inhibit the classical, lectin and alternate complement pathways using a functional assay that assessed the formation of the terminal complement complex C5b-9. These assays were used to evaluate specificity of the anti-C1q molecules for the classical complement cascade.

Assays to assess activity on all 3 complement pathways: Commercial assays kits were obtained with plates coated with specific activators of the classical, lectin, or alternative pathways (Eurodiagnostica—Weislab™ CP310, LP320, AP330). Human serum samples were run at a final dilution of 100× for Classical and Lectin pathway assays and at 20× dilution for the Alternate pathway assay. Anti-C1q molecules, the full-length humanized anti-C1q antibody, the Fab fragment antibody, and anti-C1q single-arm antibody (with IgG4 and Fcγ receptor binding site mutation) were titrated over a range of concentrations in the respective assays. The anti-C5 antibody (Eculizumab, Creative-biolabs) was used as a positive control that inhibits all 3 pathways. After incubation of above samples for 1 hour at 37 C, plates were washed thrice with wash buffer, followed by addition of an antibody conjugate specific for the terminal complex, C5b-9. After 30 minutes, plates were washed thrice followed by addition of enzyme substrate to develop the reaction. Finally, absorbance at 405 nm was read in a plate reader (13×, Spectramax).

Figure 4A:
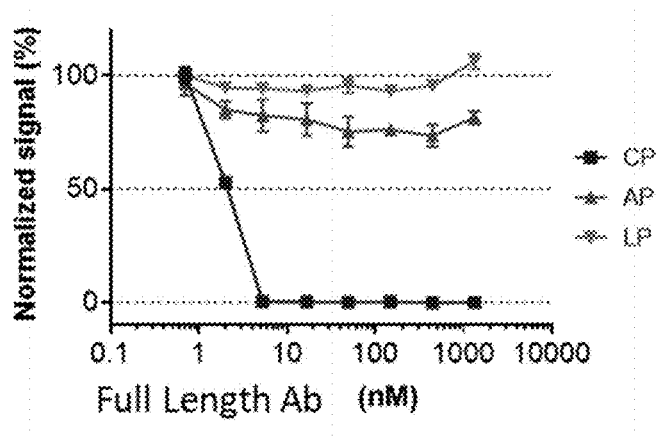
FIGS. 4A-4D show In vitro assays to assess specificity of the anti-C1q single-arm antibody on the classical complement pathway. CP—classical pathway, LP—lectin pathway, and AP—alternate pathway assays run for the 4 molecules the full-length humanized anti-C1q antibody (FIG. 4A), the Fab fragment antibody (FIG. 4B), and anti-C1q single-arm antibody (FIG. 4C) and Eculizumab (FIG. 4D).
Figure 4B:
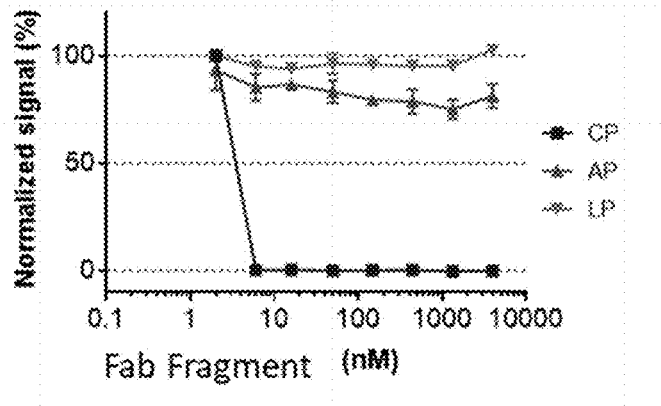
Figure 4C:
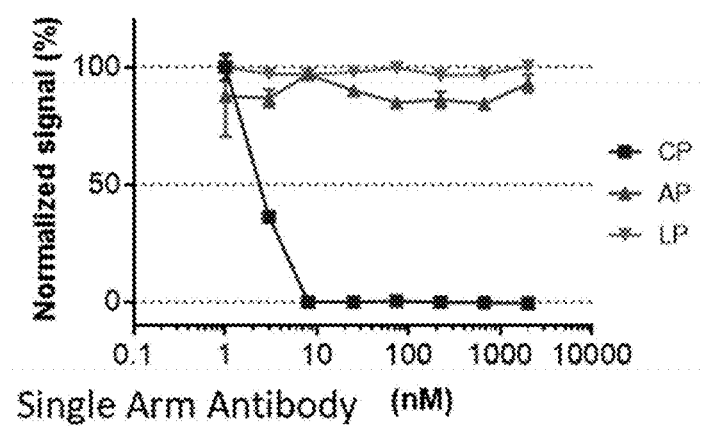
Figure 4D:
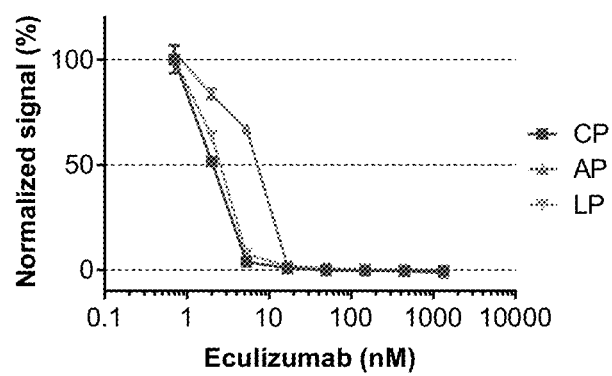
Figure 5A:
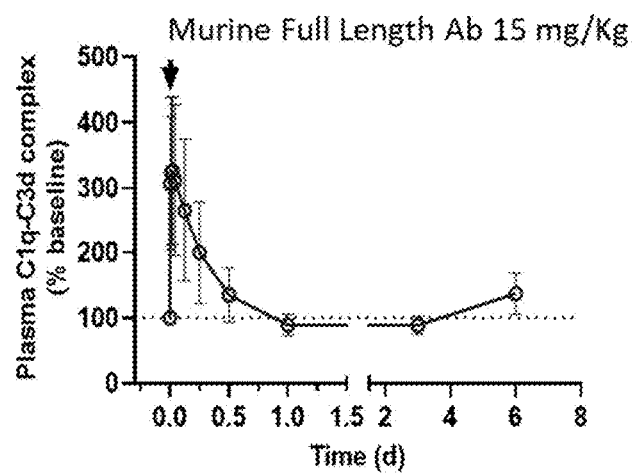
FIG. 5A-5D show lack of complement activation following a single IV dose of 15 mg/Kg anti-C1q single-arm antibody compared to full length anti-C1q antibody. Administration of the full-length murine antibody led to rapid increase in C1q-C3d complex and C3a levels, within 5 minutes after IV dosing (FIGS. 5A, 5B). In contrast, the single-arm antibody dosing led to a rapid drop in plasma C1q-C3d complex levels that stayed below baseline levels for 4-6 days after dosing (FIG. 5C). Consistent with a lack of C1q activation with the single-arm antibody, plasma C3a levels showed no changes with time after IV dosing (FIG. 5D).
Figure 5B:
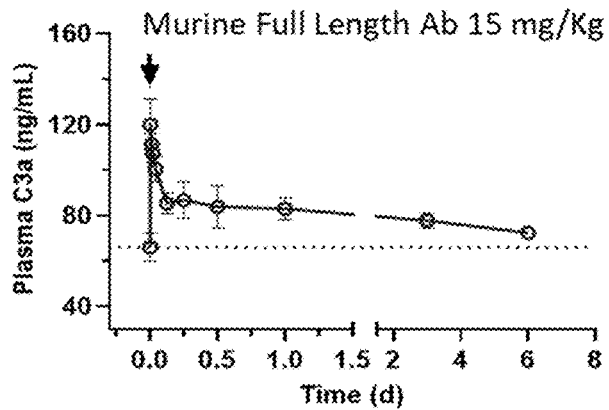
Figure 5C:
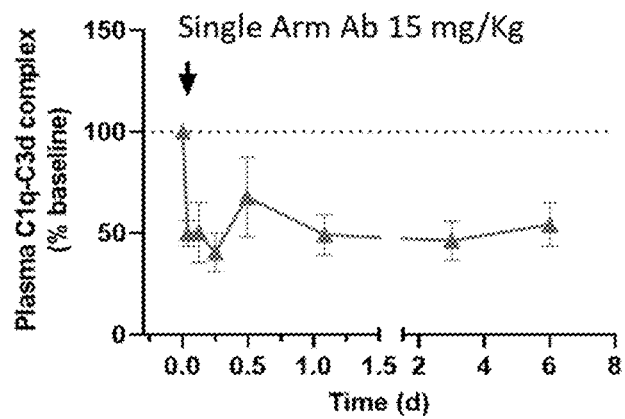
Figure 5D:
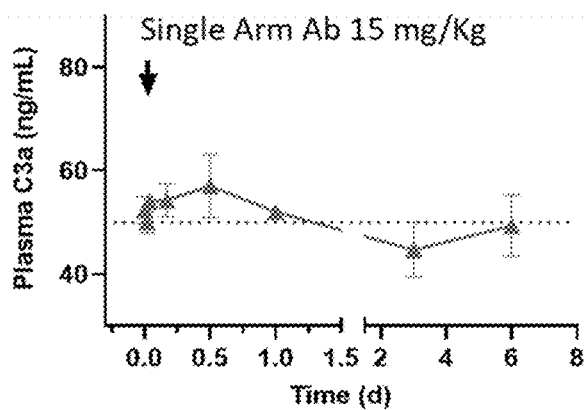

All three anti-C1q antibodies—the full-length humanized anti-C1q antibody, the Fab fragment antibody, and anti-C1q single-arm antibody (with IgG4 and Fcγ receptor binding site mutation) fully inhibited the classical complement pathway (initiated by C1q) but did not affect activity of the lectin pathway (initiated by the mannose binding lectin) or the alternative complement pathway (initiated by C3b) (FIGS. 4A, 4B, 4C). The $IC_{50}$ was 2-3 nM for inhibition of the classical pathway. In contrast, Eculizumab, which inhibits the downstream C5 molecule, led to inhibition of activity in all 3 complement pathways, with $IC_{50}$ in the 2-10 nM (FIG. 4D). These results demonstrate that the full-length humanized anti-C1q antibody, the Fab fragment antibody, and anti-C1q single-arm antibody (with IgG4 and Fcγ receptor binding site mutation), specifically block C1q and only inhibit activation of the classical complement cascade without impact on the other complement pathways.

Example 5: Anti-C1q Molecules Bind with Similar Potency to C1q Derived from Human and Monkey Serum We evaluated and confirmed binding of anti-C1q molecules to C1q derived from monkey and human serum using an in vitro binding assay.

Evaluation of binding to serum derived C1q: We compared binding of anti-C1q molecules to C1q from monkey and human serum. Binding to serum derived C1q was preformed using a sandwich ELISA. In this assay, a monoclonal antibody specific to the collagen tail of C1q (JL-1, Abcam) was used to capture the C1q, and then detected using the anti-C1q antibodies, which bind to the globular head groups of C1q. Black 96 well plates (Costar #3925) were coated with 75 uL of 1 ug/mL of JL1 antibody (Abcam ab71940) in bicarbonate buffer (pH 9.4) overnight at 4 C. Next day, the plates were washed with dPBS (pH 7.4) and blocked with dPBS buffer containing 3% bovine serum albumin (BSA). Diluted serum samples were added to the plates and incubated overnight shaking at 4° C. Human and monkey serum samples were used at 1:2000 dilution in assay buffer, dPBS containing 0.3% BSA and 0.1% tween. Following overnight incubation at 4 C, plates were warmed to room temperature for 2 hours. The wells were then exposed to the full-length humanized anti-C1q antibody, the Fab fragment antibody, and anti-C1q single-arm antibody (with IgG4 and Fcγ receptor binding site mutation) at a range of concentrations from 0.1 to 100 ng/mL in assay buffer. Plates were washed with dPBS with 0.05% tween and then incubated with alkaline phosphatase conjugated anti-human Fc or Kappa antibodies at 1:3000 dilution in assay buffer. Plates were then washed, and detected using an enzyme substrate (T2214, Thermo) and read in a plate reader. Counts were background subtracted and normalized to signal at highest concentration, % normalized values were plotted as a function of concentration for each of the antibodies. Data were fit using a 4-parameter logistic fit to derive $EC_{50}$ of binding and plotted using GraphPad Prism.

Results: A similar binding profile was observed for C1q derived from human and Cynomolgus serum for the full-length humanized anti-C1q antibody, the Fab fragment antibody, and anti-C1q single-arm antibody (with IgG4 and Fcγ receptor binding site mutation) (FIGS. 9A, 9B, 9C). The $EC_{50}$ for binding to cynomolgus and human serum derived C1q was 100-200 nM for Fab fragment antibody, 50-100 nM for full-length humanized antibody and 150-400 nM for single-arm antibody (with IgG4 and Fcγ receptor binding site mutation), suggesting modest differences in the binding affinities between the molecules (Table 1). The binding $EC_{50}$ was 1-2-fold weaker in cynomolgus serum compared to human serum. We further evaluated the molecules in human and cynomolgus serum to determine potency in hemolytic function.

TABLE 1

Relative binding $EC_{50}$ in serum derived C1q
$EC_{50}$ for binding to Serum derived C1q (nM)

|  | Fab fragment antibody | full-length humanized anti-C1q antibody | anti-C1q single-arm antibody |
| --- | --- | --- | --- |
| Human serum | 147.8 | 56.2 | 178.3 |
| Cyno serum | 178.3 | 96.5 | 378.5 |
| Ratio Cyno:Human | 1.2 | 1.7 | 2.1 |

Example 6: Anti-C1q Single-Arm Antibody Inhibits Classical Complement Mediated Hemolysis with Similar Potencies in Monkey and Human Serum We evaluated the ability of the full-length humanized anti-C1q antibody, the Fab fragment antibody, and anti-C1q single-arm antibody (with IgG4 and Fcγ receptor binding site mutation) to inhibit serum hemolysis from cynomolgus serum and compared it to human serum to confirm functional activity on the classical complement pathway in monkeys.

In-vitro Serum Hemolysis assay: To evaluate hemolytic activity, test antibodies were diluted in GVB++ buffer (Complement Technology), in the range of 100 ug/mL to 0.3 ug/mL. Titrated test antibodies were added to clear U-bottom plates followed by respective serum samples diluted in GVB++ buffer. Antibody sensitized sheep RBCs (Complement Technology, ~100 million cells/mL) were added to trigger classical complement mediated hemolysis. Serum samples were at a final dilution of 100× for both human and cynomolgus runs. Samples were incubated at 37 C for 20 minutes. Plates were then centrifuged at 2000 rpm for 5 minutes, supernatants collected, and absorbance read at 415 nm. Controls were run including serum containing GVB++ with no antibodies, serum with GVB-EDTA (Complement Technology) and water to elicit maximal hemolysis. The raw absorbance was background subtracted (GVB-EDTA signal) and percent hemolysis was calculated in comparison to serum with no added antibodies. Data were fit using 4PL-logistic fits to derive $IC_{50}$ values and plotted using GraphPad Prism.

Results: the full-length humanized anti-C1q antibody, the Fab fragment antibody, and anti-C1q single-arm antibody (with IgG4 and Fcγ receptor binding site mutation) showed a similar $IC_{50}$ for inhibition of classical complement mediated hemolysis (FIGS. 10A, 10B, 10C). The $IC_{50}$ for inhibition of serum hemolysis was in the range of 3-10 nM for all 3 molecules in both human and monkey sera (Table 2).

These results confirm that anti-C1q single-arm antibody (with IgG4 and Fcγ receptor binding site mutation) can bind to C1q in monkey serum and block functional activity of the classical complement cascade.

TABLE 2

| IC$_{50}$ for hemolysis inhibition<br>IC50 for hemolysis inhibition (nM) | | | |
|---|---|---|---|
| | Fab fragment antibody | full-length humanized anti-C1q antibody | anti-C1q single-arm antibody |
| Human serum | 5.7 | 7.6 | 9.9 |
| Cyno serum | 3.4 | 5.3 | 5.5 |
| Ratio Cyno:Human | 0.6 | 0.7 | 0.6 |

Example 7: Lack of In Vivo C1q Activation with Single-Arm Antibody

Since C1q is a multivalent molecule with six globular heads that can allow cross-linking by bivalent molecules, we evaluated the ability of Ml, the full-length murine antibody, and the single-arm antibody (with IgG4 and Fcγ receptor binding site mutation) to activate C1q in vivo following IV dosing in monkeys.

The full-length murine antibody and the single-arm antibody (with IgG4 and Fcγ receptor binding site mutation) were administered via single IV bolus injection at 15 mg/Kg in monkeys and plasma samples were evaluated for complement activation (murine Ab, n=4; single-arm Ab, n=3). Samples were collected at early time-points of 5 minutes to a few hours on day 1 after dosing to evaluate the time course of activation. Complement activation was assessed by measuring the levels and time course of C1q-C3d complexes and C3a in plasma samples. C3a is a small fragment released following C3 cleavage, while C1q-C3d complex is a complex generated after C1q activation.

Assays to assess in vivo complement activation: Plasma samples were run in sandwich ELISAs to measure C1q-tagged C3d complex and C3a levels. The C1q-C3d assay utilized an antibody to capture C1q (A00136, Agilent), followed by a detection with a C3d specific antibody (#A0063, DAKO), to only measure activated and C3d-complexed C1q. The C3a fragment was measured using a sandwich ELISA using a rabbit polyclonal capture antibody (Complement Tech) and detected using a C3a specific monoclonal antibody (Abcam). Briefly, 96 well plates were coated with the C1q or C3a capture antibody overnight at 2 and 3 ug/mL, respectively. Next day, plates were washed 4× with dPBS and blocked with 3% BSA/PBS. After 3 hours, serum samples diluted 500 and 1000-fold were added to respective plates and incubated overnight at 4 C. Next day, plates were warmed to room temperature, washed with PBS with 0.05% Tween, and then incubated with alkaline-phosphatase conjugated detection antibody for 1 hour. Then, plates are washed, assays were developed with an alkaline phosphatase substrate (T-2214, Thermo Scientific) and read in a luminometer (i3×, Spectramax). Sample counts were normalized to samples without any antibody and plotted (Prism, GraphPad).

Results: Monkeys were administered a single IV dose of the full-length murine antibody or the single-arm antibody (with IgG4 and Fcγ receptor binding site mutation). Plasma samples collected before and after dosing were assessed for complement activation (FIGS. 5A-5D). Administration of the full-length murine antibody led to rapid increase in C1q-C3d complex and C3a levels, within 5 minutes after IV dosing (FIGS. 5A, 5B). The complex and C3a recovered rapidly, within 3-12 hrs after activation, to baseline levels. In contrast, the single-arm antibody (with IgG4 and Fcγ receptor binding site mutation) dosing led to a rapid drop in plasma C1q-C3d complex levels that stayed below baseline levels for 4-6 days after dosing (FIG. 5. Consistent with a lack of C1q activation with the single-arm antibody (with IgG4 and Fcγ receptor binding site mutation), plasma C3a levels showed no changes with time after IV dosing (FIG. 5D).

Thus, the single-arm antibody (with IgG4 and Fcγ receptor binding site mutation) does not cross-link C1q or result in in vivo C1q driven classical complement cascade activation following IV dosing in monkeys. These results support the possibility of performing rapid IV infusions in human clinical studies with the single-arm antibody (with IgG4 and Fcγ receptor binding site mutation).

Example 8: Assessment of C1q Activation with Single-Arm Antibody

Naïve cynomolgus monkeys were dosed as set forth in Table 3, and evaluated for proteolysis of C2 to C2b and C3 to C3a, indicative of classical complement activation.

TABLE 3

| Study Design | | | |
|---|---|---|---|
| Group No. 1 | Test Material | Dose Route | Dose Level (mg/kg) |
| 1 | Single arm antibody with IgG4 and Fcγ receptor binding site mutation | IV Bolus | 15 |
| 2 | Single arm antibody with IgG1 and Fcγ receptor binding site mutation | IV Bolus | 15 |
| 3 | Single arm antibody with IgG4 and no Fcγ receptor binding site mutation | IV Bolus | 15 |

C2b and C3a Assays

The levels C2b and C3a were measured in serum/plasma using sandwich ELISAs. Black 96 well plates (Costar #3925) were coated with 75 uL of respective capture antibody (Table 1) in bicarbonate buffer (pH 9.4) overnight at 4 C. Next day, the plates were washed with dPBS pH 7.4 (Dulbecco's phosphate-buffered saline) and then blocked with dPBS buffer containing 3% bovine serum albumin (BSA). Standard curves were prepared with purified proteins in assay buffer (dPBS containing 0.3% BSA, 0.1% Tween20, 10 mM EDTA). Study serum/plasma samples were prepared in the assay buffer at respective dilutions. The blocking buffer was removed from the plate by tapping. Standards and samples were added at 75 uL per well in duplicates and incubated with shaking at 300 rpm at room temperature for 1 hr for PK measurements, and subsequently overnight at 4 C for all other assays. Plates were washed thrice with wash buffer (dPBS containing 0.05% Tween20) and 75 uL of alkaline-phosphatase conjugated secondary antibodies (Table 1) were added to all wells. Plates were incubated at room temperature with shaking for 1h. Plates were washed thrice with wash buffer and developed using 75 uL of alkaline phosphatase substrate (Life Technologies, T2214). After 20 minutes at room temperature, plates were read using a luminometer. Standards were fit using a 4PL logistic fit and concentration of unknowns determined. Analyte levels were corrected for dilution and then plotted using GraphPad Prism.

TABLE 4

Antibodies used in ELISA assays

| Assay | Capture | Secondary | Serum/Plasma dilution factor |
|---|---|---|---|
| C2b | Q-C2 (Quidel, A303) | 6E3 (Abcam, ab17452) | 150 |
| C3a | CT-C3a (Complement Tech, A218) | K13/16 (Abcam, ab36385) | 1000 |

Results

C2b is fragment of C2 made after C1 activation. C3a is fragment of C3 made after C4bC2b activation.

Figure 8A:
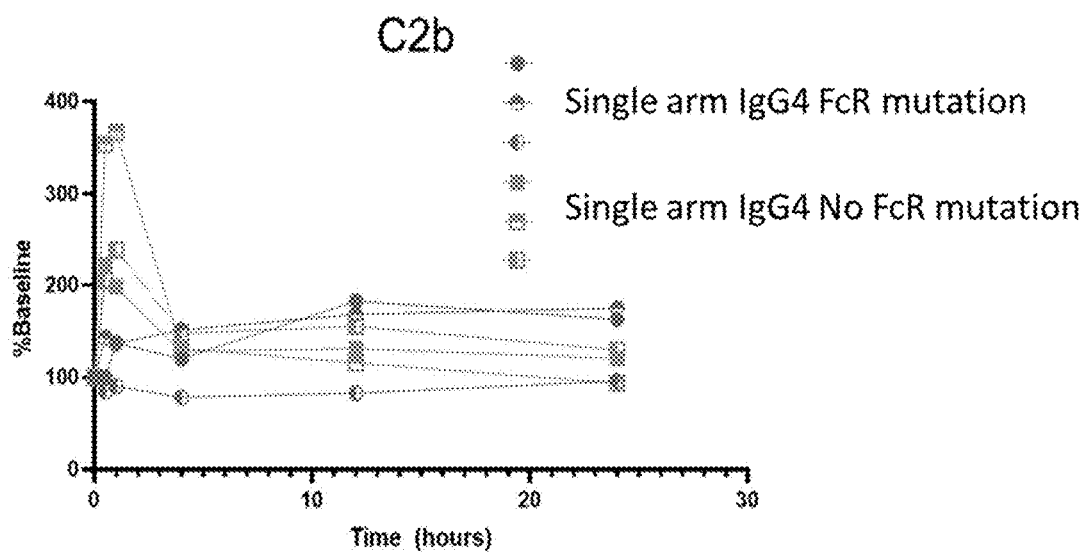
FIGS. 8A and 8B show C2b levels (FIG. 8A) and C3a levels (FIG. 8B) following a single IV dose of 15 mg/Kg of anti-C1q single arm antibodies of the present invention.
Figure 8B:
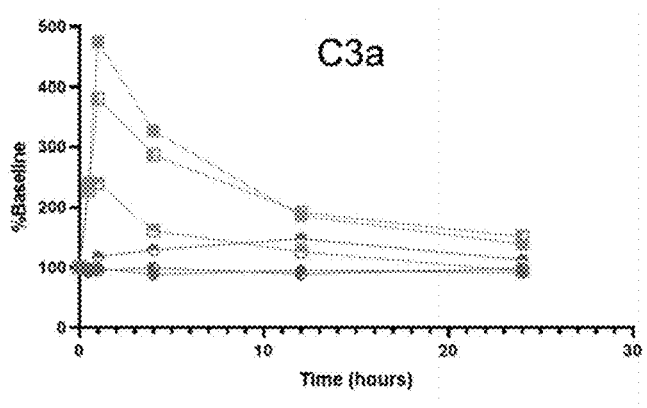

Single arm antibody (with IgG4 and Fcγ receptor binding site mutation), with the L>E mutation designed to eliminate FcγR binding, does not induce complement activation (FIGS. 8A-8B). In contrast, Single arm antibody (with IgG4 and no Fcγ receptor binding site mutation) with intact FcgR1 binding causes transient increases in complement activation products C2b and C3a, likely through capture of C1q/anti-C1q complexes by FcR on neutrophils and macrophages, leading to C1q conformational changes and activation (FIGS. 8A-8B).

INCORPORATION BY REFERENCE

Each of the patents, published patent applications, and non-patent references cited herein are hereby incorporated by reference in their entirety.

EQUIVALENTS

Those skilled in the art will recognize, or be able to ascertain using no more than routine experimentation, many equivalents to the specific embodiments of the invention described herein. Such equivalents are intended to be encompassed by the following claims.

What is claimed is:

1. An antibody that binds to C1q, comprising a single C1q antigen-binding arm and an Fc region, wherein the antibody comprises:
   i) a light chain, wherein:
      the amino acid sequence of the light chain comprises an amino acid sequence with at least about 85% homology to the amino acid sequence of SEQ ID NO: 1 and wherein the light chain comprises an HVR-L1 having the amino acid sequence of SEQ ID NO: 4, an HVR-L2 having the amino acid of SEQ ID NO: 5, and an HVR-L3 having the amino acid of SEQ ID NO: 6;
   ii) a first and a second heavy chain, wherein:
      the amino acid sequence of the first heavy chain comprises the amino acid sequence of SEQ ID NO: 2; and
      the amino acid sequence of the second heavy chain consists of the amino acid sequence of SEQ ID NO: 3.

2. The antibody of claim 1, wherein the light chain comprises the amino acid sequence of SEQ ID NO: 1.

3. The antibody of claim 1, wherein the light chain comprises a light chain variable domain, that comprises an amino acid sequence of any one of SEQ ID NOs: 10-14.

4. An isolated host cell expressing the antibody of claim 1.

5. An isolated DNA sequence encoding the heavy and/or light chain regions of the antibody of claim 1.

6. A cloning or expression vector comprising one or more DNA sequences of claim 5.

7. An isolated polynucleotide comprising a nucleic acid sequence encoding the antibody of claim 1.

8. A process for producing an antibody that binds to C1q, the antibody comprising a single C1q antigen-binding arm and an Fc region, the process comprising culturing the host cell of claim 4 and isolating the antibody.

9. A pharmaceutical composition comprising the antibody of claim 1 and a pharmaceutically acceptable carrier.

10. A method of inhibiting complement activation in a disease associated with complement activation in an individual in need of such inhibition, the method comprising administering the antibody of claim 1.

11. A kit comprising an antibody of claim 1, and a package insert comprising instructions for using the antibody to inhibit complement activation in a disease associated with complement activation in an individual in need of such inhibition.

12. The antibody of claim 1, wherein the second heavy chain comprises one or more post-translational modifications.

* * * * *